(12) United States Patent
Berg et al.

(10) Patent No.: US 7,640,091 B2
(45) Date of Patent: Dec. 29, 2009

(54) CONTROL APPARATUS AND METHOD

(75) Inventors: Greg T. Berg, Kingsburg, CA (US);
Andrew J. Talbott, Hudson, WI (US);
Christopher M. Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 848 days.

(21) Appl. No.: 10/862,020

(22) Filed: Jun. 4, 2004

(65) Prior Publication Data

US 2005/0038587 A1    Feb. 17, 2005

Related U.S. Application Data

(60) Provisional application No. 60/476,113, filed on Jun. 5, 2003.

(51) Int. Cl.
*G06F 7/70* (2006.01)
(52) U.S. Cl. .................... 701/50; 701/36; 56/328.1
(58) Field of Classification Search .............. 701/1, 701/36, 50; 47/1.1 R, 58.1, 1.01 R; 56/328.1–340.1
See application file for complete search history.

(56) References Cited

U.S. PATENT DOCUMENTS

| | | |
|---|---|---|
| 1,555,398 A | 9/1925 | Brundert |
| 1,876,737 A | 9/1932 | Opp |
| 3,344,591 A | 10/1967 | Christie et al. |
| 3,426,517 A | 2/1969 | Duncan |
| 3,439,482 A | 4/1969 | Orton |
| 3,469,383 A | 9/1969 | Manfre |
| 3,473,311 A | 10/1969 | Fox |
| 3,474,895 A | 10/1969 | Dauenhauer |
| 3,507,101 A | 4/1970 | Bernshausen |
| 3,527,304 A | 9/1970 | Wilde et al. |
| 3,559,386 A | 2/1971 | Popov et al. |
| 3,563,016 A | 2/1971 | Tolochko et al. |
| 3,601,964 A | 8/1971 | Fisher et al. |
| 3,606,741 A | 9/1971 | Olmo et al. |
| 3,613,343 A | 10/1971 | Sagouspe et al. |
| 3,715,876 A | 2/1973 | McCord |
| 3,727,388 A | 4/1973 | Smith |

(Continued)

FOREIGN PATENT DOCUMENTS

DE    2 103 173    8/1972

(Continued)

OTHER PUBLICATIONS

American Journal Enology Viticulture, vol. 46, No. 1, 1995, Fig. 26.

(Continued)

*Primary Examiner*—Richard M. Camby
(74) *Attorney, Agent, or Firm*—Mercahnt & Gould PC

(57) ABSTRACT

A programmable viticulture management system includes a mechanized device for removing excess undesired portions of plants advances through a vineyard to perform control operations on two rows or half-rows of grape vines simultaneously. Accessories mount to the mechanized device and include various engagement members for engaging the vines. A control system automatically varies the velocity of the engagement members in relation to the vehicle speed. The control system also receives various inputs and provides information on multiple growth control practices.

11 Claims, 54 Drawing Sheets

U.S. PATENT DOCUMENTS

| | | | |
|---|---|---|---|
| 3,760,574 | A | 9/1973 | Tassone |
| 3,766,724 | A | 10/1973 | Paillou |
| 3,775,953 | A | 12/1973 | Poutsma |
| 3,783,595 | A | 1/1974 | Tolochko et al. |
| 3,866,401 | A | 2/1975 | Claxton et al. |
| 3,889,454 | A | 6/1975 | Bruel |
| 3,890,774 | A | 6/1975 | Bruel |
| 3,890,775 | A | 6/1975 | Bruel |
| 3,901,006 | A | 8/1975 | Lewis et al. |
| 3,939,629 | A | 2/1976 | Bruel |
| 3,996,730 | A | 12/1976 | Dorfer |
| 4,015,366 | A | 4/1977 | Hall, III |
| 4,016,711 | A | 4/1977 | Claxton |
| 4,022,001 | A | 5/1977 | Burton |
| 4,085,572 | A | 4/1978 | Bruel |
| 4,112,657 | A | 9/1978 | Benac et al. |
| 4,207,727 | A | 6/1980 | Poytress |
| 4,241,569 | A | 12/1980 | Bobard et al. |
| 4,251,983 | A | 2/1981 | Burton |
| 4,282,705 | A | 8/1981 | Fontan |
| 4,291,526 | A | 9/1981 | Hiyama et al. |
| 4,299,081 | A | 11/1981 | Harris et al. |
| 4,321,786 | A | 3/1982 | Burton |
| 4,333,266 | A | 6/1982 | Babo |
| 4,370,847 | A | 2/1983 | Arnaud |
| 4,383,400 | A | 5/1983 | Mead et al. |
| 4,391,085 | A | 7/1983 | Harris et al. |
| 4,435,950 | A | 3/1984 | Deux et al. |
| 4,601,129 | A | 7/1986 | Peev et al. |
| 4,638,705 | A | 1/1987 | Michel |
| 4,777,787 | A | 10/1988 | Warren |
| 4,860,529 | A | 8/1989 | Peterson et al. |
| 5,101,618 | A | 4/1992 | Oldridge |
| 5,339,612 | A | 8/1994 | Scott |
| 5,355,667 | A | 10/1994 | Scott |
| 5,423,166 | A | 6/1995 | Scott |
| 5,544,444 | A | 8/1996 | Oldridge |
| 5,970,689 | A | 10/1999 | Hoffman et al. |
| 6,145,291 | A | 11/2000 | Jarmain |
| 6,155,036 | A * | 12/2000 | Pellenc .................. 56/328.1 |
| 6,374,538 | B1 | 4/2002 | Morris et al. |
| 6,378,282 | B1 | 4/2002 | Carlton |
| 6,463,725 | B1 | 10/2002 | Briesemeister |
| 2003/0033749 | A1 | 2/2003 | Morris et al. |

FOREIGN PATENT DOCUMENTS

| | | |
|---|---|---|
| DE | 41 03 915 A1 | 8/1992 |
| DE | 197 13 452 A1 | 10/1998 |
| EP | 0 053 570 A1 | 6/1982 |
| EP | 0 873 681 A2 | 10/1998 |
| FR | 2 604 858 A1 | 4/1988 |
| FR | 2 768 015 A1 | 3/1999 |
| WO | WO 2004/089063 A2 | 10/2004 |

OTHER PUBLICATIONS

American Journal Enology Viticulture, vol. 46, No. 1, 1995, Figs. 7, 2, and text therefor.

Benedict, R.H., J.R. Morris, J.W. Fleming and D.R. McCaskill; Effects of Temperature on Quality of Mechanically Harvested Concord Grapes; pp. **; **; Arkansas Farm Research vol. XXII, No. 1, Jan.-Feb.

Cargnello, G. and L. Lisa.; Mechanical winter pruning of GDC trained vineyards; pp. 270-73; 1980; In:#UCS Grape and Wine Centennial Symposium Proc. Univ Calif, Davis.

Cawthon, D.L. and J.R. Morris; Yield and Quality of 'Concord' Grapes as Affected by Pruning Severity, Nodes Per Bearing Unit, Training System, Shoot Positioning, and Sampling Date in Arkansas; pp. 760-767; 1977; J. Amer. Soc. Hortic. Sci. 102(6), Nov.

Cawthon, D.L., and J.R. Morris, Evaluating New Training and Pruning Systems for Increasing Yield of 'Concord' Grapes; p. 6; ****; Arkansas Farm Research.

Childers, N. et al., "Modern Fruit Science Orchard and Small Fruit Culture," *Horticultural Publications*, pp. I, V, 480-484, 493 (1995).

Christensen, L.P., A.N. Kasimatis, J.J. Kissler, F. Jensen, and D.A. Luisi.; Mechanical harvesting of grapes for the winery; pp. -all-; 1973; Calif. Agr. Ext. Bul. AXT-403.

Clingeleffer, P.R. and J.V. Possingham; The role of minimal pruning of cordon trained vines (MPCT) in canopy management and its adoption in Australian viticulture; 280:7-11; 1987; Aust. Grapegrower and Winemaker.

Clingeleffer, P.R.; Update: Minimal pruning of cordon trained vines (MCPT); pp. 304:78-83; 1989; Aust. Grapegrower and Winemaker.

Dale, A., E.J. Hanson, D.E. Yarborough, R.J. McNicol, E.J. Stang, R. Brennan, J.R. Morris, G.B. Hergert; Mechanical Harvesting of Berry Crops; pp. V1:328-348; 1994; *****.

Davidson, D; Pride and tradition in hand pruning, but mechanization here to stay.; pp. 330:32-34; 1991; Aust. Grapegrower and Winemaker.

Di Collalto, G. and P.L. Pisani; The present situation and prospects for the integral mechanization of espalier grapevines; pp. 10:9, 19-24; 1983; Vignevini (Abstract Only).

Elia, P.; Mechanization in vineyards. Part 3.3. Winter pruning and the handling of prunings; pp. 10:41-54; 1986; Quaderni della Scuola di Specializzazione in Viticoltura ed Enologia (Abstract Only).

Elia, P., R. Meinardi; The study and design of an automatic non-straddling shoot positioner; pp. 45(14):97-104; 1989; Informatore Agrario (Abstract Only).

Elia, P.; Mechanization in vineyards. Part 3.4. Mechanical treatment of vines during the growing season.; pp. 10:55-66; 1986; Quaderni della Scuola di Specializzazione in Viticoltura ed Enologia (Abstract Only).

Flanagin, S.; Studying the Vine; p. E10; 1996; Northwest Arkansas Times, Sunday, Aug. 11.

Freeman, B.M. And B.R. Cullis; Effect of hedge shape for mechanical pruning of vinifera vines; pp. 32:21-25; 1981; Amer. J. Enol. Vitic.

Freeman, B.M.; Experiments on vine hedging for mechanical pruning: pp. 261-263; 1980; In:UCD Grape and Wine Centennial Symposium Proc., Univ. Calif., Davis.

Gallagher; Advertisement—Gallagher Leaf Remover; p. 56; 1996; The Australian Grapegrower & Winemaker, Jul.

Gil Sierra, J. and J. Ortiz-Cañavate; Mechanization experience with pruning and harvesting in trained vineyards; pp. 293-298; 1988; Association Nacional de Ingnenieros Agrónomos, Zangosa, Spain (Abstract Only).

Hollick, R.R.; Mechanical pruning of vines in Australia; pp. 264-265; 1980; In: UCD Grpae and Wine Centennial Symposium Proc., Univ. Calif., Davis.

Intrieri, C., O. Silvestroni, S. Poni, and I. Filipetti; Productivity and profitability in vineyards with various levels of mechanization and at different planting densities; pp. 17:10, 53-58, 1990; Vignevini (Abstract Only).

Intrieri, C. and B. Marangoni; The alternate "up-down" mechanical pruning system: Experiments on vines GDC trained (*V. vinifera cv.* Montuni); pp. 266-269; 1980; In: UCD Grape and Wine Centennial Symposium Proc., Univ. Calif., Davis.

Lakso, A.N.; Viticultural and physiological parameters limiting yield; pp. 9-14; 1993; Proc. 2nd N.J. Shaulis Grape Symposium. Fredonia State University, Fredonia, NY.

Ludvigsen, R.K.; Vine training a key to future economic success of a vineyard.; pp. 318:15-24; 1990; Aust. Grapegrower and Winemaker.

Luvisi, D.A. and P.R. Clingeleffer; Australian test of mechanical pruning; pp. 30-31; 1988; Wines and Vines, Feb.

Magriso, Yu. and A. Pavlov; Possibilities of mechanical pruning of ripe grapevine wood; pp. 25(7):81-85; 1988; Rasteniev dni Nauki (Abstract Only).

Morris, J.R., C.A. Sims, J.E. Bourque, and J.L. Oakes; Effects of Training and Pruning Systems on Yield of French-American Hybrid Wine Grapes; p. 7; 1984; Arkansas Farm Research, Jan.-Feb.

Morris, J.R., C.A. Sims, and D.L. Cawthon; Yield and Quality of 'Niagara' Grapes as Affected by Pruning Severity, Nodes per Bearing Unit, Training System, and Shoot Positioning; pp. 186-191; 1985; J. Amer. Soc. Hort. Sci. 110(2).

Morris, J.R. and D.L. Cawthon; Yield and Quality Response of 'Concord' Grapes to Training Systems and Pruning Severity in Arkansas; pp. 307-310; 1980; J. Amer. Soc. Hort. Sci. 105(3).

Morris, J.R.; Approaches to More Efficient Vineyard Management; pp. 20(6):1008-13; 1985; HortScience, vol. 20(6), Dec.

Morris, J.R., D.L. Cawthon, and C.A. Sims; Effects of Training System, Pruning Severity, Nodes Per Bearing Unit and Shoot Positioning on Yield and Quality of Concord Grapes; p. 7, 1985; Arkansas Farm Research, May-Jun.

Morris, J.R., C.A. Sims, J.E. Bourque, and J.L. Oakes; Influence of Training System, Pruning Severity, and Spur Length on Yield and Quality of Six French-American Hybrid Grape Cultivars; pp. 23-27; 1984; Am. J. Enol. Vitic., vol. 35, No. 1.

Morris, and D.L. Cawthon; Response of 'Concord' Grapes to Training Systems and Pruning Severity; p. 12; ****; Arkansas Farm Research.

Morris, J.R. and D.L. Cawthon; Mechanical Trimming and Node Adjustment of Cordon-Trained 'Concord' Grapevines; pp. 310-313; 1980; J. Amer. Soc. Hort. Sci. 105(3).

Morris, J.R., D.L. Cawthon, and J.W. Fleming; Effect of mechanical pruning on yield and quality of 'Concord' grapes; pp. 24(3):12; 1975; Ark. Farm Res.

Morris, J.R., S.E. Spayd, and D.L. Cawthon; Effects of Irrigation, Pruning Severity and Nitrogen Levels on Yield and Juice Quality of Concord Grapes; pp. 229-233; 1983; Am. J. Enol. Vitic., vol. 34, No. 4.

Morris, J.R.; Influence of Mechanical Harvesting on Quality of Small Fruits and Grapes; pp. 412-417; 1983; HortScience 18(4), Aug.

Morris, J.R.; Fruit Utilization and Mechanization; p. 10; 1988; Arkansas Farm Research, May-Jun.

Morris, J.R., D.L. Cawthon, and C.A. Sims; Long-Term Effects of Pruning Severity, Nodes Per Bearing Unit, Training System and Shoot Positioning on Yield and Quality of 'Concord' Grapes; pp. 676-683; 1984; J. Amer. Soc. of Hort. Sci. 109(5).

Morris, J.R., J.W. Fleming, R.H. Benedict, and D.R. McCaskill; Effects of Sulfur Dioxide on Postharvest Quality of Mechanically Harvested Grapes; p. 5; 1972; *****, Mar.-Apr.

Morris, J.R. and D.L. Cawthon, Yield and Quality Response of 'Concord' Grapes to Mechanized Vine Pruning; p. 13; 1981; Arkansas Farm Research, Nov.-Dec.

Morris, J.R. and D.L. Cawthon; Yield and Quality Response of Concord Grapes (*Vitis labrusca* L.) to Mechanized Vine Pruning; pp. 32:280-282; 1981; Amer. J. Enol. Vitic.

Morris, J.R., and D.L. Cawthon; Mechanical Pruning of Cordon-Trained 'Concord' Grapevines; p. 12; ***; Arkansas Farm Research, *month***.

Morris, J.R., J.W. Fleming, R.H. Benedict, and D.R. McCaskill; Maintaining Juice Quality of Concord Grapes Harvested Mechanically; p. ***; ***; Arkansas Farm Research vol. XXII, No. 1, Jan.-Feb.

Morris, J.R.; Fruit and Vegetable Harvest Mechanization; pp. 97-101; 1990; Food Technology, Feb.

Morris, Justin R. Vineyard mechanization & grape processing program. Date unknown. Institute of Food Science and Engineering, Division of Agriculture, University of Arkansas.

Nikiforova, L.T., N. L. Semelyanskii., F.T. Pavoloi, and I.I., Gridasov; Mechanized purning and the productivity of high-stem grapevines; pp. 2:37-39; 1990; Sadovodstvo i Vinogradarstvo (Abstract Only).

Pavlov, A.; Mechanized pruning of mature wood in grapevines; pp. 24(12):103-06; 1987; Rasteniev dni Nauki (Abstract Only).

Peikov, V., D. Karapetkov, and A. Georgiev; Mechanized pruning of the green parts of the grapevines; pp. 24(2):21-29; 1987; Selskostopanska Tehnika (Abstract Only).

Petrucci, V.E., C.D. Clary, and M. O'Brien; Grape harvesting systems; pp. 525-574; 1983; In: M. O'Brien, B.F. Cargill, and R.B. Fridley (eds.). Principles and practices for harvesting and handling furits and nuts. AVI Pub., Westport, Conn.

Pollock, J.G., E.S. Shepardson, N.J. Shaulis, and D.E. Crowe; Mechanical pruning of American hybrid grapevines; pp. 20:817-821; 1977; Trans. Amer. Soc. Agr. Eng.

Poni, S. and P. Argnani; Mechanical pruners for vineyards; pp. 15(10):33-40; 1981; Vignevini (Abstract Only).

Pool, R.M., R.E. Dunst, D.C. Crowe, H. Hubbard, G.E. Howard, and G. DeGolier.; Predicting and Controlling Crop on Machine or Minimal Pruned Grapevines; pp. 31-45; 1993; Proceedings of the 2nd N.J. Shaulis Grape Symposium. Fredonia State University. Fredonia, NY. Jul. 13-14, 1993.

Pool, R.M., D. Crowe, and R. Dunst; The Use of Combined Mechanical or Minimal Pruning and Mechanical Thinning in New York Production Systems; pp. -all-; 1988; Presented at 2nd Int. Seminar on Mechanical Pruning of Vineyards. Treviso, Italy, Feb. 1988.

Pool, R.M.; Thin Grapes Mechanically; pp. 107(10):17-19; 1987; Amer. Fruitgrower.

Pool, R.M., et al; Pruning Mechanism and Crop Control, Proceeding of the Second Nelson J. Shaulis Grape Symposium; pp. i-iii, 1-68; 1993; New York State Agricultural Experiment Station, Cornell University, Geneva, New York 14456.

Sevila, F.; Vine growing: From Mechanization to Automation; pp. 329:67-77; 1985; Bulletin d-Information du CEMAGREF (Abstract Only).

Shaulis, N.J., J. Pollock, D. Crowe, and E.S. Shepardson; Mechanical Pruning of Grapevines; progress 1968-1972; pp. 118:61-69; 1973; Proc. New York State Hort. Sci.

Shaulis, N.J., E.S. Shepardson and J.C. Moyer; Grape Harvesting Research at Cornell; pp. 250-254; 1960; The New York State Horticultural Society Proceedings of the One Hundred and Fifth Annual Meeting.

Shaulis, N., H. Amberg, and D. Crowe; Response of Concord Grapes to Light, Exposure and Geneva Double Curtain Training; pp. 89:268-280; 1966; Proc. Amer. Soc. Hort. Sci.

Smart, R.E.; Shoot Positioning—The Way of the Future; pp. 331:30-32; 1991; Aust. Grapegrower and Winemaker.

Smart, R., and M. Robinson; Sunlight into Wine; pp. i-viii, 1-88; 1991; Adelaide.

Spayd, S.E., and J.R. Morris; Influence of Irrigation, Pruning Severity, and Nitrogen on Yield and Quality of 'Concord' Grapes in Arkansas; pp. 211-216; 1978; J. Amer. Soc. Hort. Sci. 103(2).

Spezia, G.; Automatic Secatuers for Winter Pruning in Vineyard; pp. 16:11, 27-29; 1989; Vignevini (Abstract Only).

Stephens, D.; Redirect Winegrape Vigor With Scott Henry Trellis; pp. 33, 36; 1996; Fruit Grower, May.

Tasssie, L.; Canopy Management and Development in NZ-Part II: Developments in NZ; pp. 309:13-16; 1989; Aust. Grapegrower and Winemaker.

U.R. Machinery Picking Head Sales Brochure.

Vannucci, D.; Viticulture: Mechanization in 1983; pp. 10:7,8, 15-23; 1983; Vignevini (Abstract Only).

Vromandt, G; Pruning Is No game; pp. 128:54-62; 1989; Viti.

* cited by examiner

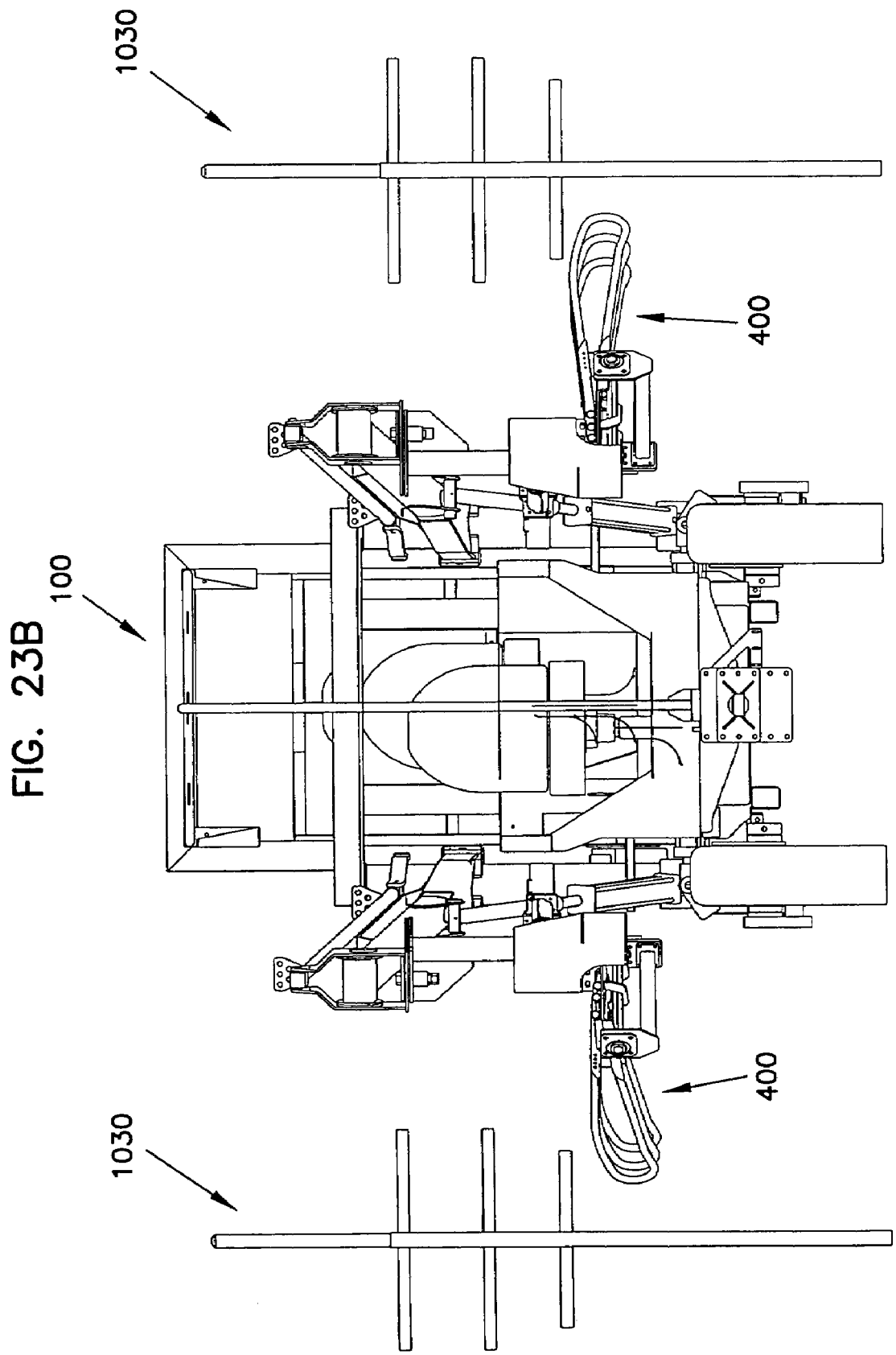

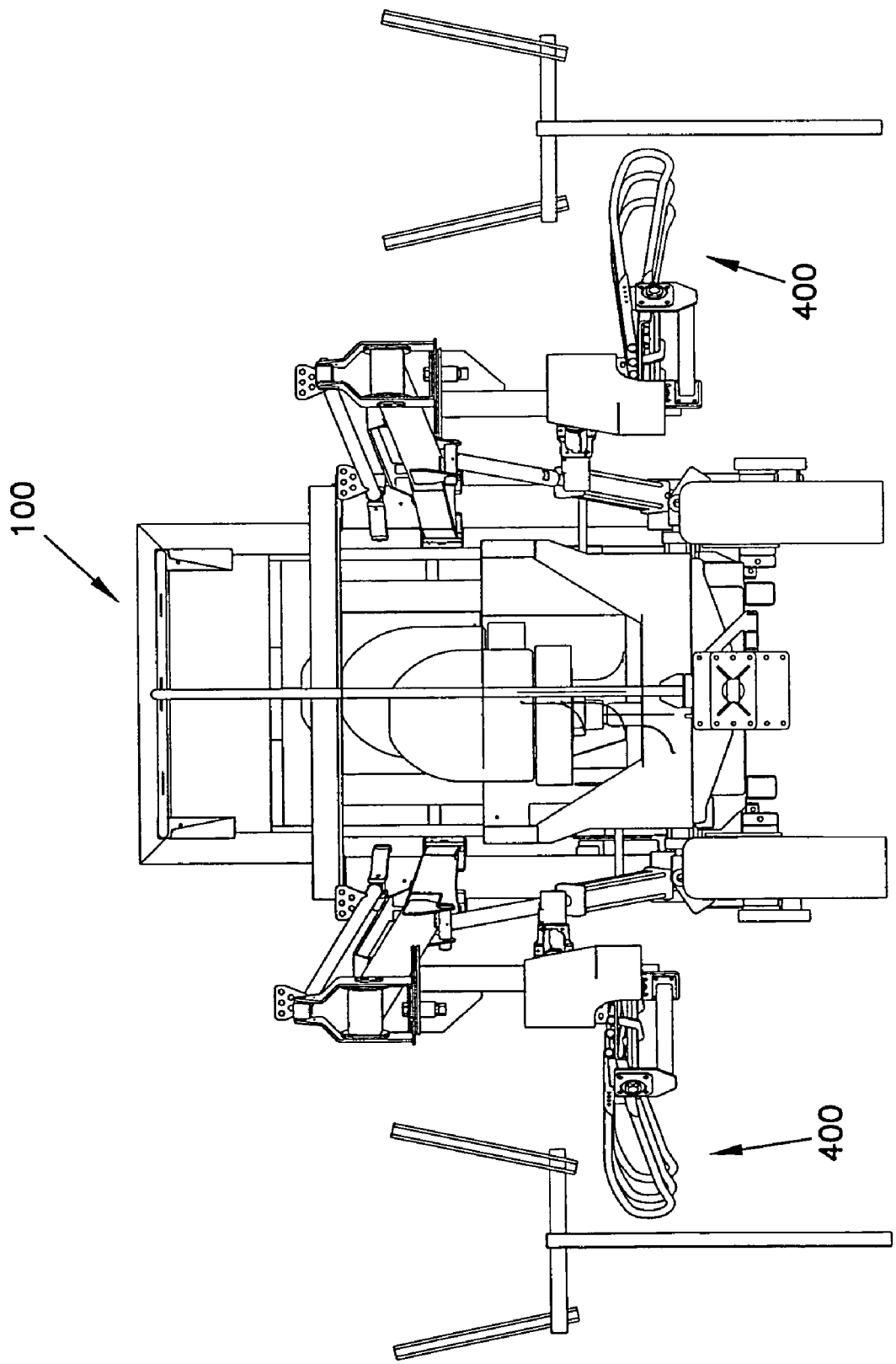

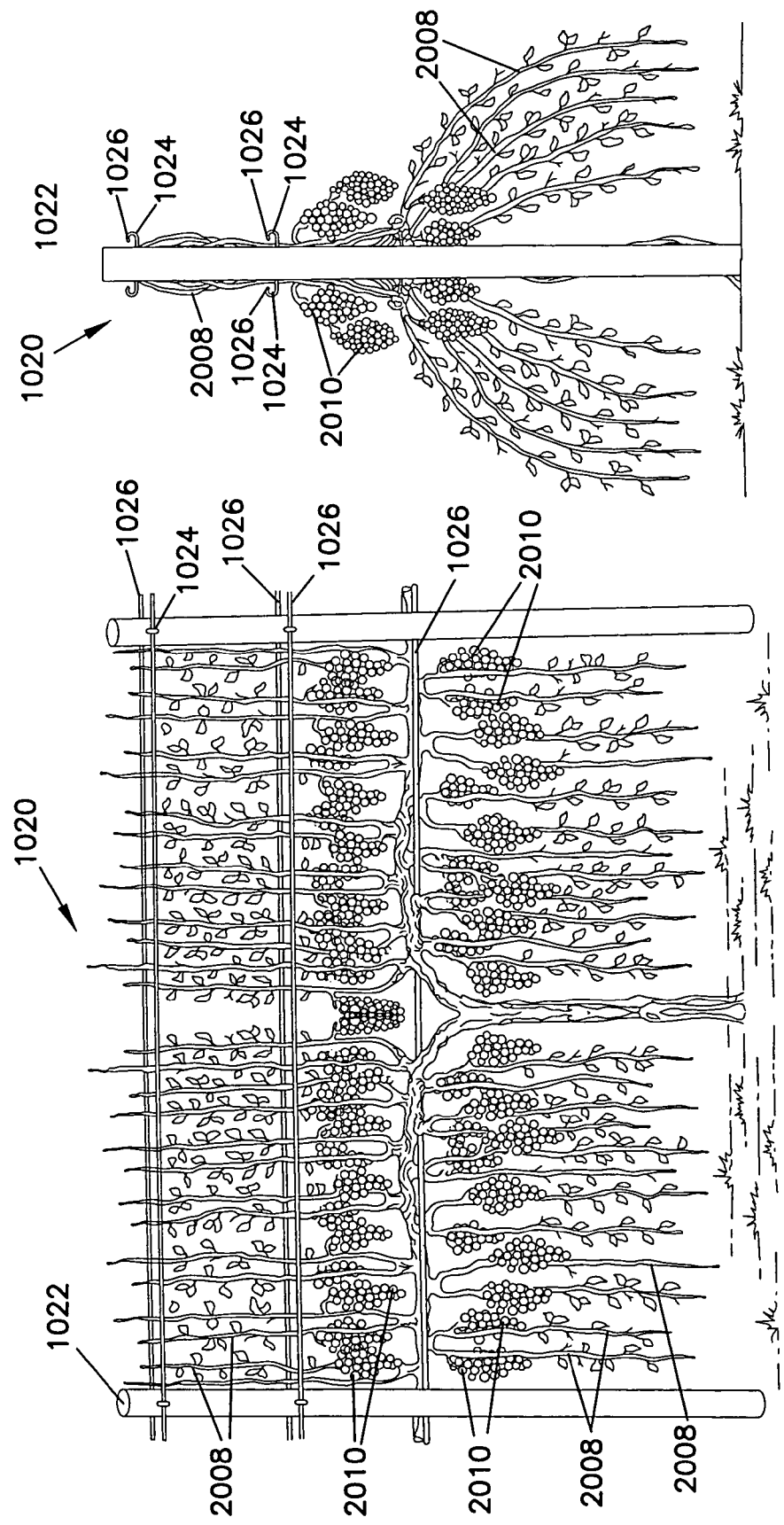

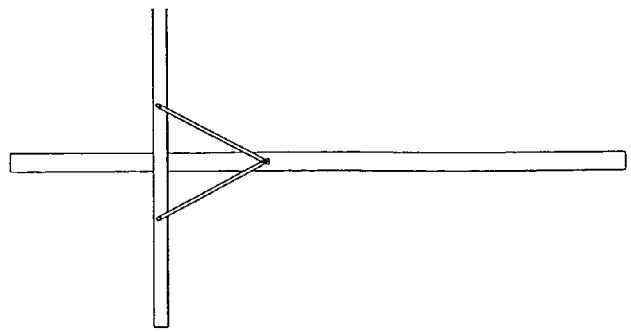
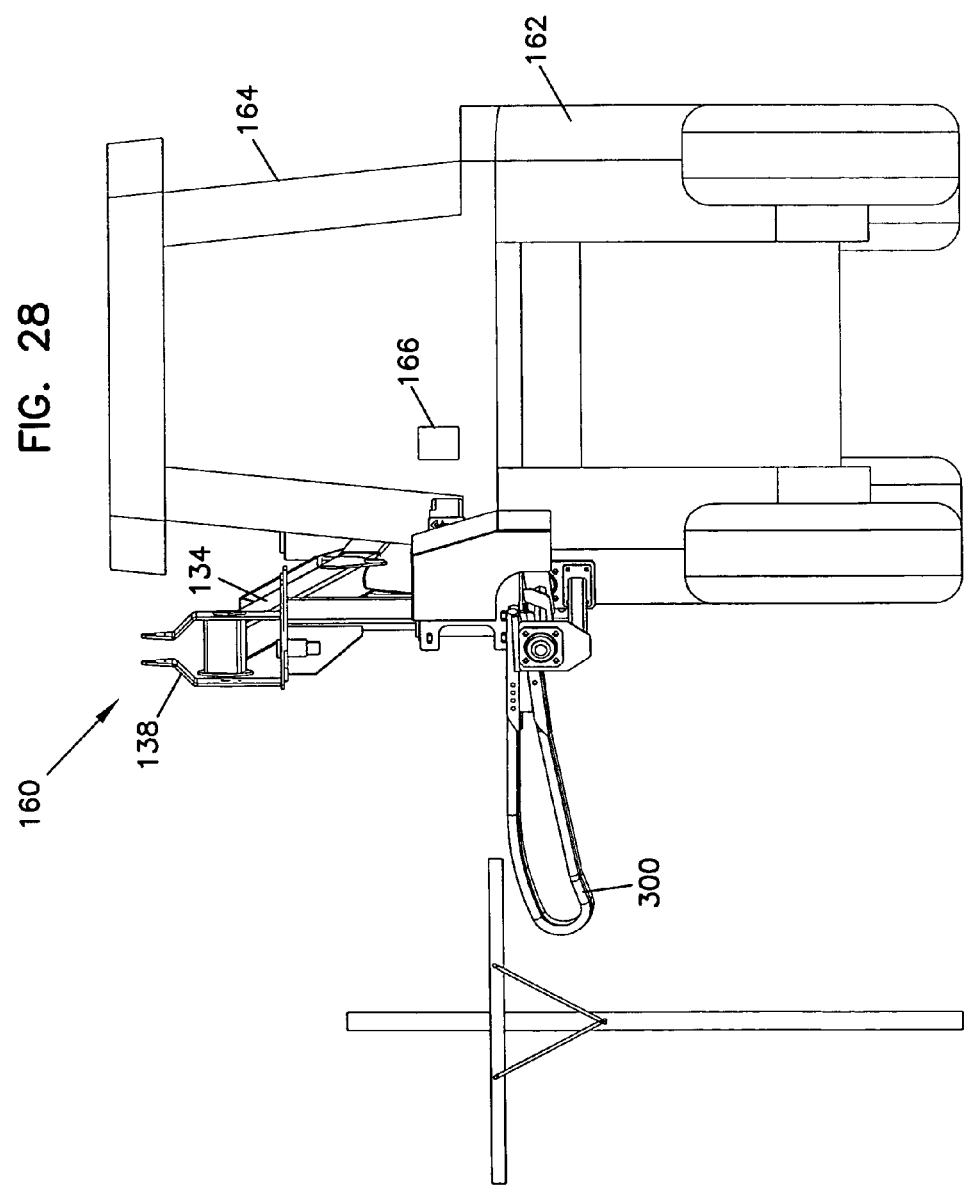
FIG. 28

FIG. 39
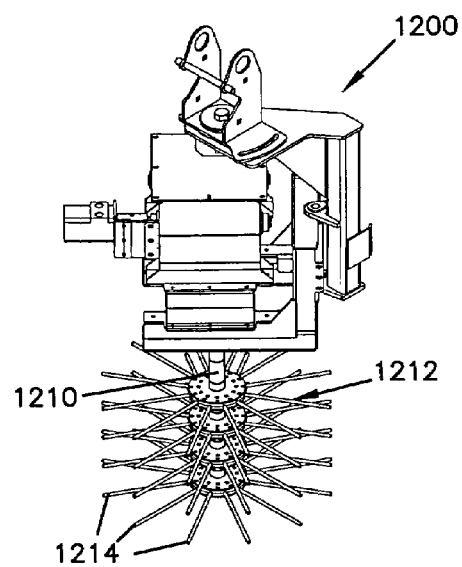
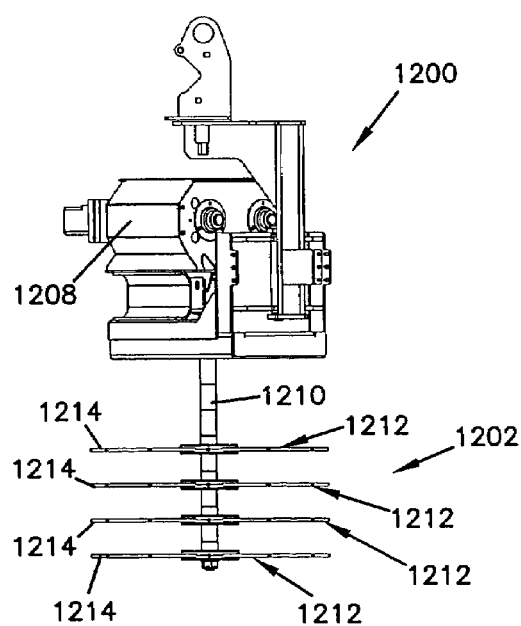
FIG. 40
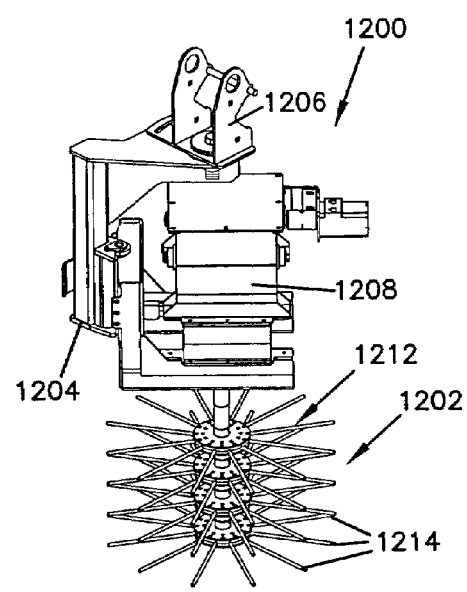
FIG. 38

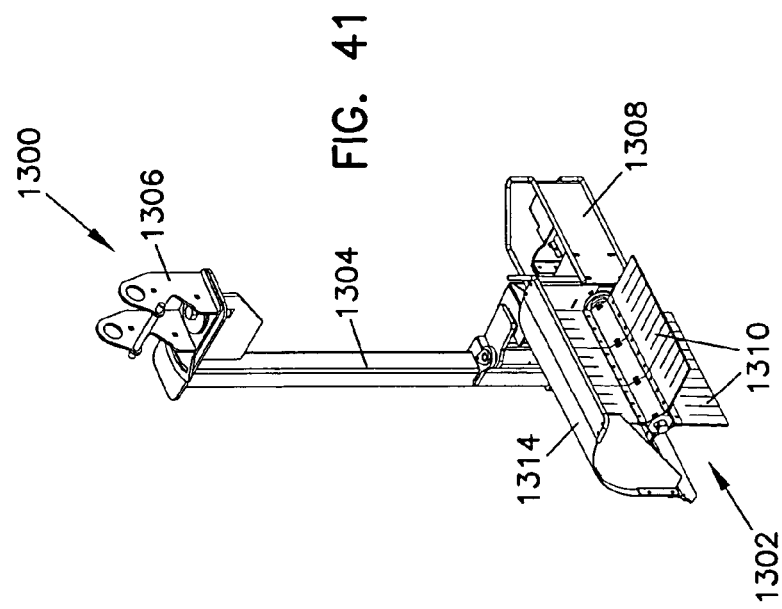
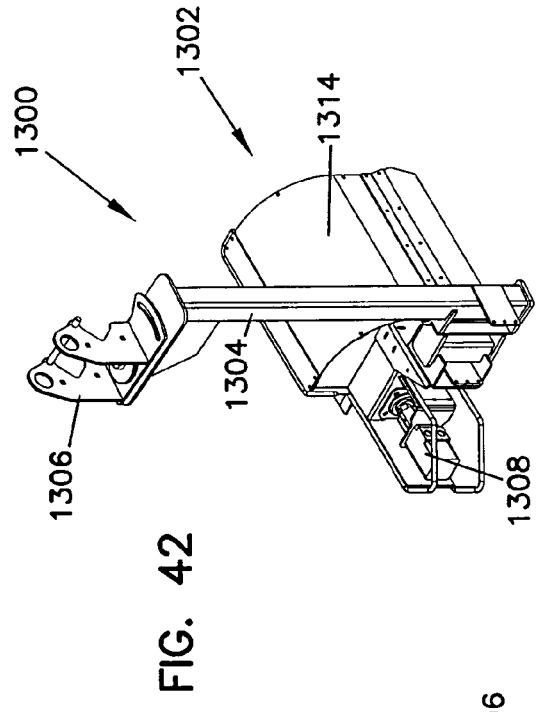
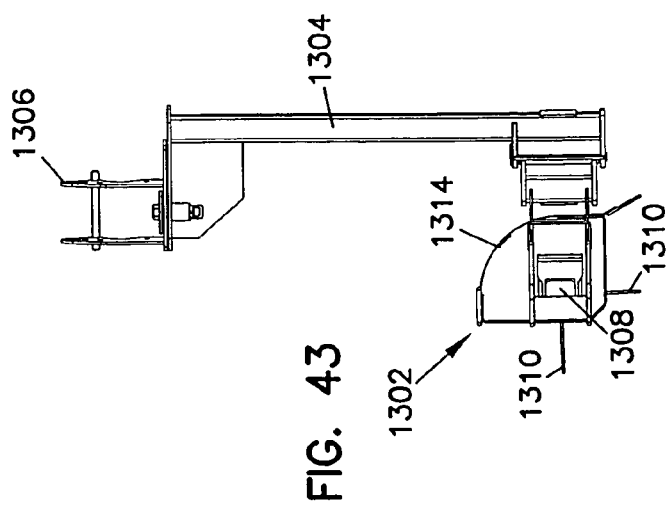

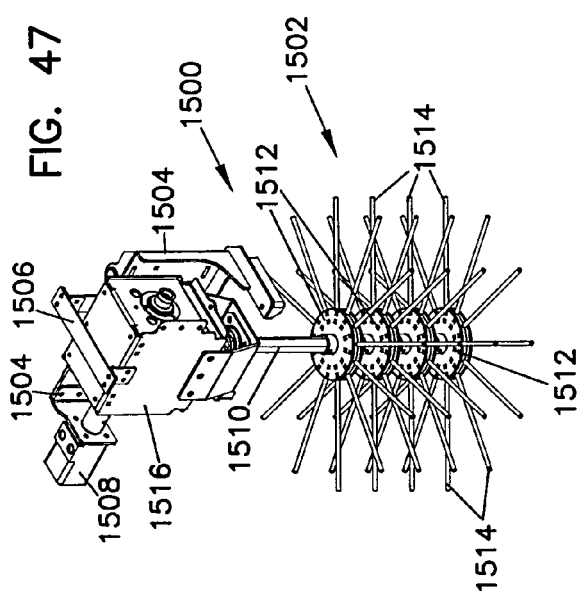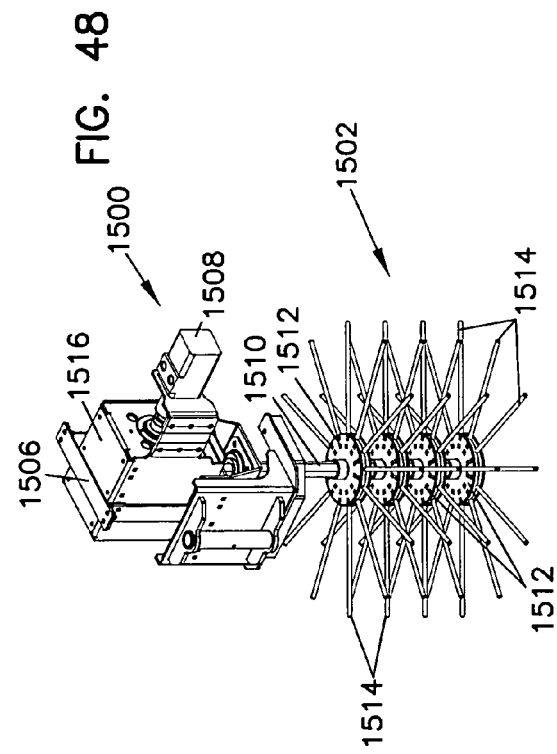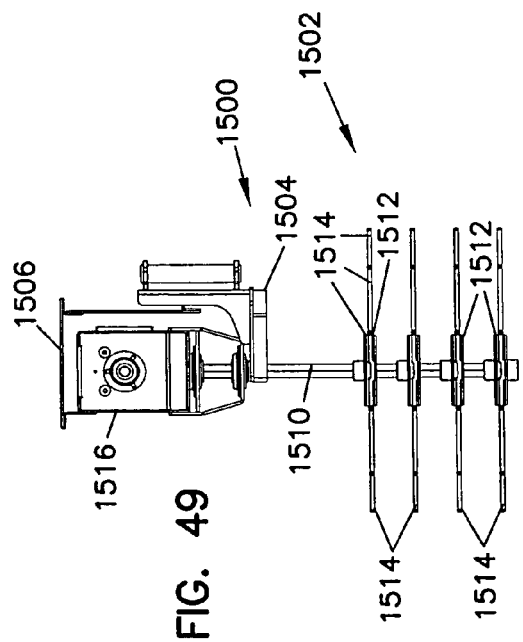

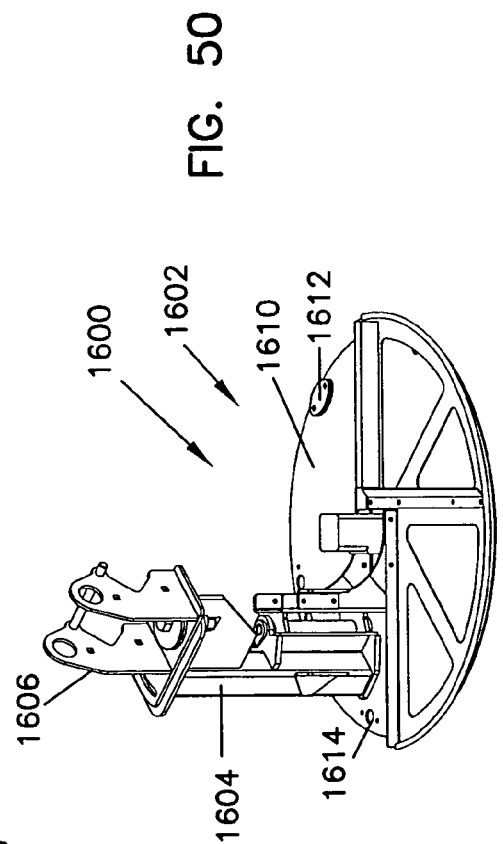
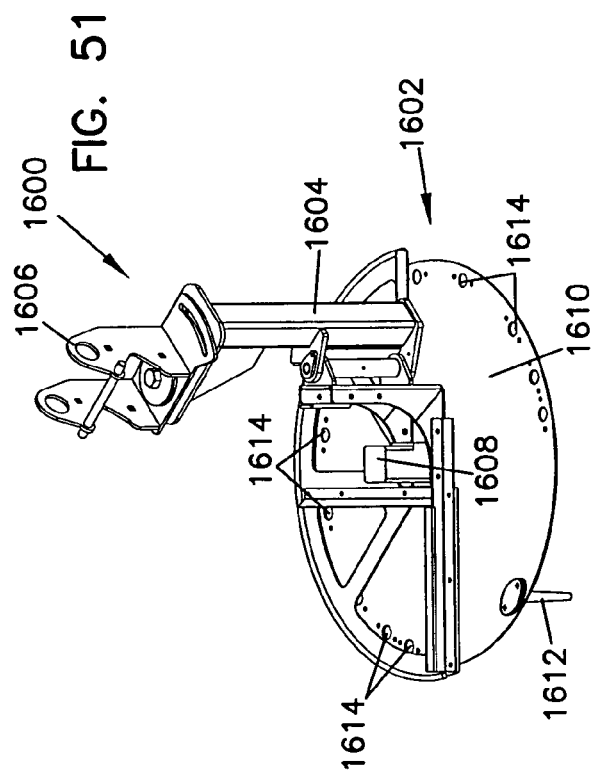
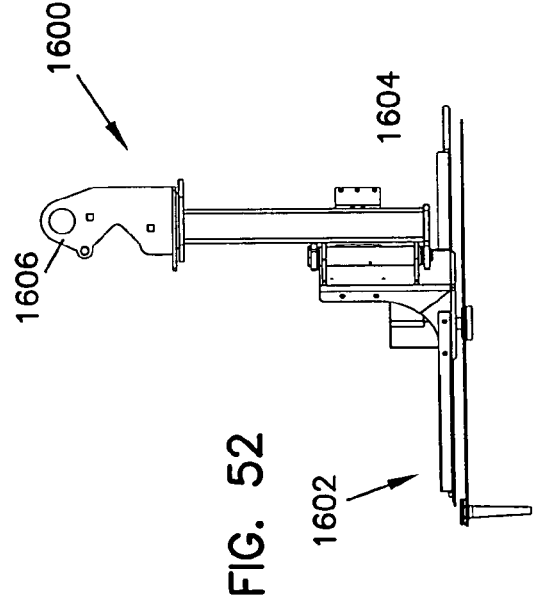

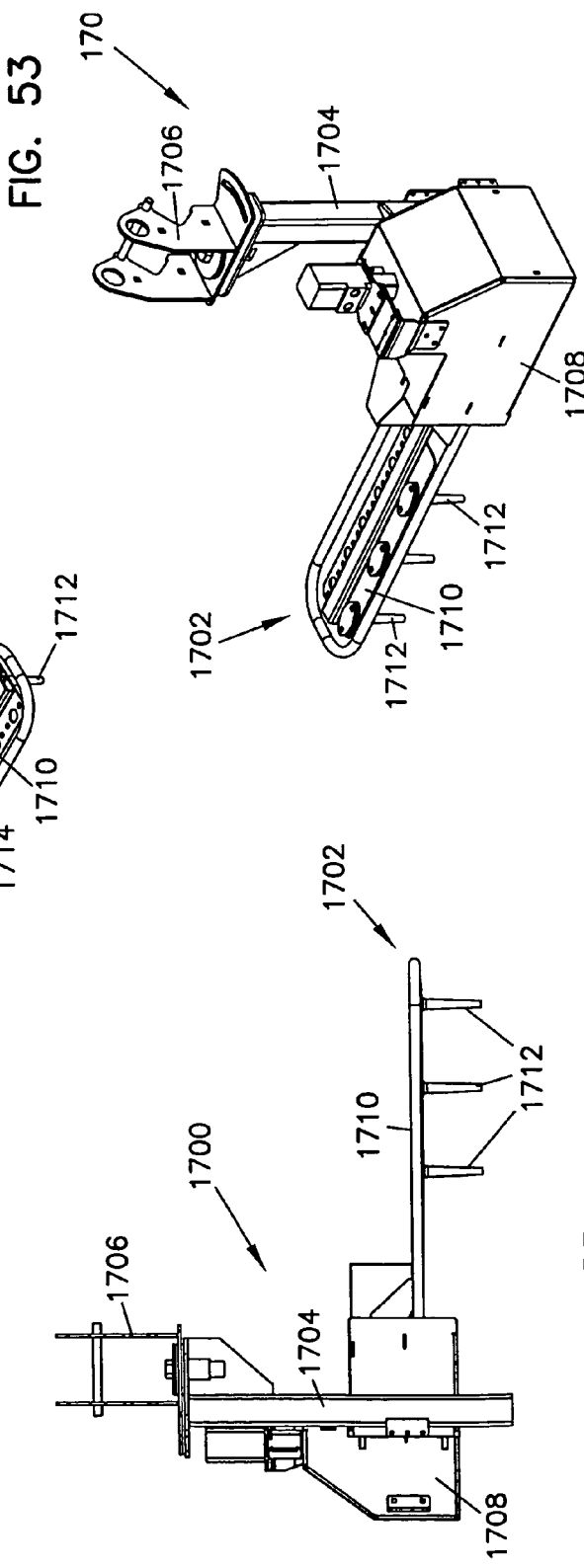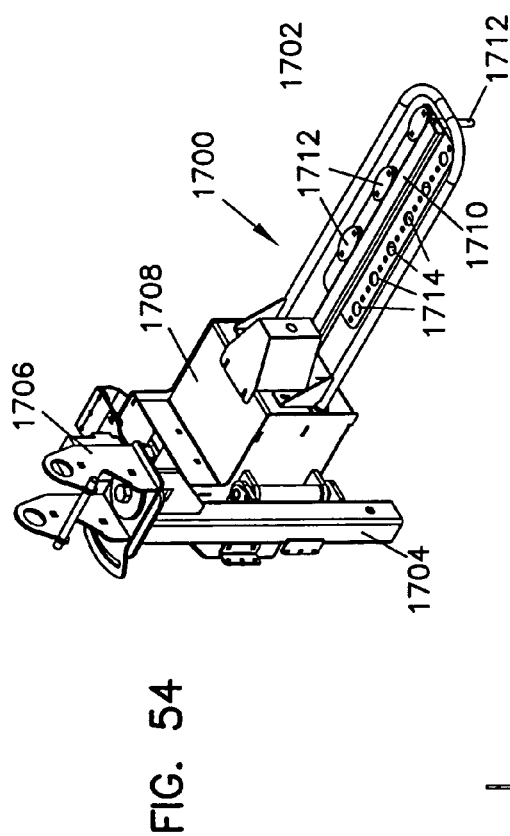

FIG. 61

Quality Management System

Company Information
　　Company Name ☐

User ID Information [Vineyard Owner ▼]

User Detail Information

| | |
|---:|---|
| Vineyard Name | ☐ |
| First Name | ☐ |
| Last Name | ☐ |
| QMS Logon Name | ☐ |
| QMS Logon Password | ☐ |
| Street Address | ☐ |
| City | ☐ |
| State | ☐ |
| Zip Code | ☐ |
| Office Phone | ☐ |
| Mobile Phone | ☐ |
| Home Phone | ☐ |
| Fax Number | ☐ |

[Save and Exit]　[Save and New]

FIG. 62

Quality Management System

Shoot Thinning Database

| | |
|---|---|
| Date and Time | |
| Company Name | |
| Vineyard Name | ▾ |
| User Logon Name | |
| Block Designation | ▾ |

Data Collection Location Midpoint

☐ Non-GPS    Row # [ ]    Vine # [ ]    Cordon [ ▾ ]
◉ GPS    Latitude [ ]    Longitude [ ]

Data Collection Segment Size

Length Of Cordon Wine Sampled or Counted [ ]    ○ Meters   ◉ Feet

Data Collection Type

☐ Pre-Thinning Shoot Counts    Total Count [ ]
☐ Pre-Thinning Cluster Counts    Total Count [ ]
☐ Pre-Thinning Shoot Counts    Total Count [ ]
☐ Pre-Thinning Cluster Counts    Total Count [ ]

[ Save and Exit ]    [ Save and New ]

FIG. 63

Quality Management System
Fruit Thinning Database

| | |
|---|---|
| Date and Time | |
| Company Name | |
| Vineyard Name | ▼ |
| User Logon Name | |
| Block Designation | ▼ |

Data Collection Location Midpoint

☐ Non-GPS   Row #   [ ]   Vine #   [ ]   Cordon [ ▼ ]
◉ GPS       Latitude [ ]              Longitude [ ]

Data Collection Segment Size

Length Of Cordon Wine Sampled or Counted  [ ]   ○ Meters
                                                ◉ Feet Data Collection Type ☐ Pre-Thinning Cluster Counts      Total Count  [ ]
☐ Pre-Thinning Green Yield Weight  Total Count  [ ]
☐ Pre-Thinning Cluster Counts      Total Count  [ ]
☐ Pre-Thinning Yield Weight        Total Count  [ ]

[ Save and Exit ]  [ Save and New ]

FIG. 64

Quality Management System
Off Season Pruning Database

Date and Time
Company Name
Vineyard Name
User Logon Name
Block Designation

Data Collection Location Midpoint

☐ Non-GPS     Row #          Vine #          Cordon
◉ GPS         Latitude                       Longitude Data Collection Segment Size Length Of Cordon Wine Sampled or Counted          ○ Meters
                                                  ◉ Feet Data Collection Type ☐ Pruning Weights    Total Count
☐ Mature Canes       Total Count
☐ Mature Nodes       Total Count
☐ Nodes Retained     Total Count

[Save and Exit]  [Save and New]

CONTROL APPARATUS AND METHOD

BACKGROUND OF THE INVENTION

1. Field of the Invention

The present invention relates to an automated vineyard management system for managing grape quality and yield while lessoning dependence on manual labor to accomplish required practices.

2. Description of the Prior Art

Heretofore, grapes have been primarily cultivated utilizing manual labor with the various trimming, thinning and other removal of excess portions of the grape vine foliage accomplished primarily by hand. Although some of the steps in grape cultivation have been mechanized, an overall system providing for management and control of the devices utilized for the various operations have been limited to devices dedicated to a specific step. Moreover, the various operations have not been coordinated into one coherent system while providing management information and feedback to control the mechanized operations.

Although dedicated agricultural implements have been utilized in the past, a system has not been provided that coordinates the various operations. Moreover, prior systems have not provided management to control the various operations to arrive at a desired yield that maximizes fruit quality. Heretofore, there have not been systems that would allow for controlling the speed of the machinery, as well as accounting for the variety of grape, the desired yield and other viticultural characteristics.

It can be seen that a new and improved management system is needed for cultivation of grapes that minimizes the labor needed and that utilizes mechanical methods for controlling production. A management system should provide for controlling various machinery and for measuring the effects of the machinery for certain processes. Such a system should also provide for vehicle management controls that maintain predetermined operational parameters. A management system should also track historical data to aid in conducting various cultivation operations and the level at which the mechanized systems should be operated. The present invention addresses these problems as well as others associated with mechanized grape cultivation.

SUMMARY OF THE INVENTION

The present invention is directed to a mechanized agricultural management apparatus, and in particular, to a mechanized system for use in vineyard thinning and growth management.

The management system includes a mechanized system that in one embodiment includes a chassis that may be towed or self-propelled with first and second manually operated booms mounted to extend outward on either side. Each of the booms is independently actuated and controlled by an associated operator seated on the mechanized system. The first and second booms are laterally and vertically adjustable so that they may be positioned properly relative to the grapevine and trellis during operation. The boom supports various types of interchangeable mechanized accessories such as vertical impactors, horizontal impactors, shoot thinners, hedgers, trunk cleaners, wire lifters, shoot positioners and other accessories that may be utilized for removing the unwanted foliage and improving the growth habits of grapes. In addition, the various accessories may be interchanged to provide improved matching of the device to the operation being performed. For many accessories, the striker elements may be interchanged with others having different rigidity, different lengths, different sizes and different shapes. Moreover, the number of striker elements for each device may be varied.

In one embodiment, the striker devices and the booms are actuated hydraulically. Position may be precisely tracked with a Global Positioning System (GPS). The mechanized system may include a speed sensor such as a pulse pickup device in conjunction with a radar device or wheel speed pick-up device measuring travel speed and a controller that adjusts hydraulic flow and therefore, accessory speed. In this manner, the mechanized cultivation operations are performed with the accessory operating at an optimum speed in relation to the vehicle travel speed.

It is also foreseen that for some applications, only a smaller mechanized system may be necessary, such as for smaller vineyards. For such applications, a second embodiment of a mechanized system may be used with a single boom mounted to a tractor. For some applications, the system may be mounted to an over the row chassis.

In addition to the mechanized system machinery, the present invention includes controls for the system. The controller includes programmable inputs so that parameters relating to the vineyard and grape variety may be entered as well as characteristics of the accessory being utilized to the job being performed. Desired results may be entered so that the proper degree of thinning is accomplished automatically through the controller. The mechanized system may also include a weighing station that measures the amount of growth, such as shoots and berries, being removed and collected so that adjustments may be made in real time to the speed of the accessories and therefore the amount of thinning. In one embodiment, the weighing device is pulled alongside the chassis for on-the-go fruit and berry measurement so that continuous monitoring and adjustment are possible. With such an arrangement, the operator of each accessory may concentrate on positioning of the accessory rather than varying the speed of the accessory, which can be difficult as ground speed of the mechanized system increases and decreases.

It can be appreciated that the present invention also allows for input of other characteristics relating to the grapes, such as environmental conditions including temperature, rainfall, humidity and amount of sunlight. Further parameters relating to the vineyard and/or lot or tract being managed may also be entered. Information may be automatically input from the measurement devices on the mechanized equipment or recorded from hand sampling and counting. The controller may also include a display or a memory that can be saved for printouts provided to the vineyard manager or wine maker for ensuring that vineyard cultivation is properly managed. In addition, as information may be saved from year to year, various historical inputs may be saved and reset rather than being entered again and provide for more accurate predictions of the effects of the mechanized operations. Such an arrangement saves time and improves consistency. Moreover, such information may be vital for improving vineyard management as more data is accumulated.

It can be appreciated that the present device allows for a between-the-row, rather than an over-the-row management system that may perform thinning operations on two full or half rows of grapevines at the same time. Moreover, the present invention provides for mechanizing multiple operations with interchangeable accessories mounting on a single chassis. Controller management streamlines and optimizes the information management and improves speed as well as yield and quality through improved uniformity.

These features of novelty and various other advantages that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views:

FIGS. 23A-D are front elevational views of the apparatus shown in FIG. 1 and typical trellis systems;

FIG. 25 is a side elevational view of a ballerina trellis system and grape vines;

FIG. 26 is an end view of the trellis system and grape vines shown in FIG. 25;

FIG. 28 is a front elevational view of the mechanized vineyard management apparatus shown in FIG. 27;

FIG. 38 is a perspective view of yet another embodiment of a fruit thinner attachment for the mechanized vineyard management apparatus shown in FIG. 1;

FIG. 39 is an opposite perspective view of the fruit thinner attachment shown in FIG. 38;

FIG. 40 view of the fruit thinner attachment shown in FIG. 38;

FIG. 41 is a perspective view of a horizontal trunk cleaner attachment for the mechanized vineyard management apparatus shown in FIG. 1;

FIG. 42 is an opposite perspective view of the trunk cleaner attachment shown in FIG. 41;

FIG. 43 is a side view of the trunk cleaner attachment shown in FIG. 41;

FIG. 47 is a perspective view of an orbital fruit thinner attachment for the mechanized vineyard management apparatus shown in FIG. 1, FIG. 48 is an opposite perspective view of the orbital fruit thinner attachment shown in FIG. 47;

FIG. 49 is a side view of the orbital fruit thinner attachment shown in FIG. 47;

FIG. 50 is a perspective view of a rotary shoot thinner attachment for the mechanized vineyard management apparatus shown in FIG. 1;

FIG. 51 is an opposite perspective view of the rotary shoot thinner attachment shown in FIG. 50;

FIG. 52 view of the rotary shoot thinner attachment shown in FIG. 50;

FIG. 53 is a perspective view of a linear shoot thinner attachment for the mechanized vineyard management apparatus shown in FIG. 1;

FIG. 54 is an opposite perspective view of the linear shoot thinner attachment shown in FIG. 53;

FIG. 55 is a side view of the linear shoot thinner attachment shown in FIG. 53;

FIGS. 61-64 are information forms for the mechanized vineyard management apparatus shown in FIG. 1.

DETAILED DESCRIPTION OF THE PREFERRED EMBODIMENT

Figure 1:
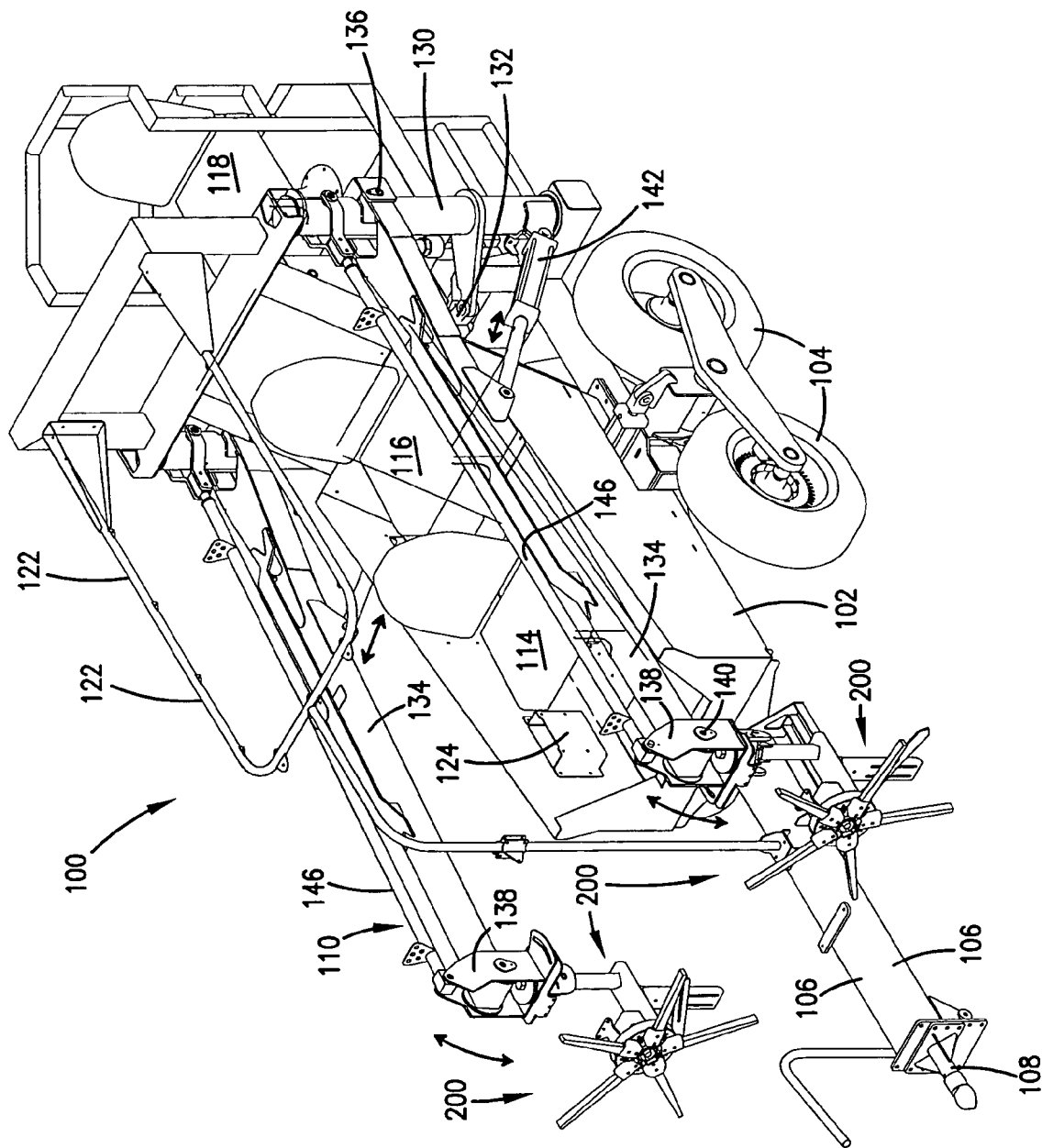
FIG. 1 shows a perspective view of a first embodiment of a mechanized vineyard management apparatus according to the principles of the present invention configured for vineyard shoot thinning.

Referring now to the drawings, and in particular to FIGS. 1-4, there is shown a mechanized vineyard management apparatus, generally designated 100. The mechanized system 100 is generally configured for mechanized performance of various thinning operations, as may typically occur in a vineyard. However, it can be appreciated that other applications in other agricultural industries could also utilize the present invention. The mechanized system 100 includes a chassis 102 mounted on wheel assembly 104. The mechanized system 100 includes a tongue 106 extending from the chassis 102 with a hitch 108 for attachment of a tractor (not shown). Although shown for a towable operation in the drawings, it can be appreciated that the mechanized system 100 may readily be configured as a self-propelled vehicle. Moreover, other types of hitches for towing by other types of vehicles are also contemplated by the present invention.

The mechanized system 100 includes a first boom assembly 110 and a second boom assembly 112 mounted on opposite sides of the chassis 102. Although two booms are shown, the mechanized system 100 could utilize a single boom or could utilize more than two booms, if required for certain applications. The mechanized system 100 includes a first operator seat 114, a second operator seat 116, and may include a rear observation seat 118 and platform. The mechanized system may include a position and/or speed sensor 120, such as a Global Positioning System (GPS) and/or a radar unit mounted at the rear platform. A canopy 122 protects the operators in a preferred embodiment. For clarity, only the frame of the canopy 122 is shown.

The boom assemblies 110 and 112 support various accessories as attachments that are interchangeably mountable to the booms 110 and 112. Such attachments are typically hydraulically driven. Hydraulic lines leading to the boom actuators and accessories may be driven from the power take-off of a towing tractor powering an auxiliary hydraulic pump and tank 120, such as are well known in the art, may be mounted on the mechanized system 100. For clarity, the hydraulic lines have been removed from the drawings, but such drive systems are commonly used and the attachment and routing of hydraulic lines are well known in the art.

The boom assemblies 110 and 112 are each controlled by an associated operator with a control module 124. The control module 124 includes controls such as a joystick for positioning the boom assemblies 110 and 112 vertically and laterally. The control module 124 may also actuate the various attachments, as explained hereinafter. The control modules 124 may also include displays for the operators including vehicle speed and operational speed of the attachment. In a preferred embodiment, the operational speed of the attachment may be pre-programmed and automatically varied to accomplish the desired degree of thinning. Such automatic adjustment of the accessory allows the operators to concentrate on positioning of the thinning accessory and without having to monitor and change the accessory operating speed. Moreover, as the operators are able to better control the position of the accessory, the quality of the operation is improved and may surpass that of hand thinning. The speed of the vehicle is also increased and operations such as shoot thinning have been accomplished in tests at operating speeds exceeding more than two miles per hour. Such unexpected and surprising results lead to decreased operational costs. Furthermore, the quality of the thinning is not impacted and thinning operations at such speeds have exceeded the requirements for grape quality.

Turning again to FIGS. 1-4, the boom assemblies 110 and 112 are each independently controlled by one of the operators. Both the height and relative lateral position of the boom may be varied by the operator. The booms 110 and 112 are rotatably mounted about a vertical axis on swivels 130. A piston 132 associated with each boom assembly causes the boom assemblies to rotate forward and away from the chassis 102. A boom arm 134 extends from the swivel 130 in a generally forward orientation so that the supported accessory is generally positioned forward of the operator so that both the upcoming portion of the vineyard and the accessory are in the operator's clear field of vision with the operator in a natural forward facing position. A hinge 136 allows the boom arm 134 to pivot upward and downward. An accessory support 138 is mounted at the forward end of each arm 134 and is configured to support various types of interchangeable mechanized vineyard management accessories, as explained hereinafter. The present system provides for mixing and matching various accessories in a controlled manner to perform mechanized operations to obtain desired vineyard management results. In FIGS. 1-4, the accessories for the boom assemblies 110 and 112 are supporting shoot thinners 200. However, such shoot thinners 200 are easily interchangeably mounted to the accessory support 138, as shown hereinafter. A hydraulic piston 142 mounts from the swivel 130 to an underside of the boom arm 134 and is actuated to raise or lower the boom arm. A top link 146 provides for constant vertical positioning of the supported accessory. The various accessories are typically supported in a hanging arrangement that allows some degree of relative movement should the boom or an accessory inadvertently strike an object such as a trellis or other unforeseen obstacle.

Figure 2:
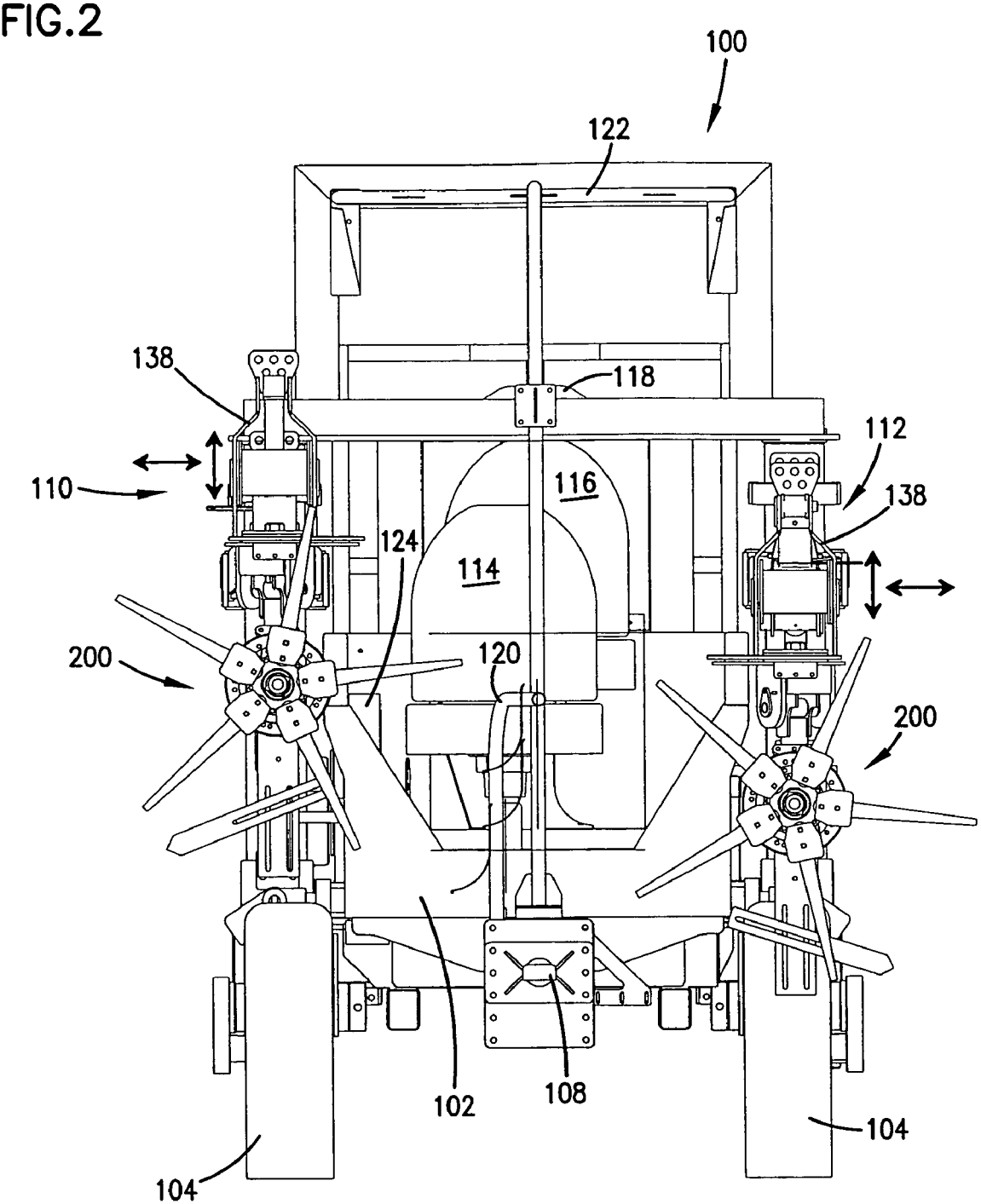
FIG. 2 is a front elevational view of the vineyard management apparatus shown in FIG. 1.
Figure 3:
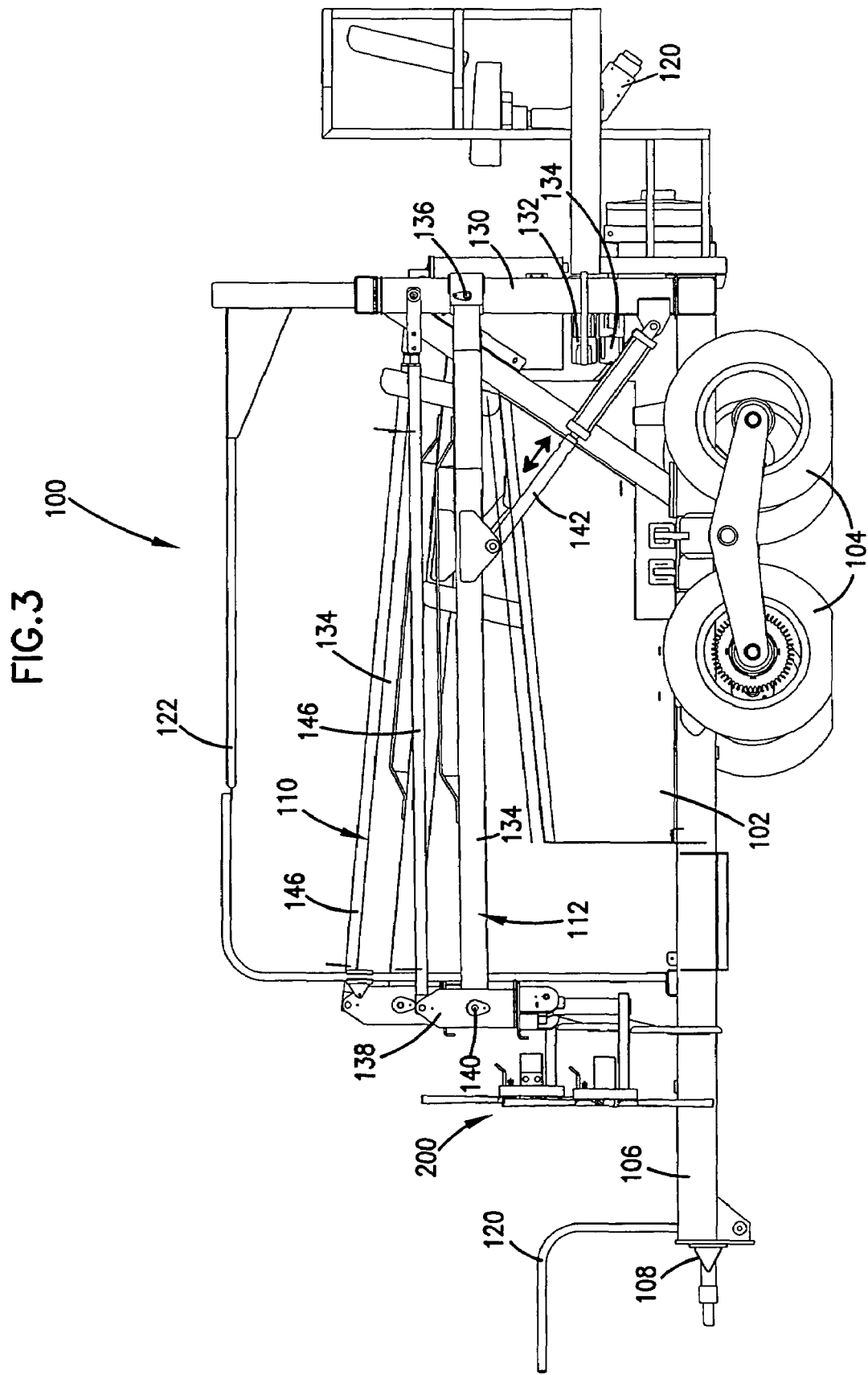
FIG. 3 is a side elevational view of the vineyard management apparatus shown in FIG. 1.
Figure 4:
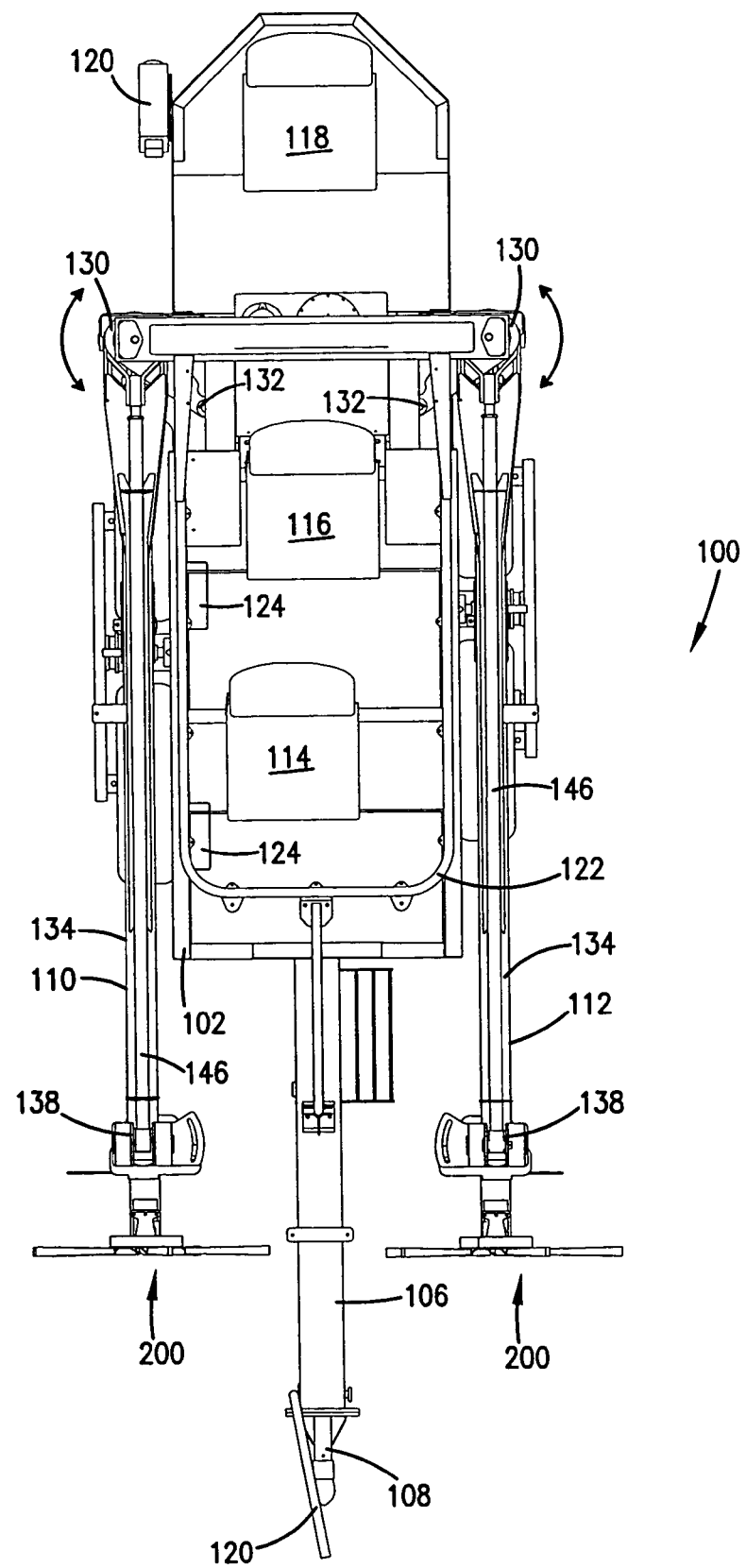
FIG. 4 is a top plan view of the vineyard management apparatus shown in FIG. 1.
Figure 5:
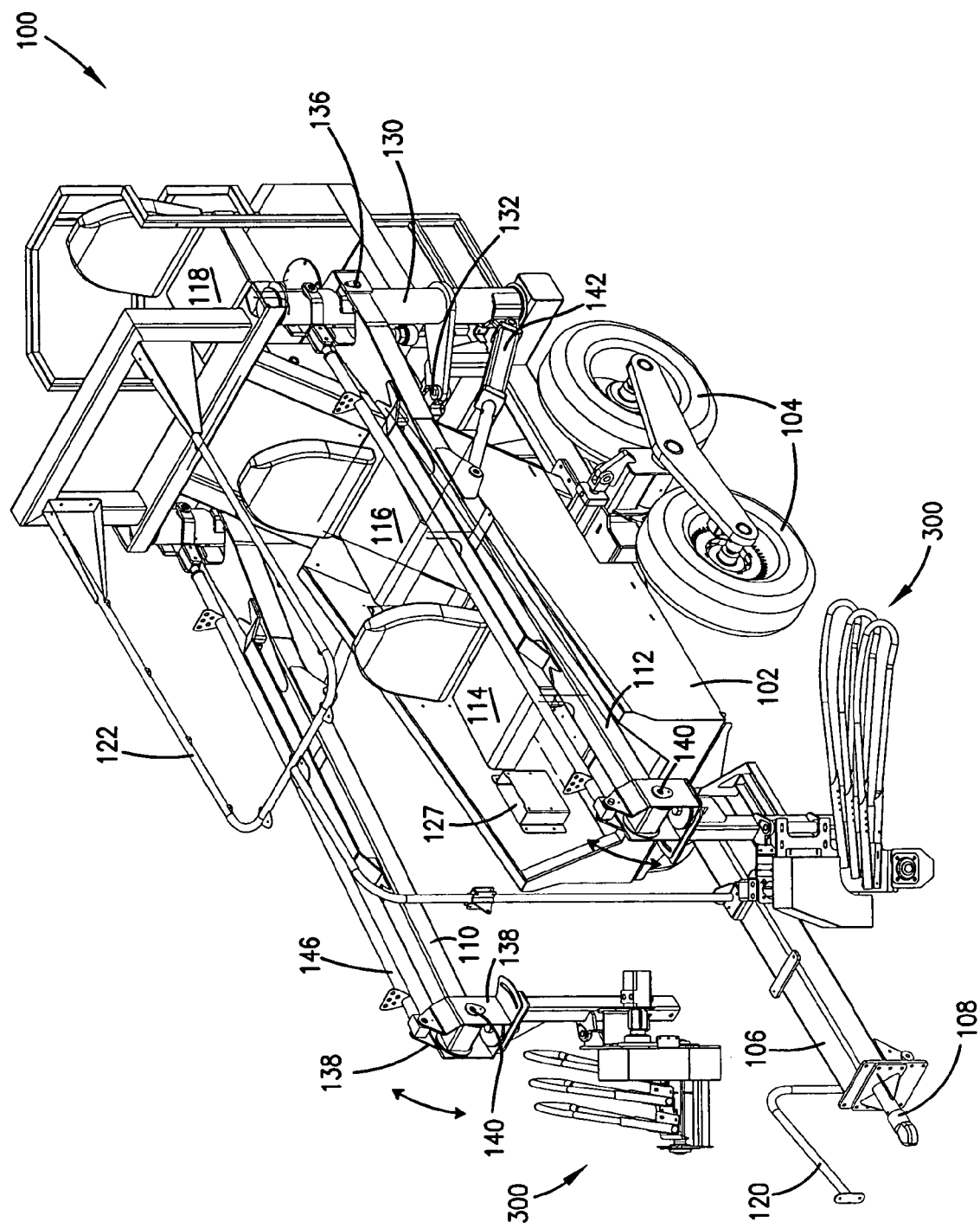
FIG. 5 is a perspective view of the vineyard management apparatus shown in FIG. 1 configured for fruit thinning with a bottom thumping device.
Figure 6:
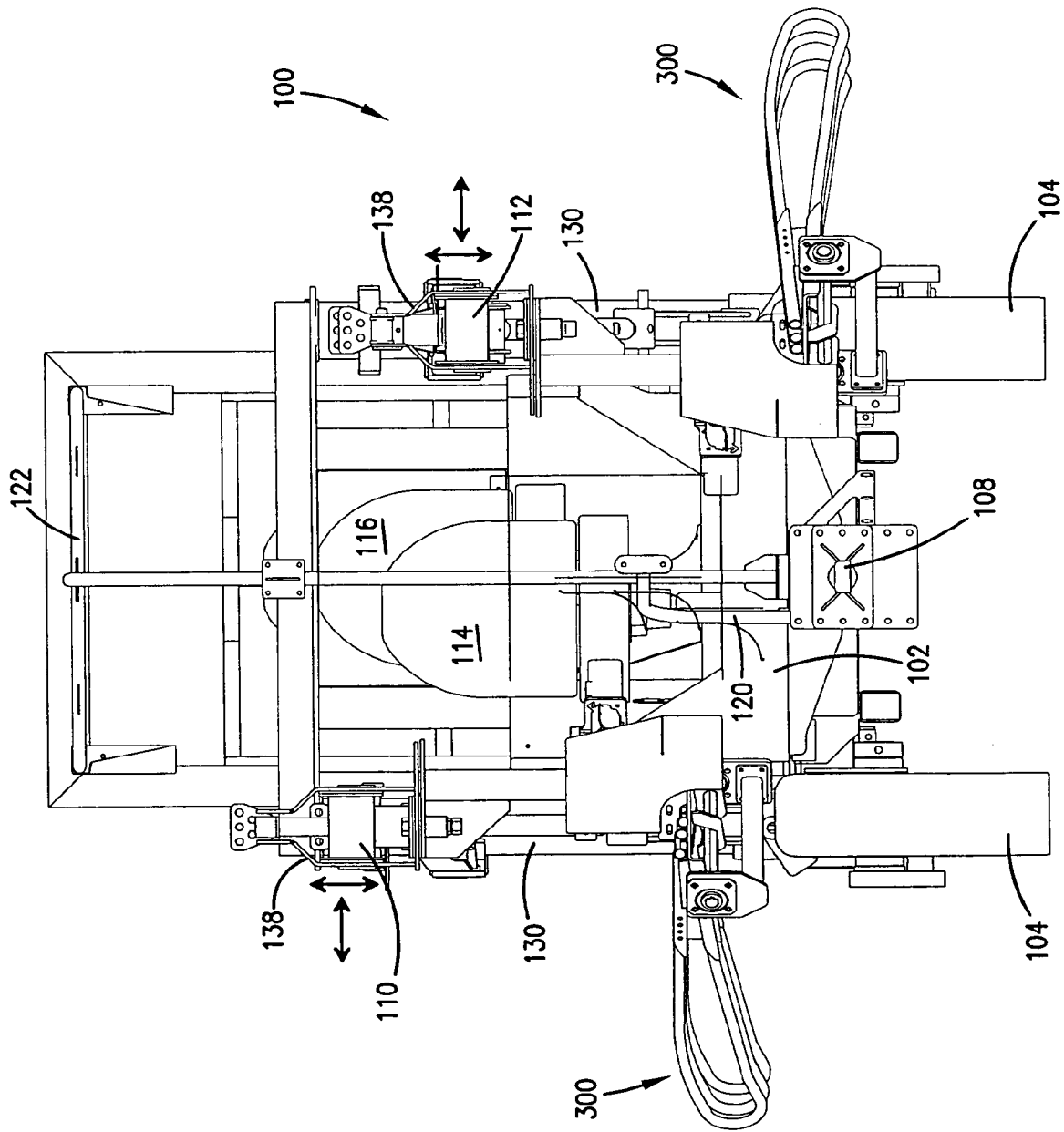
FIG. 6 is a front elevational view of the vineyard management apparatus shown in FIG. 5.
Figure 7:
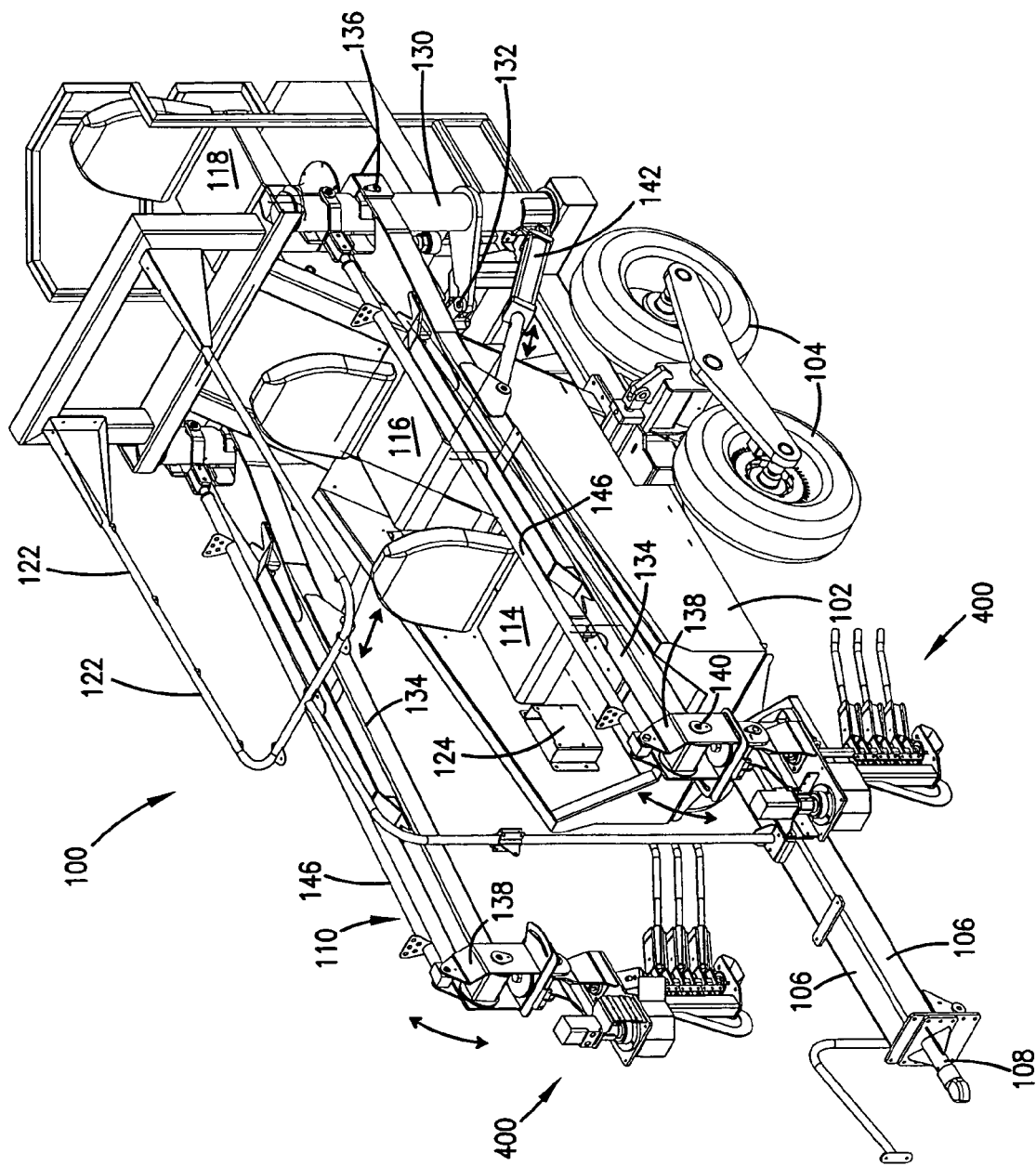
FIG. 7 is a perspective view of the vineyard management apparatus shown in FIG. 1 configured for fruit thinning with a vertical thumping device.
Figure 8:
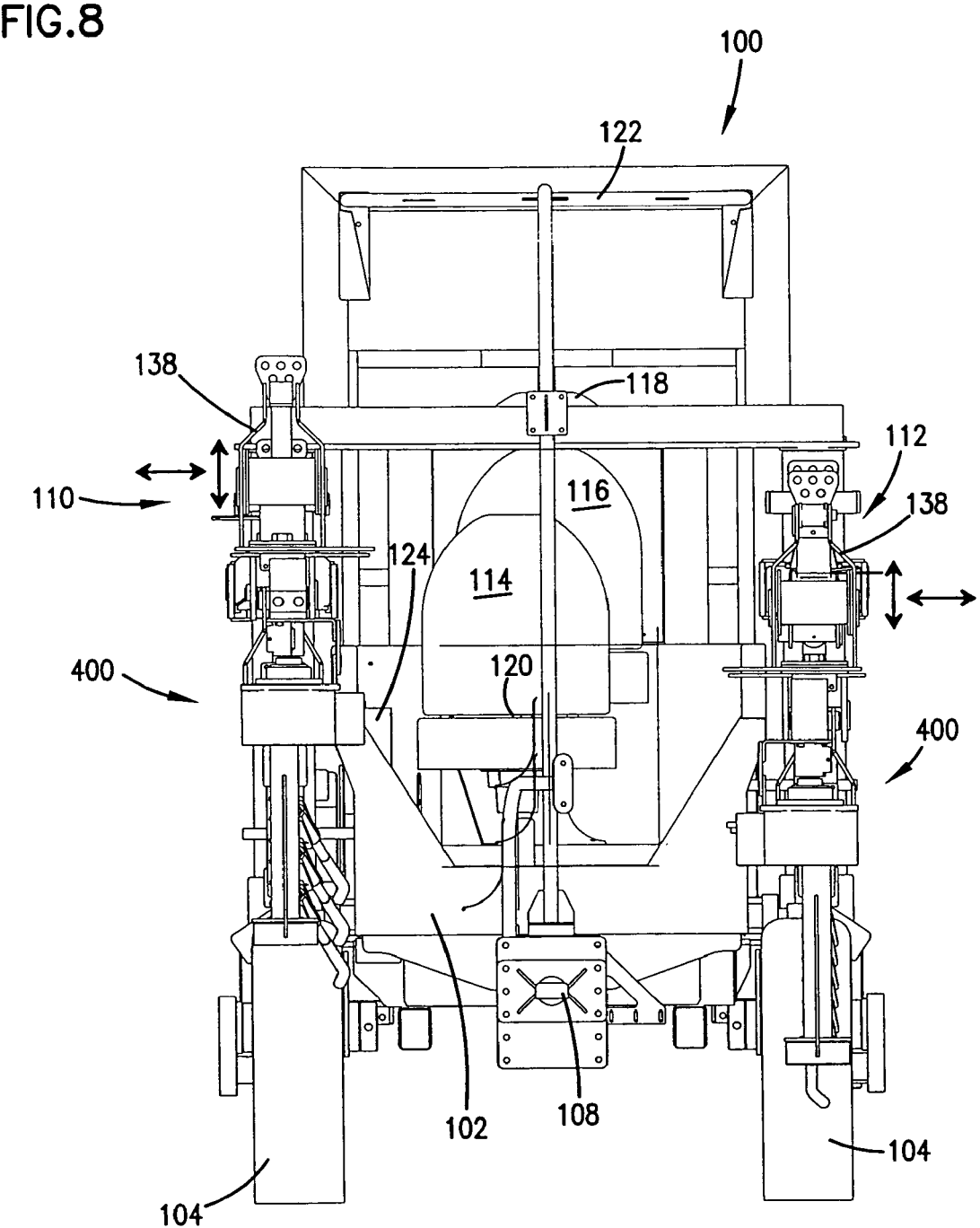
FIG. 8 is a front elevational view of the vineyard management apparatus shown in FIG. 7.
Figure 9:
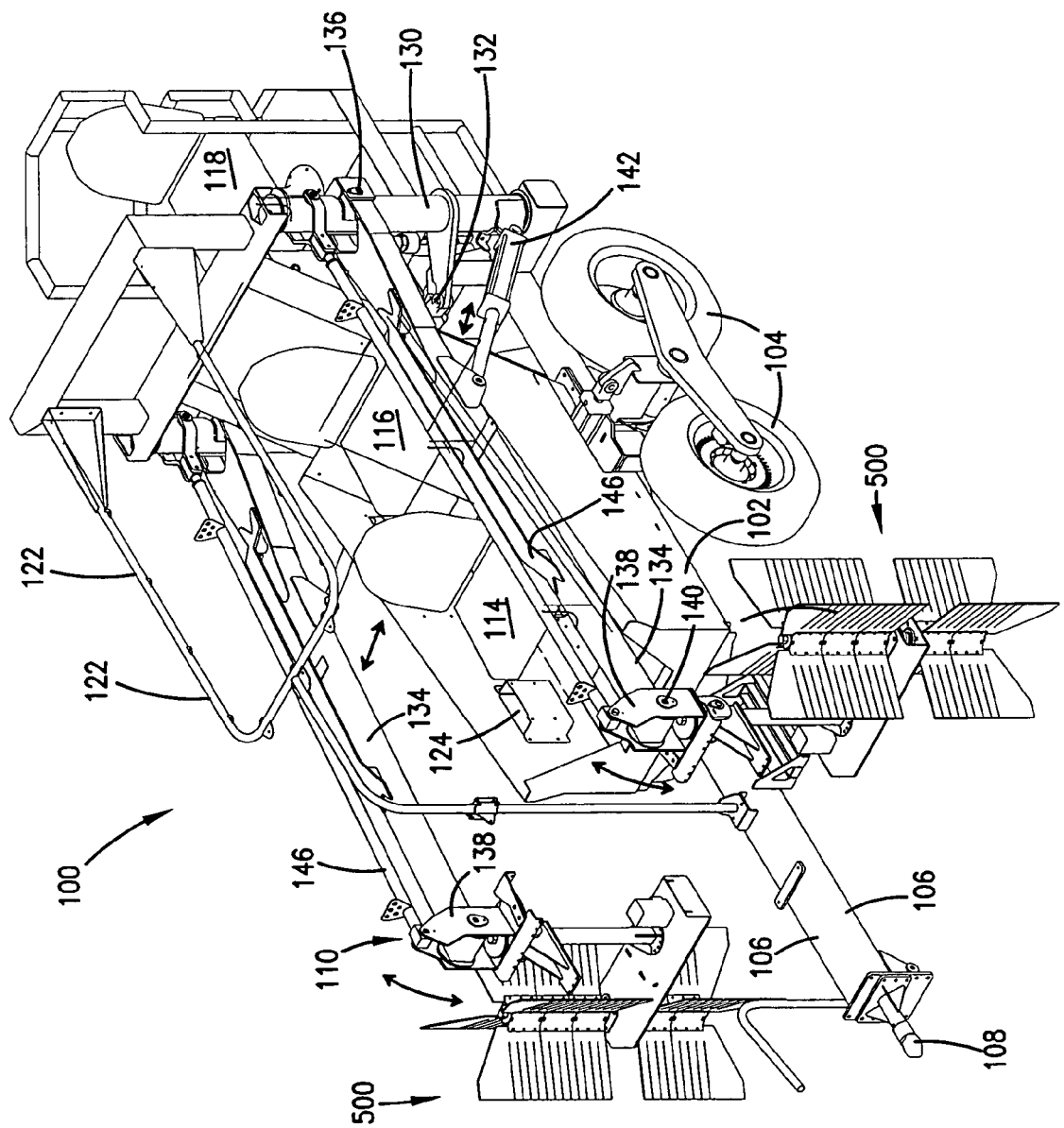
FIG. 9 is a perspective view of the vineyard management apparatus shown in FIG. 1 configured for trunk cleaning.
Figure 10:
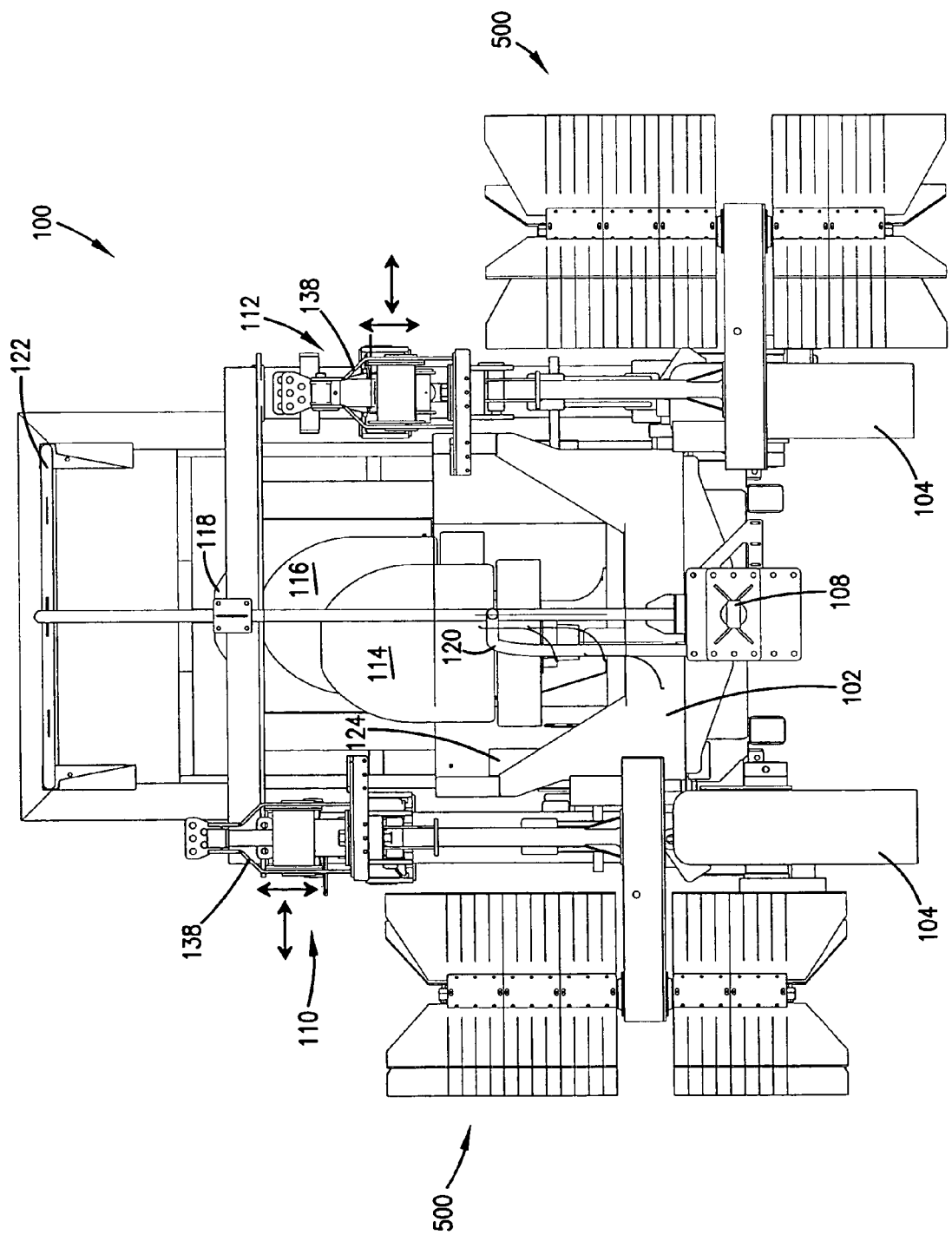
FIG. 10 is a front elevational view of the vineyard management apparatus shown in FIG. 9.
Figure 11:
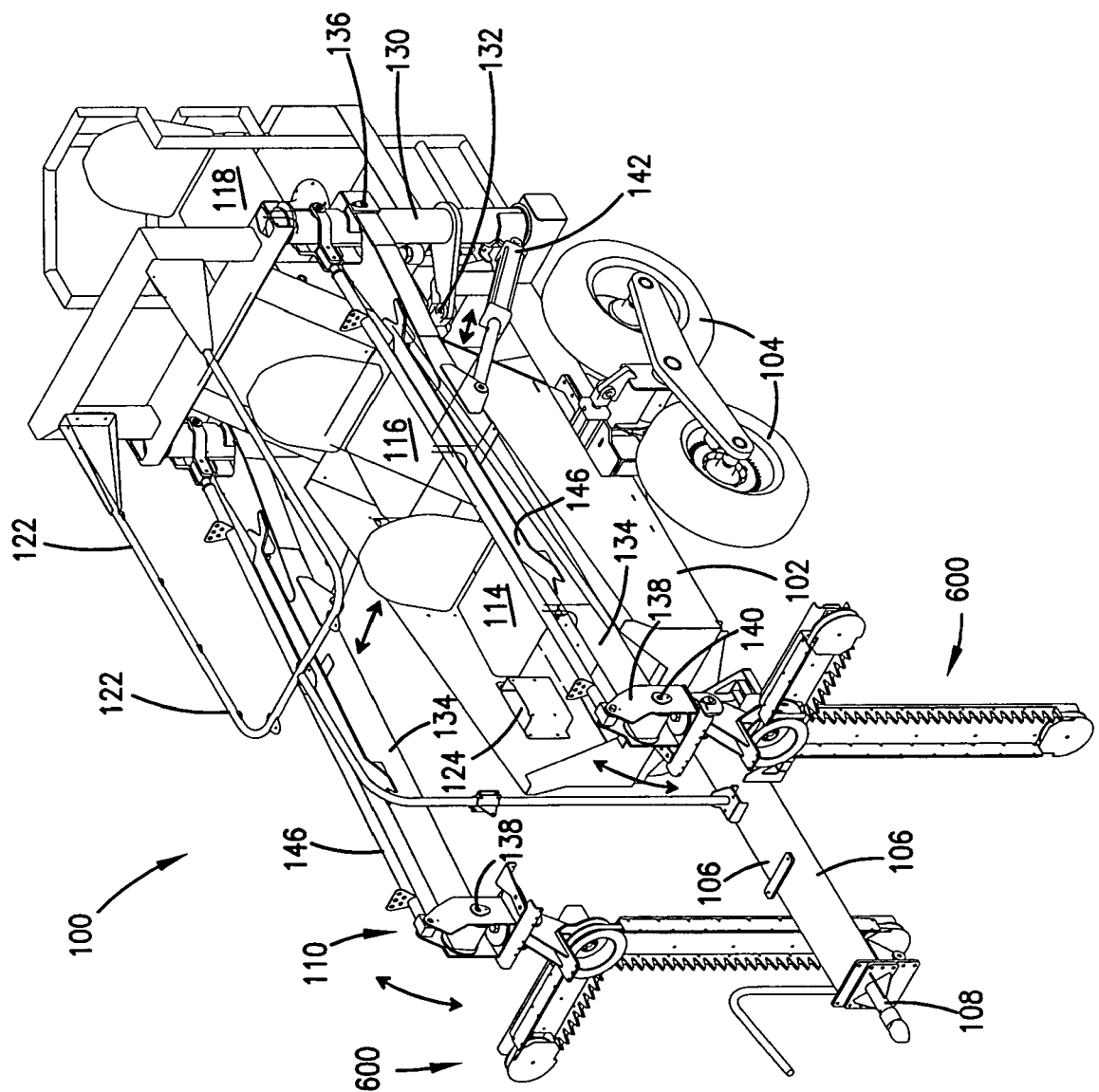
FIG. 11 is a perspective view of the vineyard management apparatus shown in FIG. 1 configured for hedging.
Figure 12:
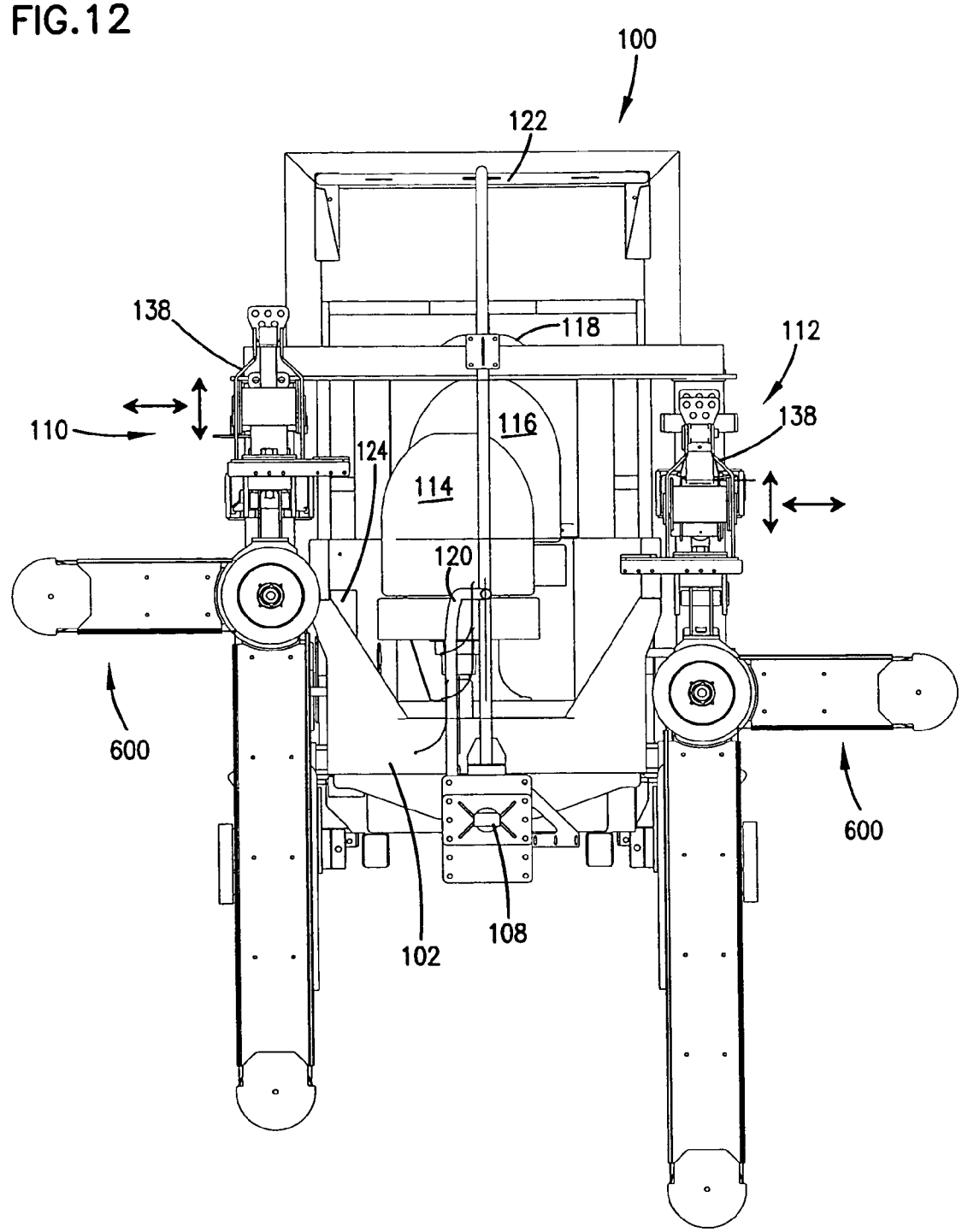
FIG. 12 is a front elevational view of the vineyard management apparatus shown in FIG. 11.
Figure 13:
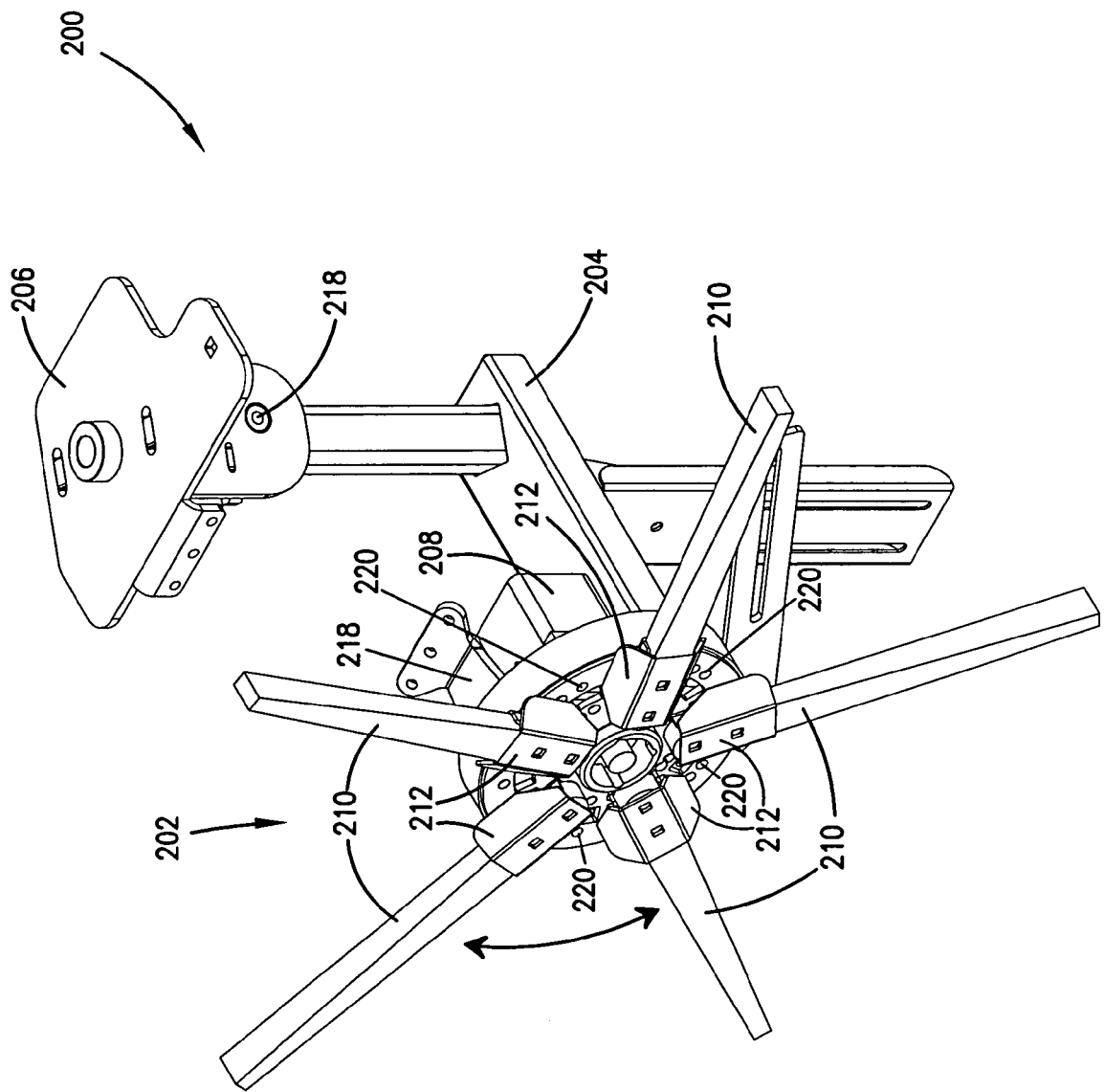
FIG. 13 is a perspective view of a shoot thinner attachment for the mechanized vineyard management apparatus shown in FIGS. 1-4.
Figure 14:
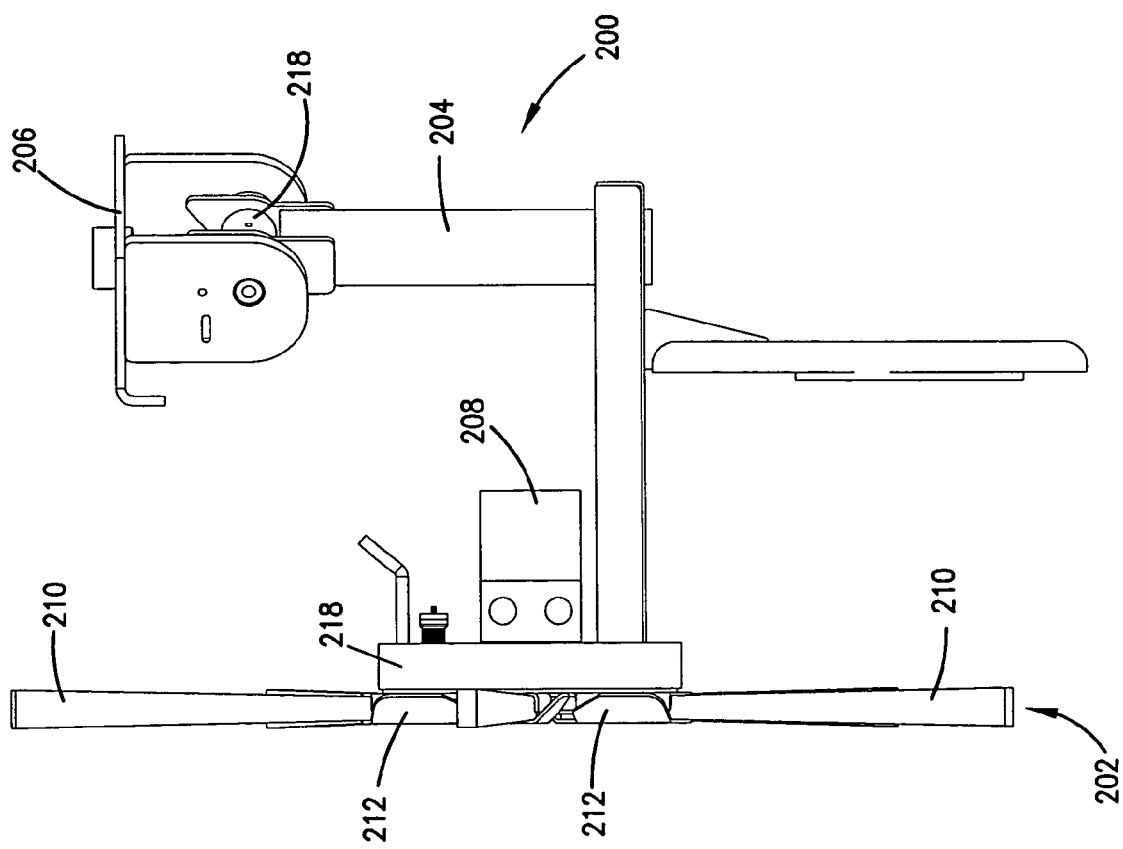
FIG. 14 is a side elevational view of the shoot thinner attachment shown in FIG. 13.
Figure 15:
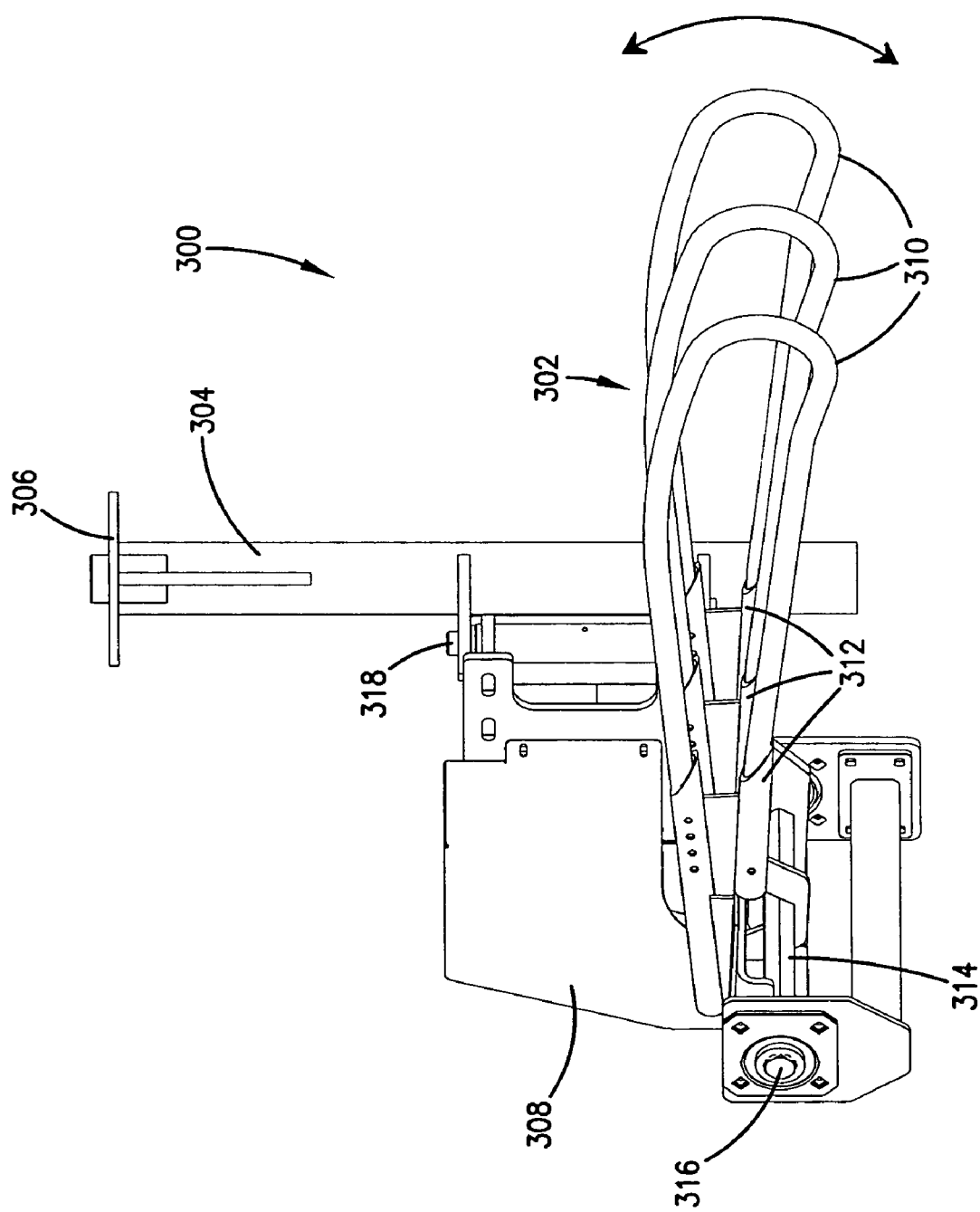
FIG. 15 is a perspective view of a fruit thinner attachment for the mechanized vineyard management apparatus shown in FIGS. 5-6.
Figure 16:
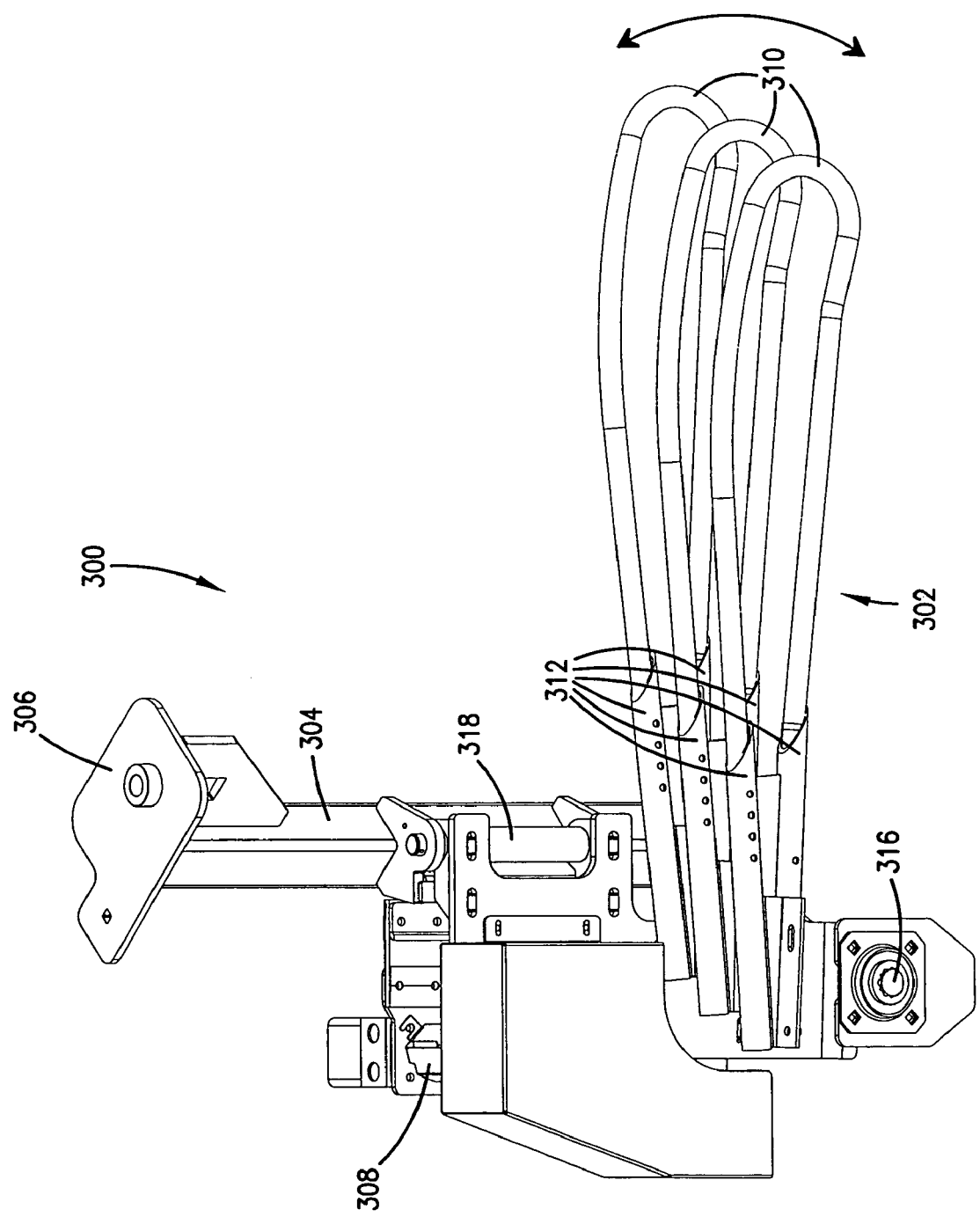
FIG. 16 is a side elevational view of the fruit thinner attachment shown in FIG. 15.
Figure 17:
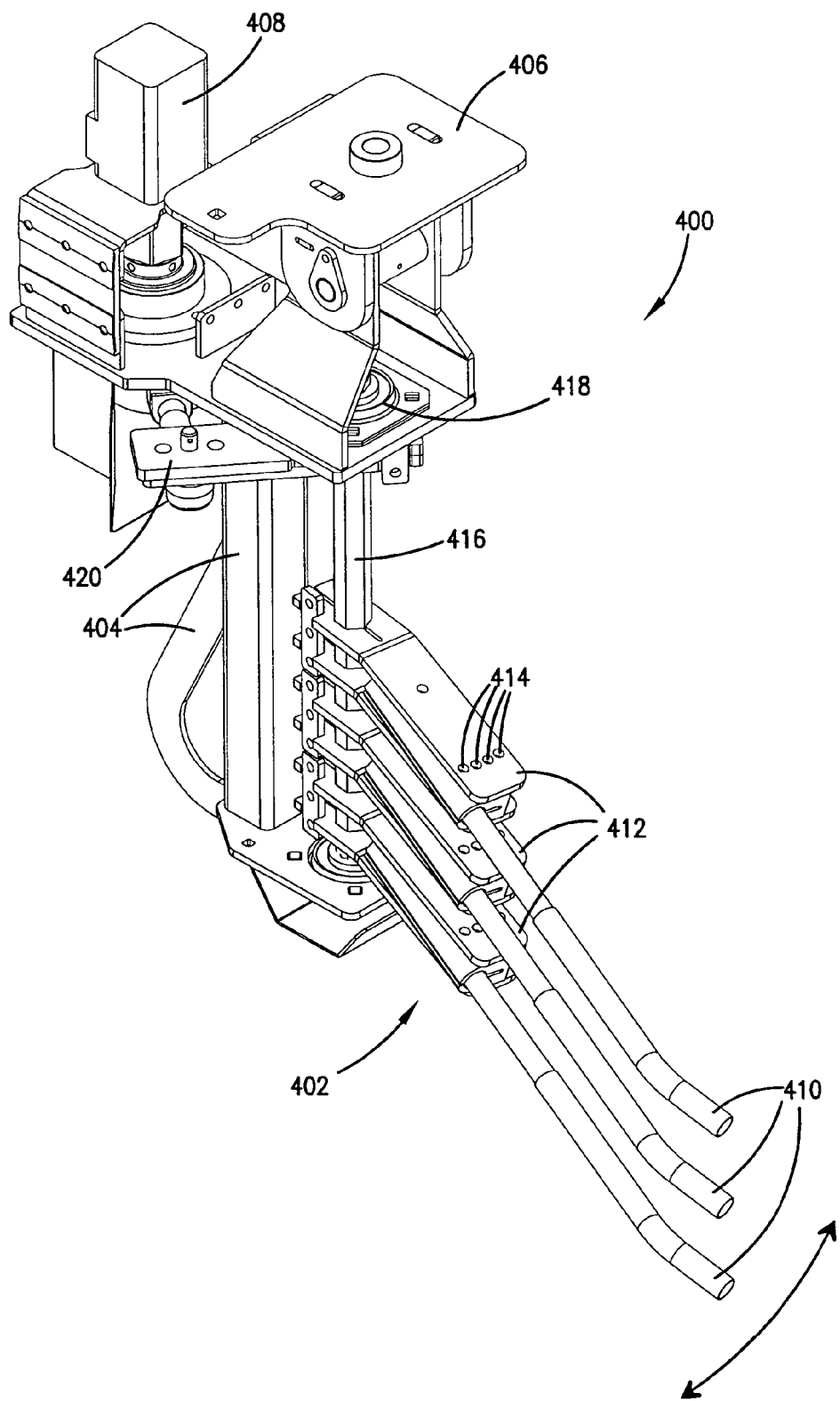
FIG. 17 is a perspective view of a fruit thinner attachment for the mechanized vineyard management apparatus shown in FIGS. 7-8.
Figure 18:
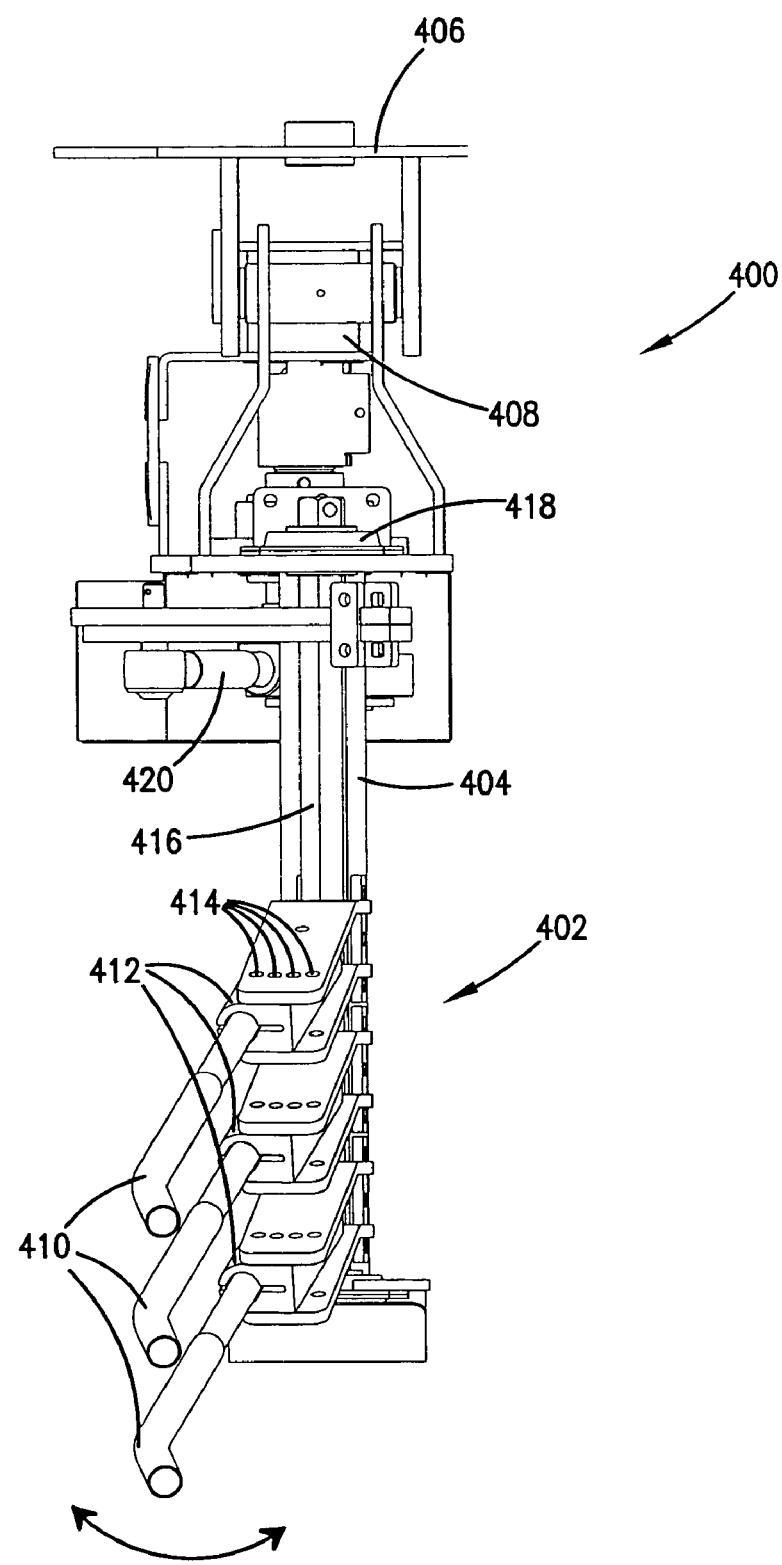
FIG. 18 is a side elevational view of the fruit thinner attachment shown in FIG. 17.
Figure 19:
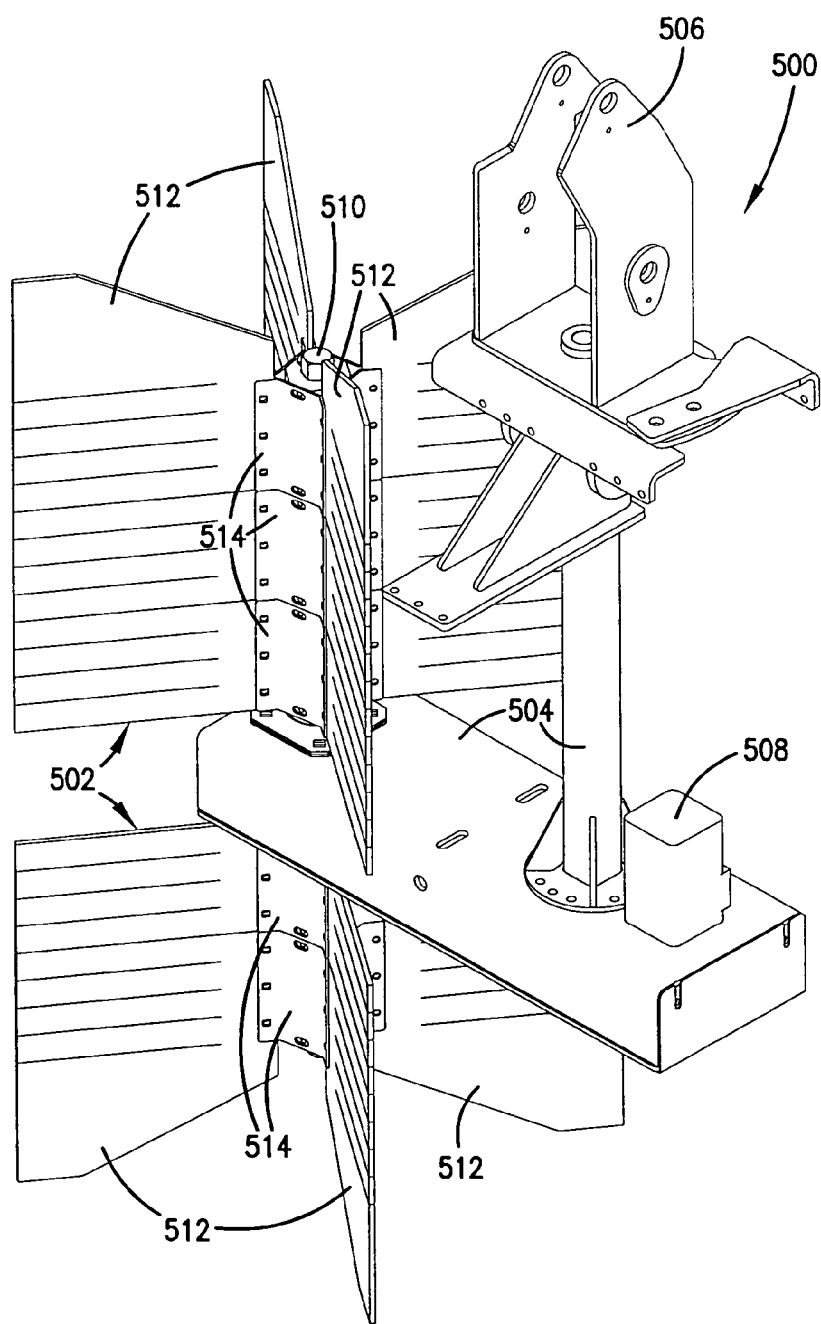
FIG. 19 is a perspective view of a trunk cleaning attachment for the mechanized vineyard management apparatus shown in FIGS. 9-10.
Figure 20:
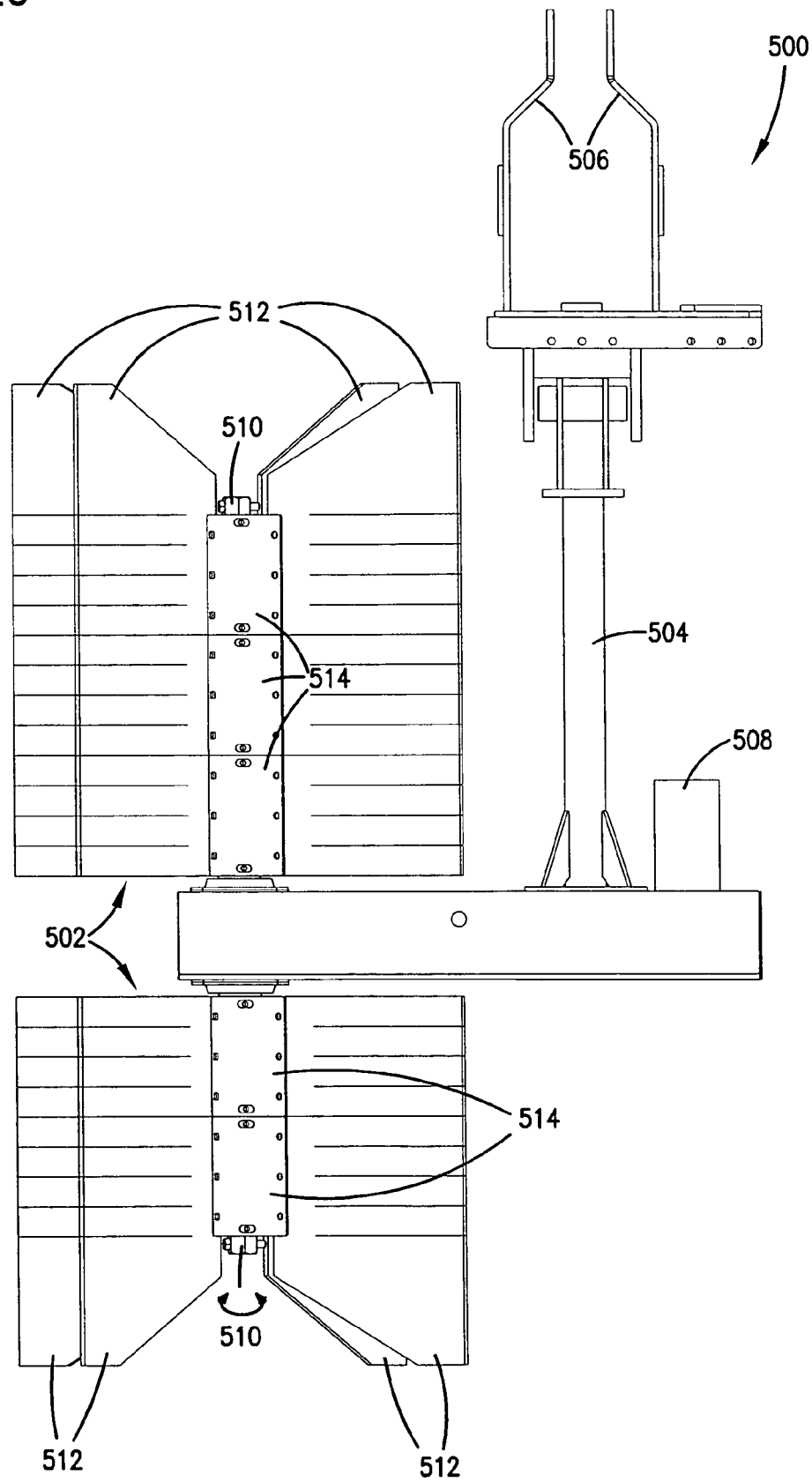
FIG. 20 is a side elevational view of the trunk cleaning attachment shown in FIG. 19.
Figure 21:
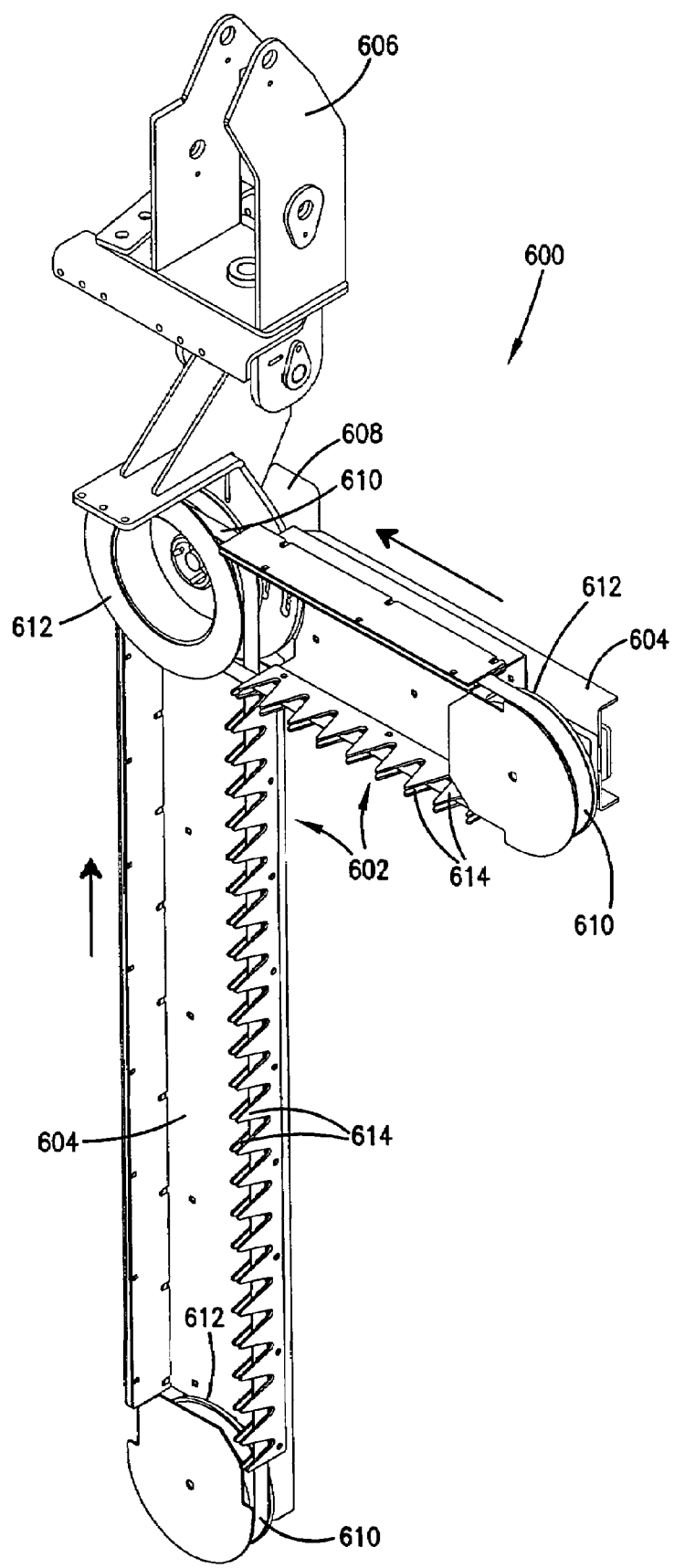
FIG. 21 is perspective view of a hedger attachment for the mechanized vineyard management apparatus shown in FIGS. 11-12.
Figure 22:
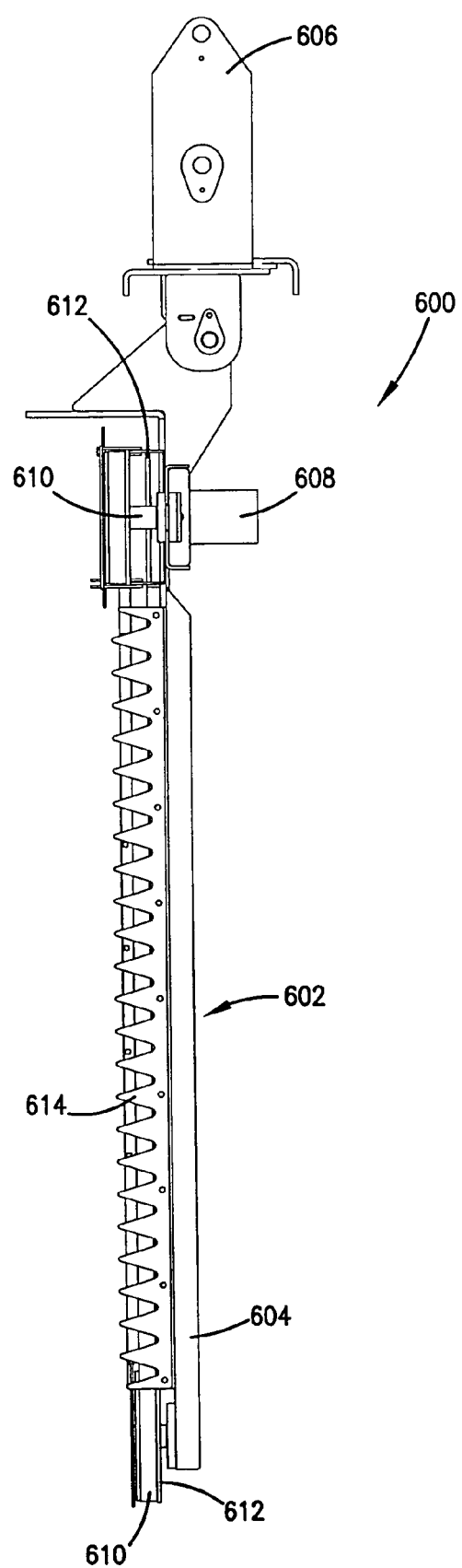
FIG. 22 is a side elevational view of the hedger attachment shown in FIG. 21.

As shown most clearly in FIG. 2, the booms 110 and 112 are operated and controlled independently so that they may be positioned at different heights and/or different lateral positions. Such flexibility provides for improved operation of the mechanized system 100 over uneven terrain and uneven row spacing in the vineyard. Such flexibility in positioning is especially helpful in vineyards wherein the rows on either side of the chassis 102 are at different elevations on a hill. In such a location with uneven topography, one arm may be lowered, while the other is raised to maintain the supported accessory at the optimal height for the plants that are being thinned. As each operator is concentrating on the row associated with their boom assembly 110 or 112, and as the tractor operator may concentrate on driving, increased speeds over uneven terrain have been achieved. The lateral position may also be varied independently. Such flexibility allows the tractor driver to drive around various obstacles and to maintain speed even when row spacing varies unevenly, while the boom operators maintain the position of the accessory relative to the rows.

The accessory supports 138 generally include a bracket that is adjustable and allows for positioning the supported accessory such that it is optimally aligned. It can be appreciated that certain accessories perform optimally when perpendicular to the direction of travel. Others may be angled somewhat to the general direction of travel. As row spacing changes, the relative angle of the boom arms to the direction of travel will also vary. By having adjustable bracket supports 138, the positioning of the supported accessory may be generally aligned to maintain a preferred orientation.

Referring now to FIGS. 1-4 and 13-14, there is shown a first embodiment of a shoot thinner 200 for the mechanized vineyard system 100. Although shooter thinners 200 and the various other accessories described hereinafter may be shown as left-handed or right-handed, it can be appreciated that the accessories may be utilized on either boom assembly 110 or 112 or may be constructed as a mirror image with either right-handed and left-handed versions. The shoot thinner 200 generally includes a striker assembly 202, as most clearly shown in FIGS. 13 and 14 including striker elements 210 extending radially outward. The striker assembly 202 generally rotates transversely to the rows to engage the shoots and conduct the shoot thinning operations. The shoot thinner 200 also includes a frame 204 and a mounting plate 206 that attaches to the accessory support 138. A driver 208 such as a hydraulic motor impels the striker assembly 202. The driver 208 is typically a hydraulic motor that receives fluid from a pump and tank 120 on the chassis. Fluid flow is varied to change speeds and accommodate different shoot thinning amounts with fluid flow monitored by sensors in communication with the controller 124. The striker elements 210 removably insert into striker mounts 212. The striker mounts 212 attach to a hub 218 in mounting holes 220 spaced apart about the hub 218. Inserting mounting hardware into the mounting holes 220 to attach the strikers 210 and mounts 212 allows for varying the number of strikers 210. The number of strikers 210 may therefore be varied while maintaining even spacing about the hub 218. In the embodiment shown, the number of striker elements can vary between 2 and 8 while maintaining even spacing about the hub 218. In this manner, the elements 210 may be replaced when damaged or interchanged with other striker elements and with different quantities of striker elements 210 having varying properties such as different length, different rigidity, different width, different shape and other variable characteristics that may be needed for different thinning operations.

Shoot thinners 200 accommodate striker elements that allow for flexing sufficiently for various types and styles of trellis. Moreover, it can be appreciated that the two shoot thinners 200 may be held at different heights to match the needs of each row of plants, as clearly shown in FIG. 2.

Referring now to FIGS. 5-6 and 15-16, the mechanized system 100 may support a vertical impactor device 300, also referred to as a thumper device, typically utilized for fruit thinning. The vertical impactor 300 includes a striker assembly 302 having multiple striker elements such as bow rods. The striker elements removably insert into striker mounts 312. The striker assembly 302 has a reciprocating up and down motion that engages the plants and thins excess fruit and other overgrowth. The vertical impactor 300 also has a frame 304 with a mounting plate 306 that attaches to the accessory support 138. A driver 308 is hydraulically driven and imparts reciprocating motion to the shaft 314 on the bearings 316. A vertically oriented pivot 318 provides flexure should the thumper device 300 strike a trellis or other obstacle. Other striker element shapes and other numbers of elements may also be utilized and are easily removed from the striker mounts 312 and may be easily replaced should they become damaged.

Referring now to FIGS. 7-8 and 17-18, a thinning device commonly known as a horizontal impactor 400, often used for fruit thinning is shown. The horizontal impactor 400 includes a striker assembly 402 mounted on a frame 404. The frame 404 is supported on a mounting plate 406 that attaches to the accessory support 138. A hydraulic driver 408 imparts reciprocating motion to the striker assembly 402. The striker assembly 402 includes striker elements 410 supported on striker mounts 412. The striker elements 410 generally extend laterally outward and slightly downward to engage plants from the side. The reciprocating motion of the striker assembly 402 is provided by a drive linkage 420 engaging a shaft 416 mounted on bearings 418. Changing the position among various adjustment holes 414 provides for varying the position and number of the striker elements 410. The mounting arrangement provides for easy removal and replacement of the striker elements 410 in the striker mounts 412. The horizontal impactor device 400 may be utilized for fruit thinning and provides for engagement of the plants from the side with a horizontal motion to impact the vines, rather than a vertical motion as with the vertical impactor 300 discussed above. The horizontal impactor 400 also provides for access to plants in trellis arrangements that may not be possible with the vertical impactor. It can be appreciated that using combinations of the vertical impactor 300 and horizontal impactor 400 and/or the other accessories may accomplish proper access and thinning accomplished on various types of trellis arrangements with a single vehicle.

Referring now to FIGS. 9-10 and 19-20, there is shown a trunk cleaner, designated 500. The trunk cleaner 500 includes a frame 504 supporting a rotary striker assembly 502. In the embodiment shown, the trunk cleaner 500 includes upper and lower striker assemblies 502. The striker assemblies 502 generally include flexible elements, such as rubber that have slits extending horizontally and spaced apart on the striker elements 512. The striker elements 512 are held in place by striker mounting brackets 514. This configuration allows for removal and replacement of either the entire striker assembly 502 or individual striker elements 512. Such replacement may be necessary should the striker elements 512 become worn or torn. In addition, different sizes, rigidity and differently configured striker elements 512 may be utilized. The trunk cleaner 500 is used primarily to clean unwanted growth generally projecting upward from the ground near the base of the trunk of grapevines that drain from the main fruit bearing plants. Such growth may often be called "suckers" and the trunk cleaning operation is also known as sucker removal. The striker assembly 502 includes the frame 504 and a mounting bracket 506 attaching to the accessory support 138. A driver 508 drives a rotary shaft 510 supporting the striker mounting brackets 514. Adjustment holes 518 provide for adjustment and changing the orientation of the trunk cleaner device 500.

Referring now to FIGS. 11-12 and 21-22, a hedger device 600 is shown. The hedger 600 is a band saw type device that includes a cutting assembly 602 mounted on a frame 604. The frame 604 is supported on a mounting plate 606 that attaches to the accessory support 138. A hydraulic driver 608 rotates to drive sawing blades 610. The blades 610 ride over pulleys 612 and past blade guards 614. The blades 610 draw portions of the grape vine across the associated guards 614 to sever the vine and remove unwanted portions for improved hedging as compared to different style prior art devices. The hedger 600 includes vertical and horizontal blade guards 614 and associated blades 610 to access alongside and above trellises to remove excess lateral and vertical growth.

The hedger 600 improves cutting quality to minimize plant stress while providing for improved sunlight penetration.

Figure 23A:
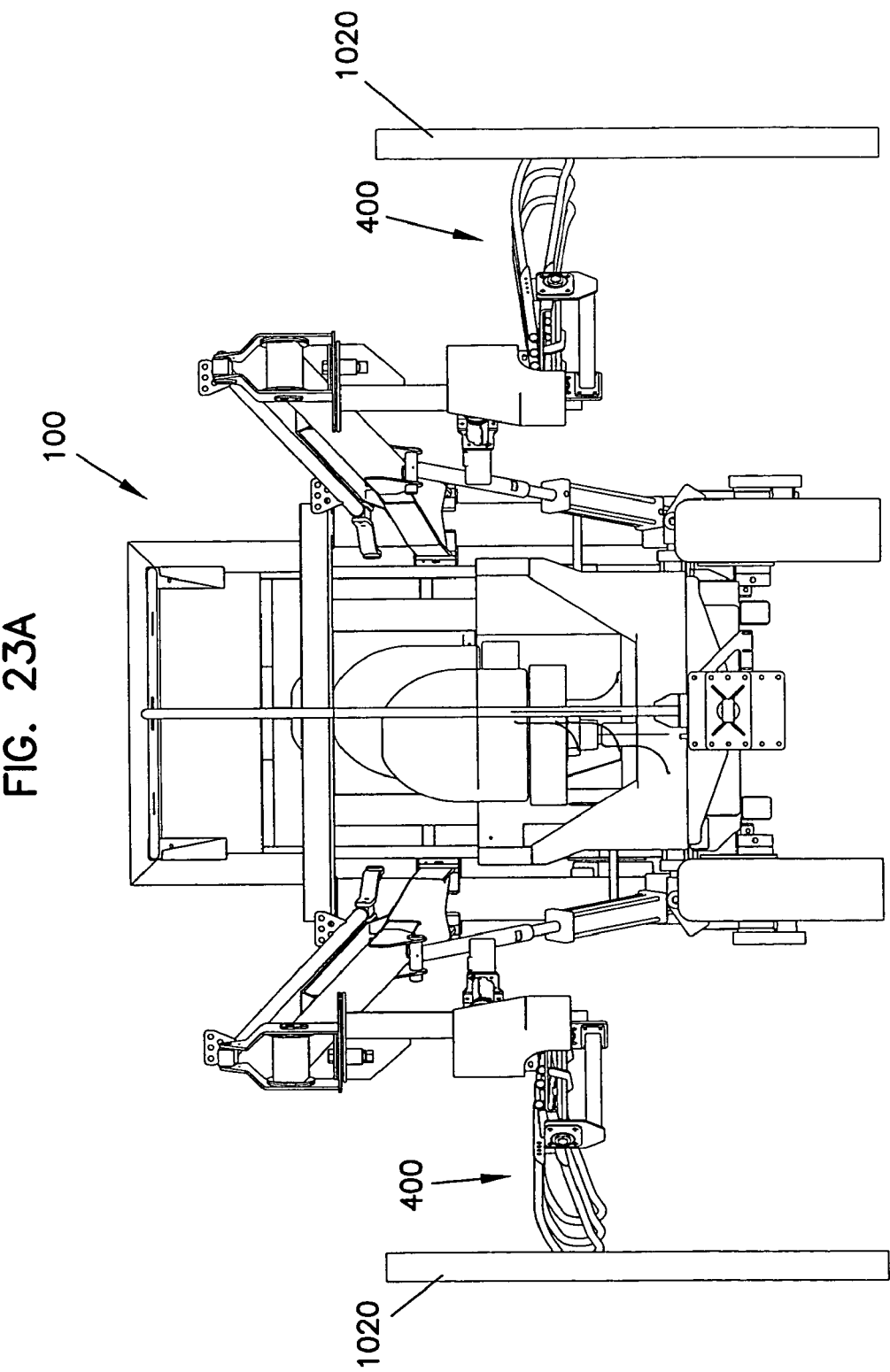
Figure 23D:
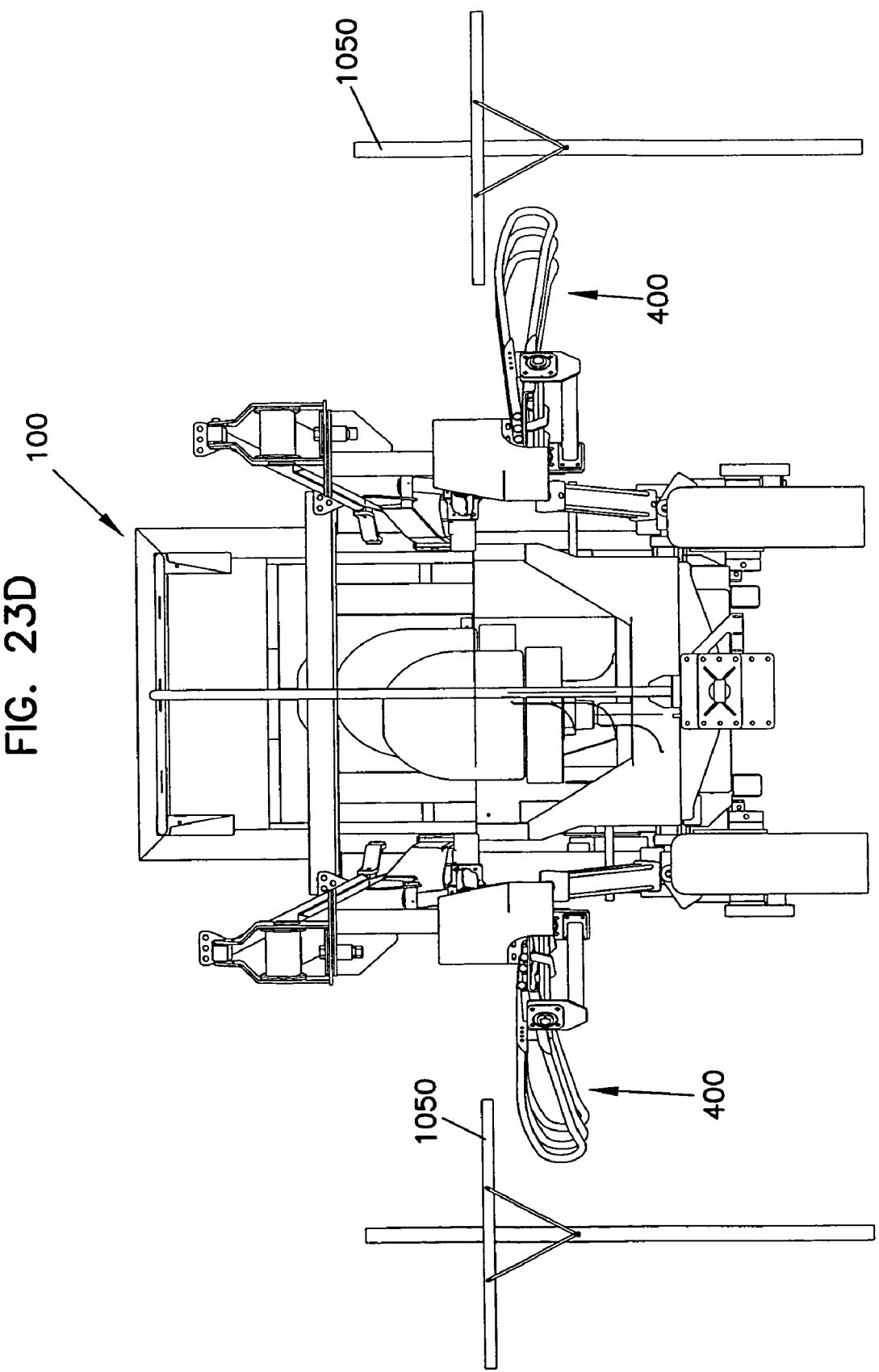
Figure 24:
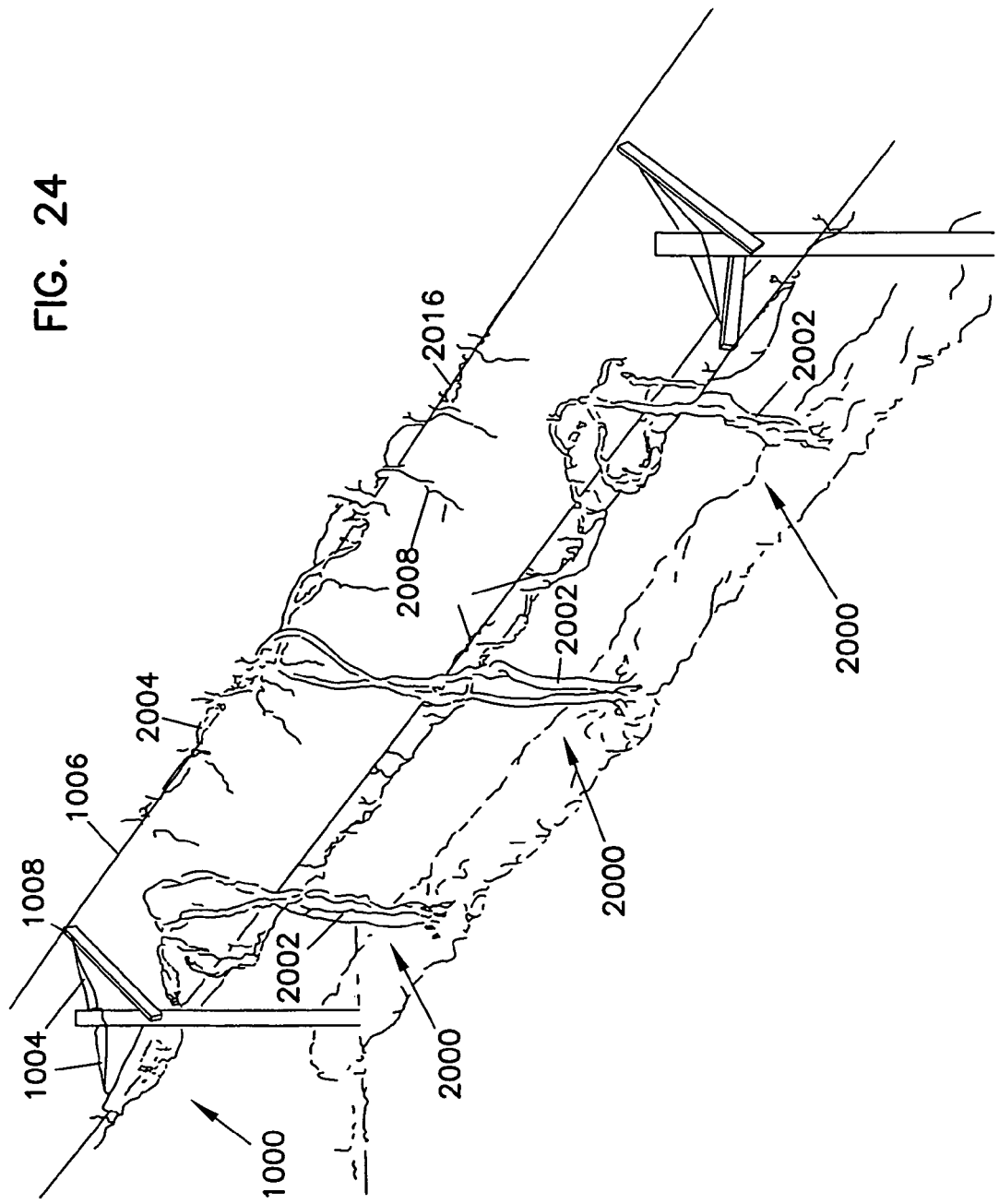
FIG. 24 is a perspective view of a Geneva Double Curtain (GDC) trellis system and grape vines.

Referring now to FIGS. 24-26, there are shown various types of trellis systems and supported grape vines. FIG. 24 shows a typical trellis system 1000 with vertical posts 1002 spaced apart typically at a distance of 24 feet, with a typical width of 8 feet and height of 6 feet, however other distances may be used. Crossbars 1004 extend laterally outward and support the cordon support wire 1006 attaching at wire supports 1008. Grape plants 2000 include a trunk 2002 extending substantially vertically. Although no fruit is shown, the grape plants 2000 include cordons 2004 with shoots 2008 and spurs 2016. Moreover, although a T-shaped trellis is shown, the present invention also works well on other well known trellis systems such as those shown in FIGS. 23A-D.

FIGS. 23A-D show the mechanized system with the booms 110 and 112 extended slightly laterally between rows of different style trellises. FIG. 23A shows a ballerina trellis 1020 with vertical posts. FIG. 23B shows a second type of trellis with cross members, generally knows as a modified lyre trellis 1030. FIG. 23C shows a third type of trellis known as a lyre type trellis 1040. FIG. 23D shows a fourth type of trellis knows as a T-top type trellis 1050. Although the mechanized system 100 is shown supporting vertical impactors 300, other accessories may also be used with each of the trellis styles.

It can be appreciated that the mechanized system 100 can travel between the rows and access two rows of plants to perform thinning and other operations simultaneously on both rows. Moreover, access is not limited by an over the row framework and with the constraints that are associated with such designs. Depending on the type of accessory utilized, improved access may be gained to the top, side and bottom of the vines, depending upon the accessory and the trellis type. The present invention provides sufficient flexibility for the various types of accessories and the mobility of booms 110 and 112 so that proper thinning and positioning of the accessories is easily accomplished.

Referring now to FIGS. 24-25, there is shown a ballerina type trellis system, generally designated 1020. The ballerina type trellis system includes vertical posts 1022 with wire supports 1024 retaining and holding horizontally extending wires 1026. The wires 1026 are spaced at various levels to support the cordons 2004 as well as shoots 2008 that extend upward and also droop downward from the cordon 2004. The plants are trained so that bunches of grapes 2006 hang from above and below the cordon 2004 in the configuration shown. Growths 2012, sometimes known as suckers, may grow up from the base of the trunk 2002 if trunk cleaning has not been conducted. It can be seen that the plants 2000 shown in FIGS. 24 and 25 are further along in the growing season than those shown in FIG. 23.

Figure 27:
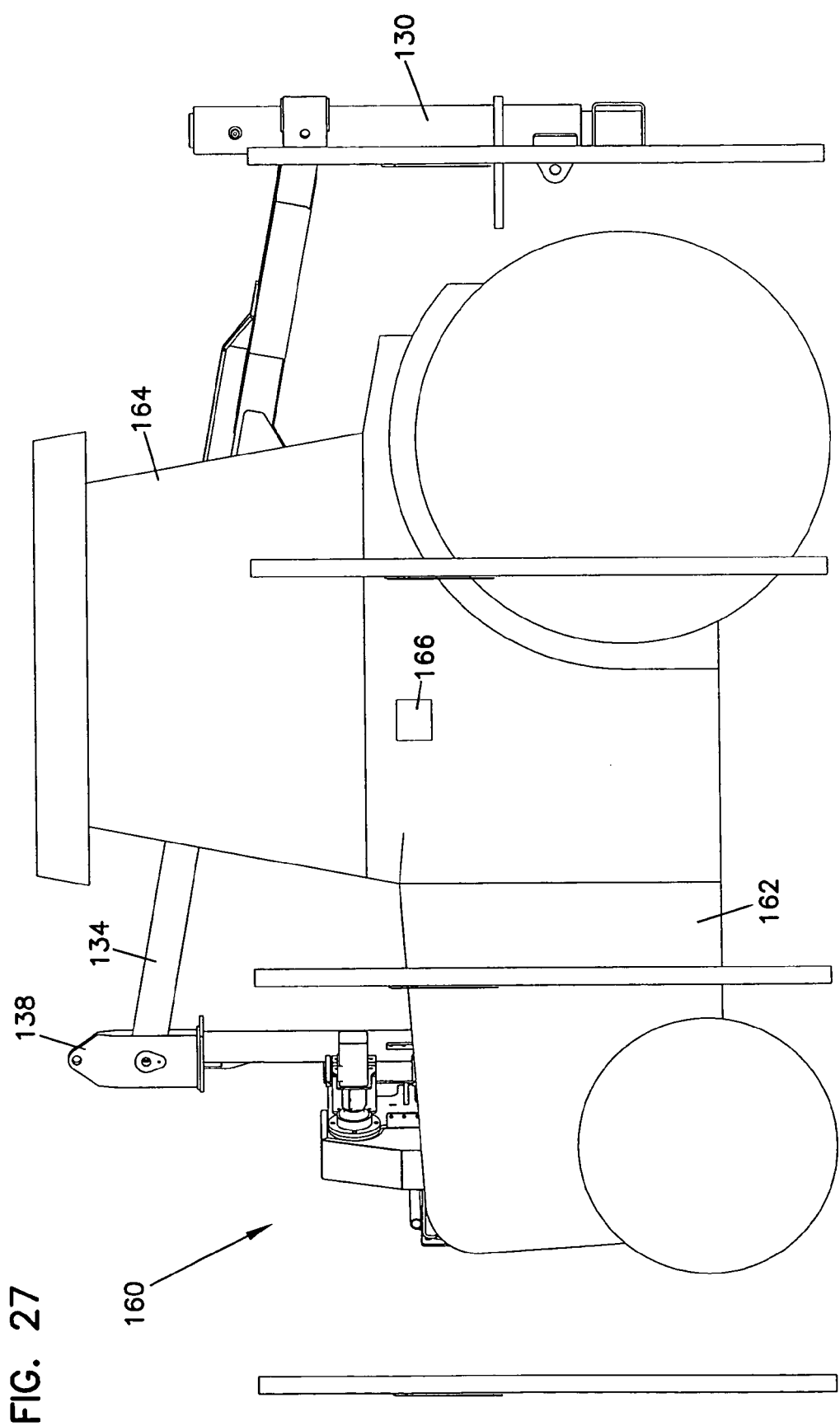
FIG. 27 is a side elevational view of a second embodiment of a mechanized vineyard management apparatus according to the principles of the present invention.
Figure 29:
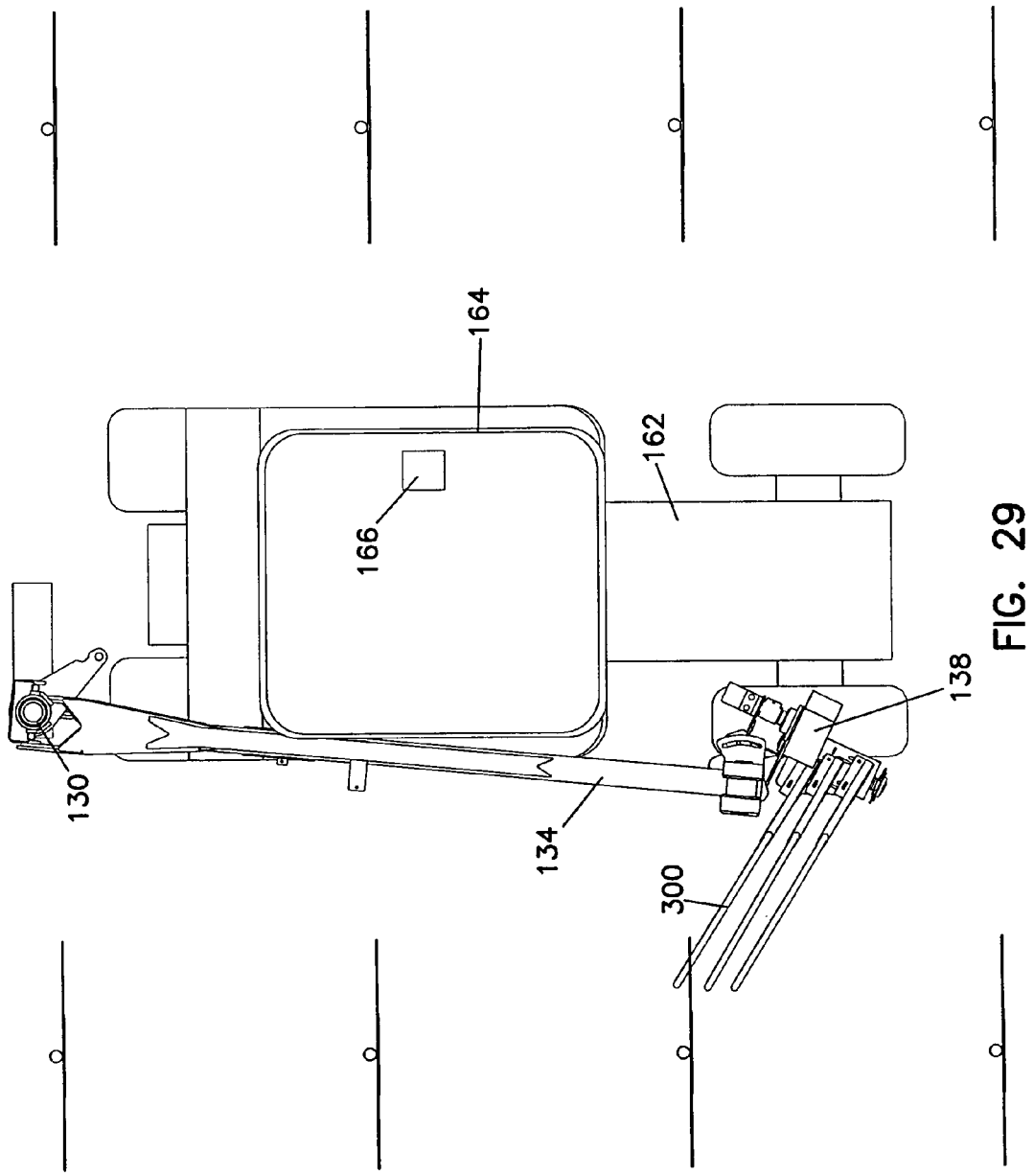
FIG. 29 is a top plan view of the mechanized vineyard management apparatus shown in FIG. 27.

Referring now to FIGS. 27-29, there is shown a second embodiment of a mechanized system, generally designated 160. The mechanized system 160 includes a boom 110 similar to the booms shown in FIGS. 1-4. However, the boom 110 mounts at the rear of a tractor 162 and extends forward of the cab 164. Controls 166 may be accessed by the tractor operator. As the forward end of the boom 110 and the accessory are positioned forward of the operator in his/her field of vision, the tractor operator may safely drive the tractor 162 and operate the accessory at the same time at satisfactory speeds. Such systems may be utilized for smaller vineyards or other applications wherein the mechanized system 100 may be impractical.

Figure 30:
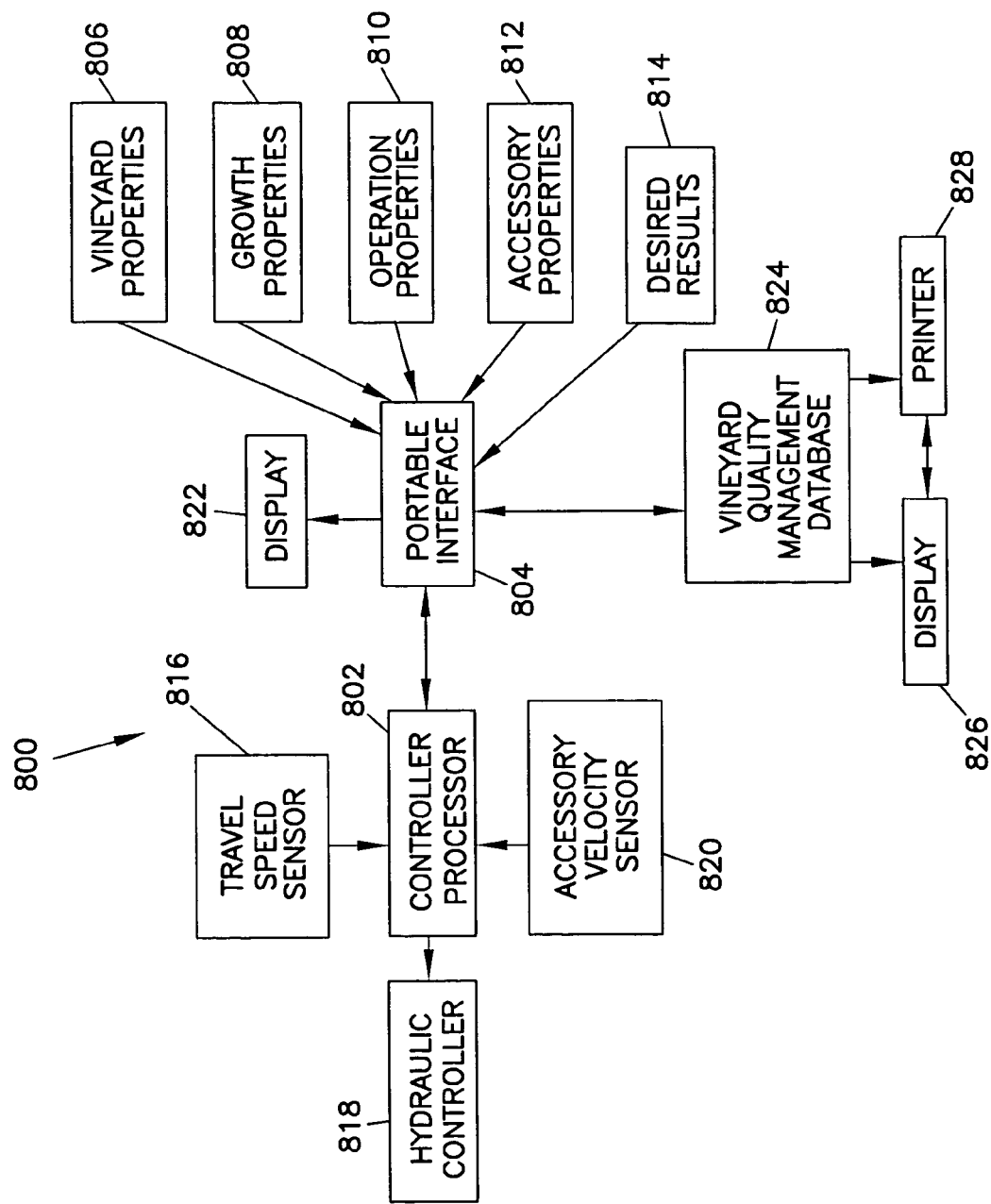
FIG. 30 is a block diagram of a controller for the apparatus shown in FIG. 1.
Figure 31:
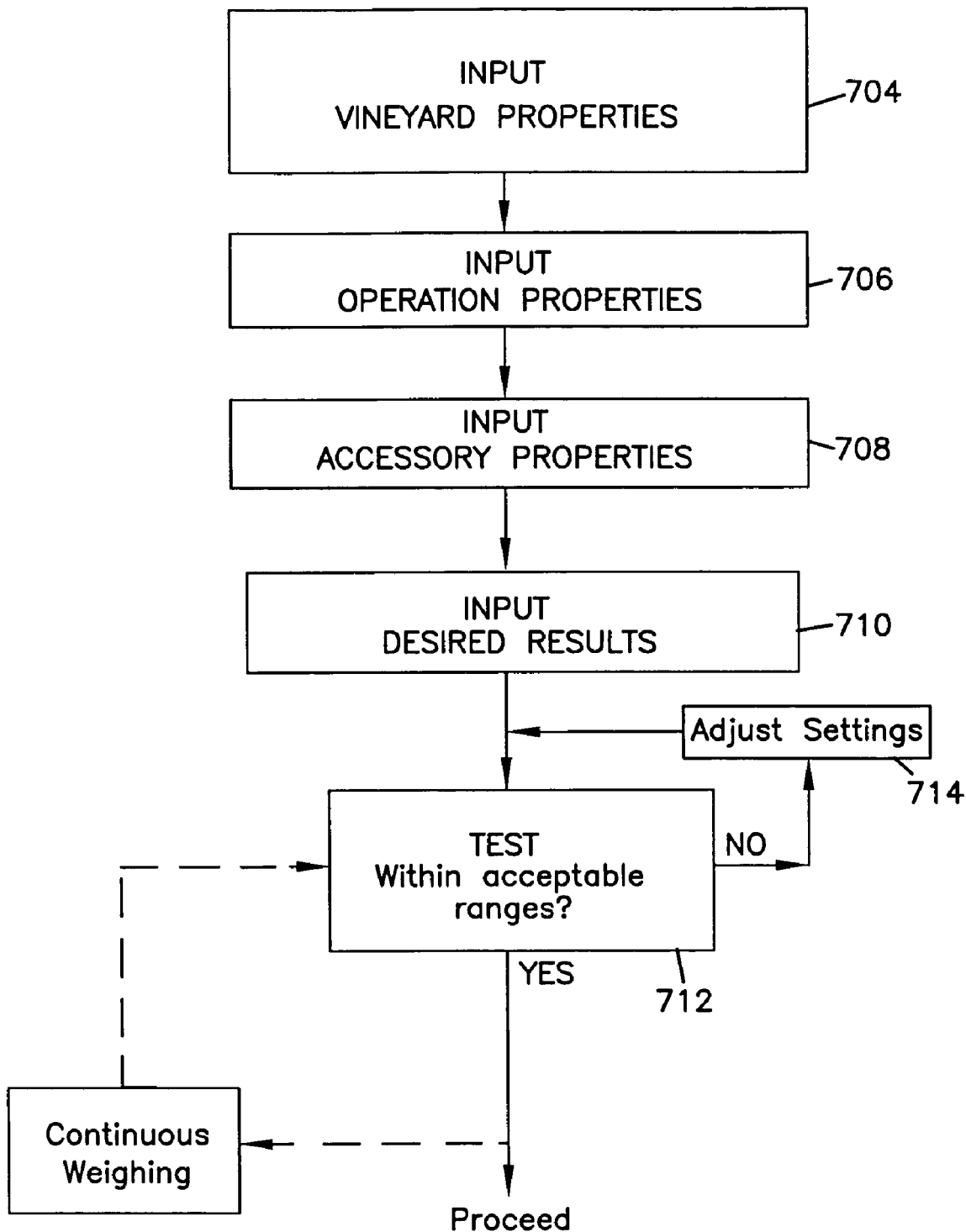
FIG. 31 is a diagrammatic flow chart for the controller shown in FIG. 30.
Figure 32:
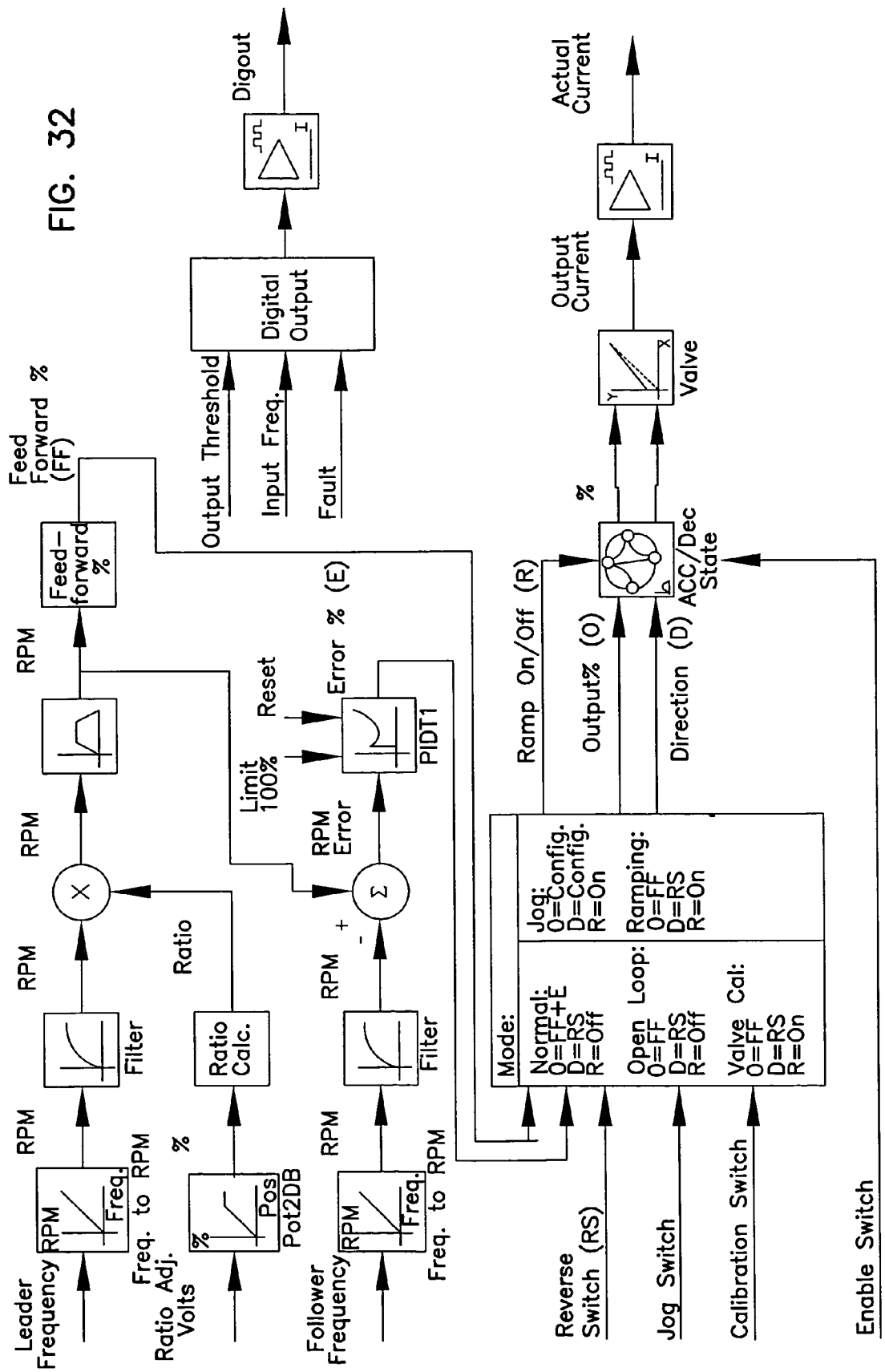
FIG. 32 is a system block diagram for control software utilized in the controller shown in FIG. 30.

Referring now to FIGS. 30 and 31, there is shown a control system 800 for the mechanized system 100, as well as the setup procedures for the control system 800. The controller 800 includes a central processor 802, such as SX controllers available from Sauer-Danfoss Company. FIG. 32 shows a typical block diagram for the control system 802. Referring again to FIG. 30, the processor 802 is accessed through an interface unit, such as a hand held portable interface 804, which may include screens with prompts to ask for various inputs to control the various operations of the mechanized system 100. The portable interface may be a Palm Pilot brand or similar device that includes a memory, display, inputs and download capabilities. The portable interface unit 804 may utilize various factors that are entered. If such properties are not entered, default settings may be utilized. Vineyard properties 806 that are input and stored may include the grape variety, type of trellis, the density of the plants, the age of the plants, and other properties of the various vineyards. Measurements may be taken before and after each operation including weights, shoot counts, berry counts, cluster counts, leaf area and other characteristics. Although the characteristics may be input for each vineyard, it can be appreciated that the properties may also be applied to various lots or tracts that are further subdivisions of a particular vineyard. Moreover, visual sampling or sampling taken by hand or from automatic devices, such as a weighing device, may also be utilized and input and rates adjusted in response to the sampling results. Cluster count, weight, yield and other data may be measured and recorded for current season and future use.

Referring to FIGS. 61-64, typical information that maybe recorded and utilized in conducting the mechanized management operations are shown. Typical log sheets or display screens may be general or dedicated to a particular operation, such as for example, shoot thinning, fruit thinning and trunk cleaning. The information pertinent to each operation is recorded and utilized in conducting and adjusting the operations. The processor 802 stores the information for use in future operations and in analyzing the effectiveness of each operation.

The portable interface unit 804 may also include a display 822 to provide readouts to the vineyard manager, equipment operators or other personnel. Such units 804 may also have a downloadable capability to transfer data to a computer containing a vineyard quality management database 824. The computer 824 is preferably connected to a display 826 and printer 828. The interface unit 804 also provides for input of additional growth properties 808 such as temperature, amount of sunshine, amount of rainfall, humidity and other growth affecting factors related to the environment.

In addition to vineyard properties 806 that are input into the portable unit 804, operation properties 810 may also be input. Such property information that may be prompted by the controller include the type of thinning operation, for example, whether the operation to be performed is shoot thinning, fruit thinning or dormant pruning or other operations. Moreover, the particular growth stage of the plant may also be input.

Other programmable parameters that may be input include accessory properties 812, such as operating speed and the number of striker elements for a thinner, the style of the thinner, and elements including the information regarding striker rigidity, shape, length, width and other characteristics.

The controller 802 also may accept desired results 814 to perform calculations and provide settings for the proper controls for operating the mechanized system 100. Desired results 814 that are input may be a percentage of fruit or shoots that are removed, or remaining, depending upon the prompts from the controller 802. At harvest and other times during the growing season, the operations and their results may be tracked and compared to make adjustments. The central processor 802 uses various coefficients and factors to calibrate and adjust based on the various parameters that are input to achieve the desired results by maintaining proper operational speed. The controller 802 receives measurements such as travel speed from a radar unit or wheel speed pick-up 816 and accessory velocity from a sensor 820. The controller 802 adjusts the hydraulic controller 818, typically a proportional control valve.

Following the initial setup of the controller, the speed/location sensor 816, such as a radar unit and GPS system, determines the location and the speed at which the mechanized system 100 advances and controls a hydraulic sensor and the controller 816 that sets a hydraulic rate to drive the accessory at the desired speed. For some applications, manual sampling or a weighing or other testing device shown in FIG. 31 may be utilized that provides data to the controller 802 to adjust the hydraulic fluid flow rate if the weight of the collected portions removed from the plants is too great or too small.

Figure 33:
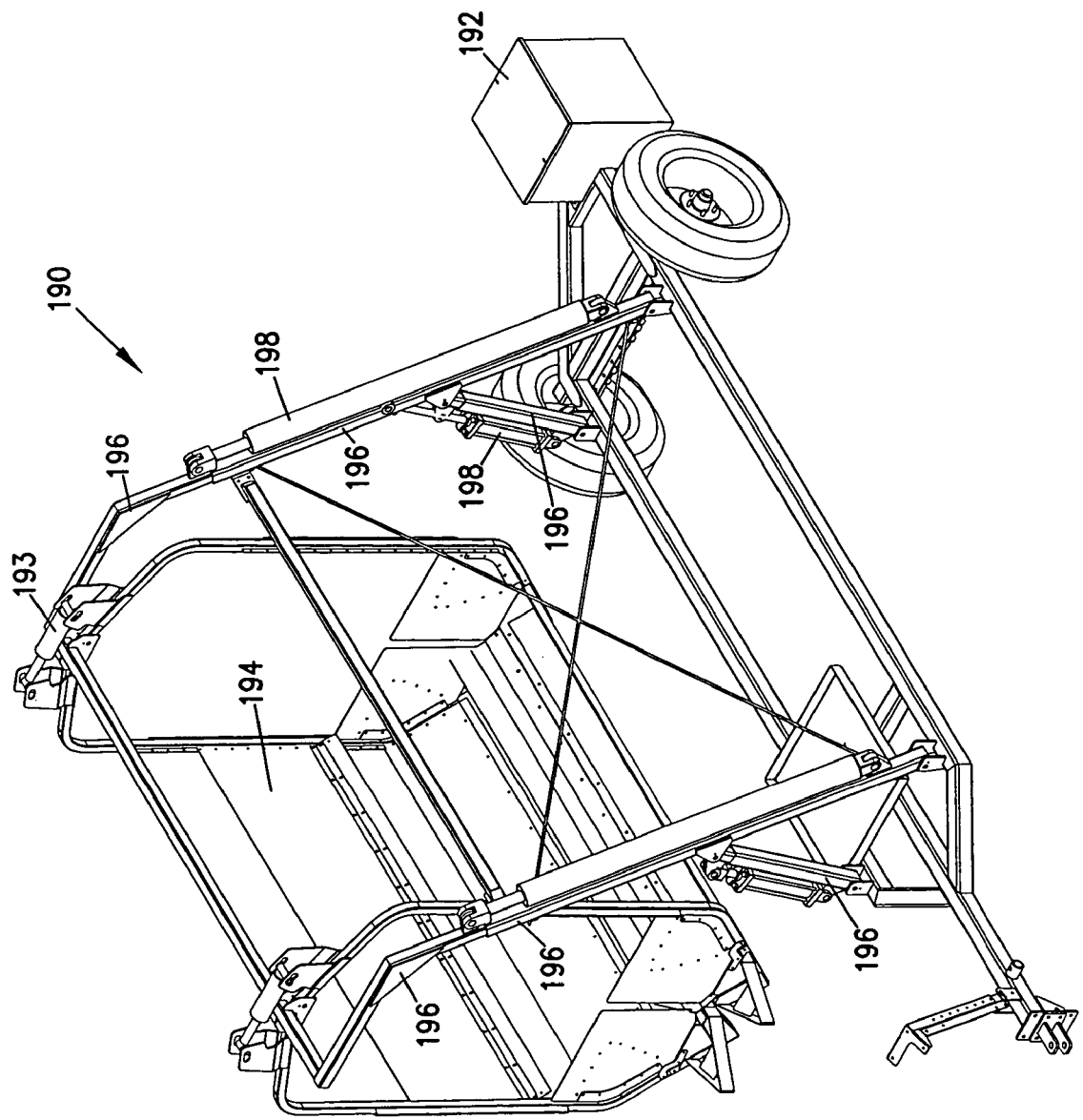
FIG. 33 is a perspective view of a weighing device for the mechanized vineyard management apparatus shown in FIG. 1.

Some systems may include a continuous weighing device 190, shown in FIG. 33, which allows not only initial setup of the controller and operational speed of the accessories through the hydraulic controller 816, but continuous adjustment while operating. Such on the fly adjustment improves the thinning operation and provides for more precise thinning and much tighter tolerances.

Figure 34:
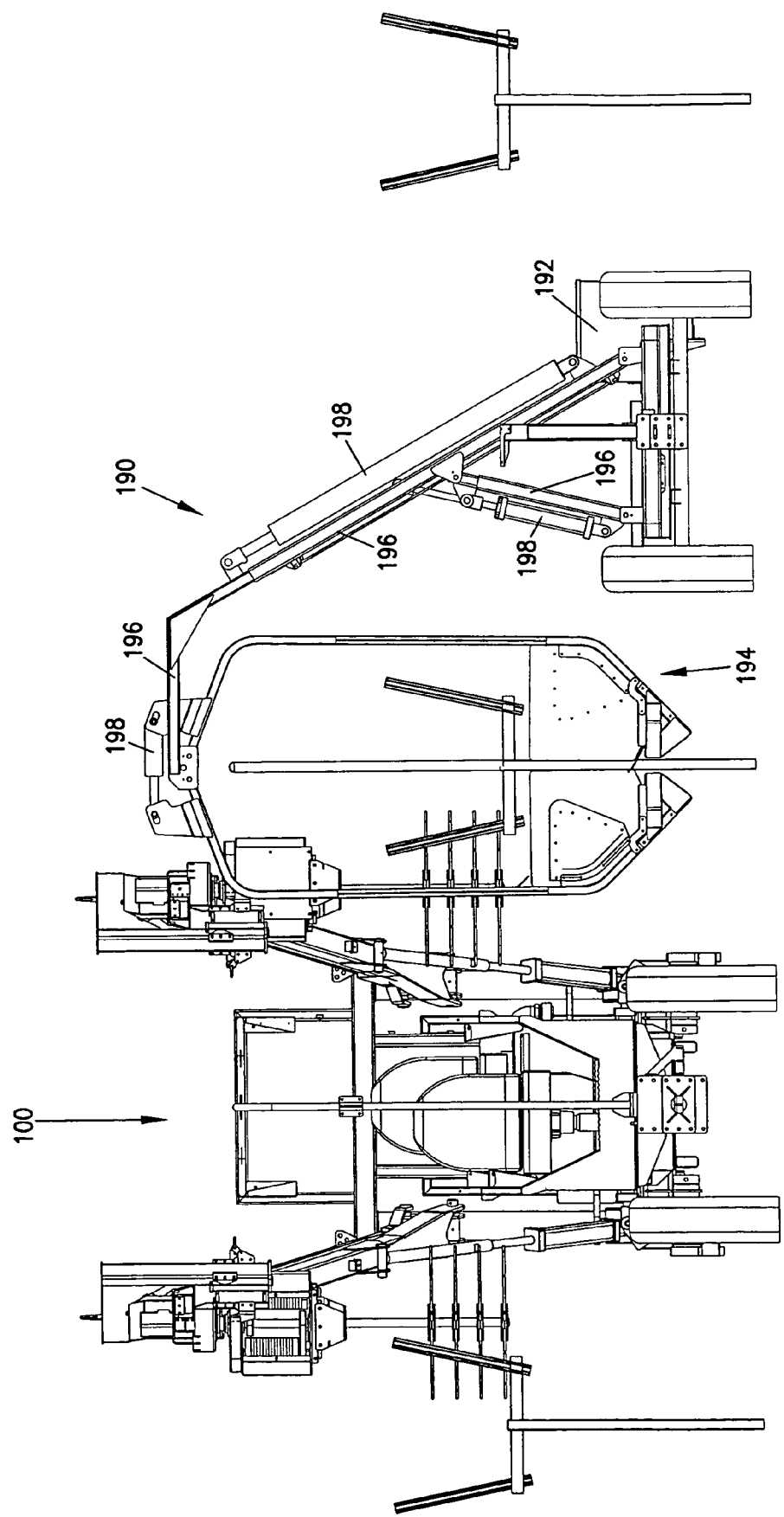
FIG. 34 is a front elevational view of the weighing device and the mechanized vineyard management apparatus configured for thinning and simultaneous weighing.

Referring now to FIG. 31, there is shown the setup steps for initiating the controller to perform various thinning operations. The various properties may be input and utilized by the portable hand held unit 804. Such steps may include inputting vineyard properties 704, inputting operation properties 706 and inputting accessory properties 708 as indicated above. In addition, inputting desired results 710 may also be carried out. Once the input steps are done, the information may be transferred from the remote unit 804 to the controller 802 to set a desired rate. A step of taking a test run 712 is typically taken and weighing and/or visual inspection provides for upward or downward adjustment of the accessory speed, as shown in steps 712 and 714. If the sample is within an acceptable range, the operation may proceed. If the sample indicates that an adjustment is needed, the speed may be increased or decreased depending on the adjustment needed and growth control operation, such as shoot thinning, may begin or further testing steps may occur. In applications where a weighing device is used, such as shown in FIGS. 33 and 34 and described below, or other continuous testing and monitoring are done, a continuous control loop provides constant adjustment of operational speeds, as shown at step 716.

Although the various inputs may be performed each time, if properties for various vineyards or sections or tracts in the vineyard have previously been entered, such data may be retrieved from memory to speed the setup of the mechanized system and improve the efficiency of the mechanized thinning operation.

In addition to traditional manual weight sampling, as described above, the system 100 may utilize an automated weighing device. Referring now to FIGS. 33 and 34, there is shown a weighing device, generally designated 190 used in conjunction with the mechanized system. The weighing device 190 includes a collector assembly 194 with front, bottom and side portions configured to extend around an accessory and a trellis post and collect removed portions. A scale 192 transmits the weight of the recovered material to the controller providing real time information as adjustments are made. As shown in FIG. 34, the weighing device 190 may be separately towed from the chassis 102. Alternatively, the weighing device 190 may be a self-contained self-propelled unit. The collector assembly 194 is hung from above and to one side from an adjustable frame 196 with adjustable hydraulic cylinders 198 to adjust the position of the collector assembly relative to the trellises and the accessories to ensure that the material removed is recovered and weighed. The collector assembly 194 includes a center longitudinal opening that allows the assembly 194 to pass around trellis posts. Angled guides at the front of the collector assembly 194 aid in positioning the assembly so that the slot receives the trellis post. The collector assembly 194 is also configured to extend around the trellis assemblies and operating accessories, such as a shaker 1100 described hereinafter, to collect foliage and/or fruit as it is removed. This information is transmitted to operators of the mechanized system 100 so that operating parameters may be adjusted on the fly.

Figure 35:
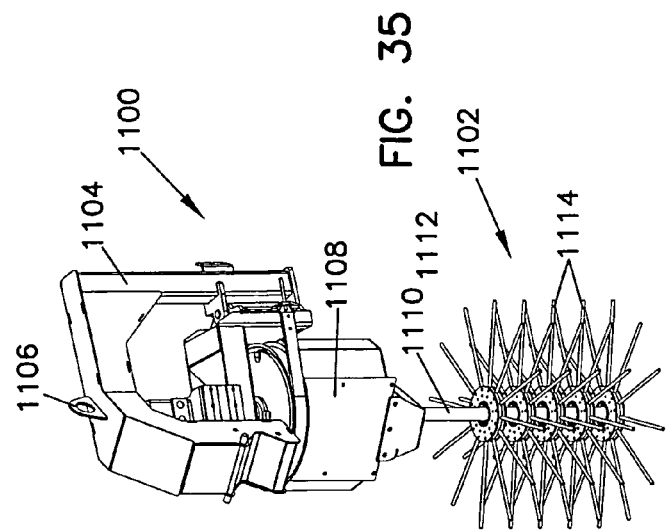
FIG. 35 is a perspective view of another embodiment of a fruit thinner attachment for the mechanized vineyard management apparatus shown in FIG. 1.
Figure 36:
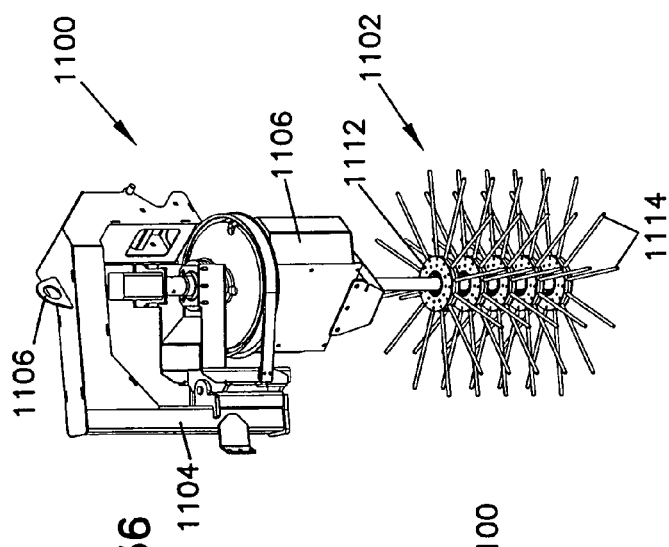
FIG. 36 is an opposite perspective view of the fruit thinner attachment shown in FIG. 35.
Figure 37:
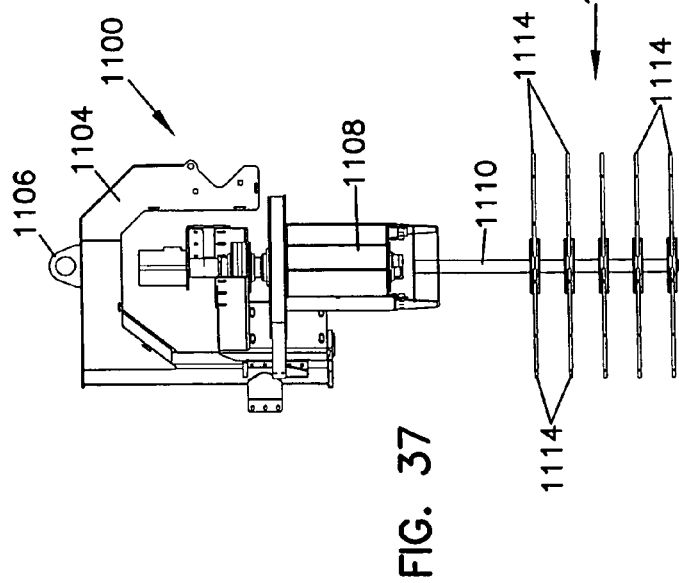
FIG. 37 view of the fruit thinner attachment shown in FIG. 35.

Referring now to FIGS. 35-37, there is shown another interchangeable thinner accessory, generally designated 1100, for the mechanized agricultural system 100. The thinner 1100 is a force balanced shaker type device such as may be used for fruit thinning and other thinning operations. The force balanced, shaker 1100 includes a striker assembly 1102 mounted on a frame 1104 and hung from a mounting plate 1106. A force balanced driver 1108 drives the striker assembly 1102. The force balanced driver 1108 includes eccentrically mounted weights that are offset from the driving shaft and are well known in the agricultural industry. An example of such a driver is shown in U.S. Pat. No. 4,793,128. The drive 1108 is vertically aligned with the shaft 1110 so that the striker assembly is driven with a reduced amount of misdirected force transmitted through the frame 1104 and mounting plate 1106. The shaft 1110 drives whorl arrangements 1112. The whorl arrangements 1112 have radially extending rods 1114 that engage the plants and loosen the fruit and other unwanted foliage. The whorl arrangements 1114 rotate as the system 100 advances to better engage and loosen foliage.

Referring now to FIGS. 38-40, there is shown a vertical fruit thinner 1200, which is an interchangeable accessory for the mechanized vineyard system 100. The vertical fruit thinner 1200 is similar to the force balanced shaker 1100, except for the drive. The vertical thinner 1200 includes a striker assembly 1202, a driver 1208, and a frame 1204 supporting the thinner 1200. A mounting plate 1206 attaches to the frame and allows for hanging off of a boom. The driver 1208 vertically drives a shaft 1210 having whorl arrangements 1212 mounted thereon. The whorl arrangements 1212 include radially extending striker rods 1214 configured to rotate as they engage the plants and remove foliage and fruit.

Referring to FIGS. 41-43, there is shown a horizontal trunk cleaner accessory, generally designated 1300. The trunk cleaner 1300 is similar to the trunk cleaner 500, but with a different orientation and is used for removing unwanted suckers. The horizontal trunk cleaner 1300 includes a striker assembly 1302 that rotates about a generally horizontal axis. The trunk cleaner 1300 includes a frame 1304 supported on a mounting bracket 1306. A driver 1308 imparts rotation to the striker assembly 1302. The striker assembly 1302 includes individual strikers 1310 in the form of flexible rubber elements. A guard 1312 generally covers one side and the upper portion around the striker assembly 1302.

Figure 44:
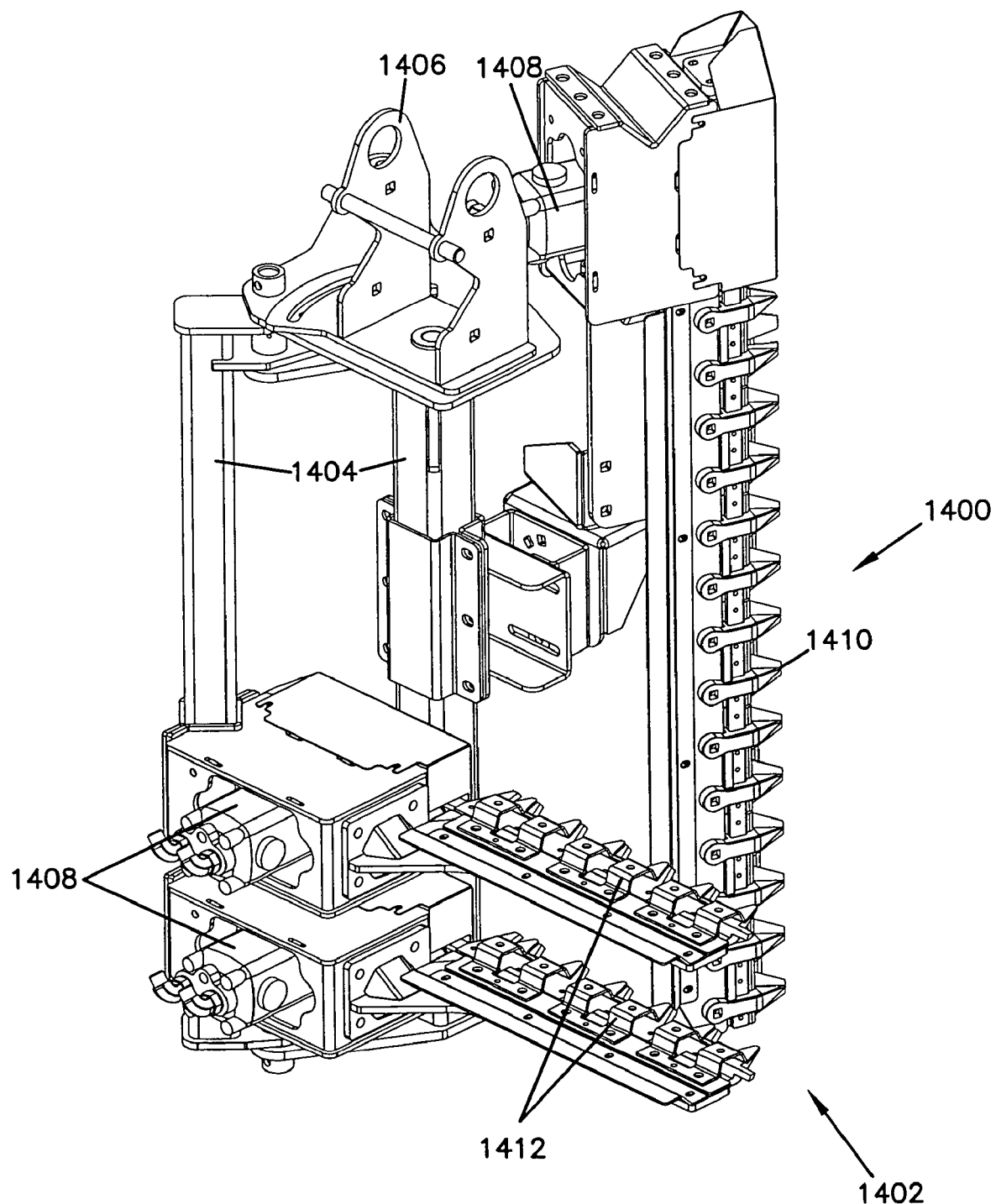
FIG. 44 is a perspective view of a pruner attachment for the mechanized vineyard management apparatus shown in FIG. 1.
Figure 45:
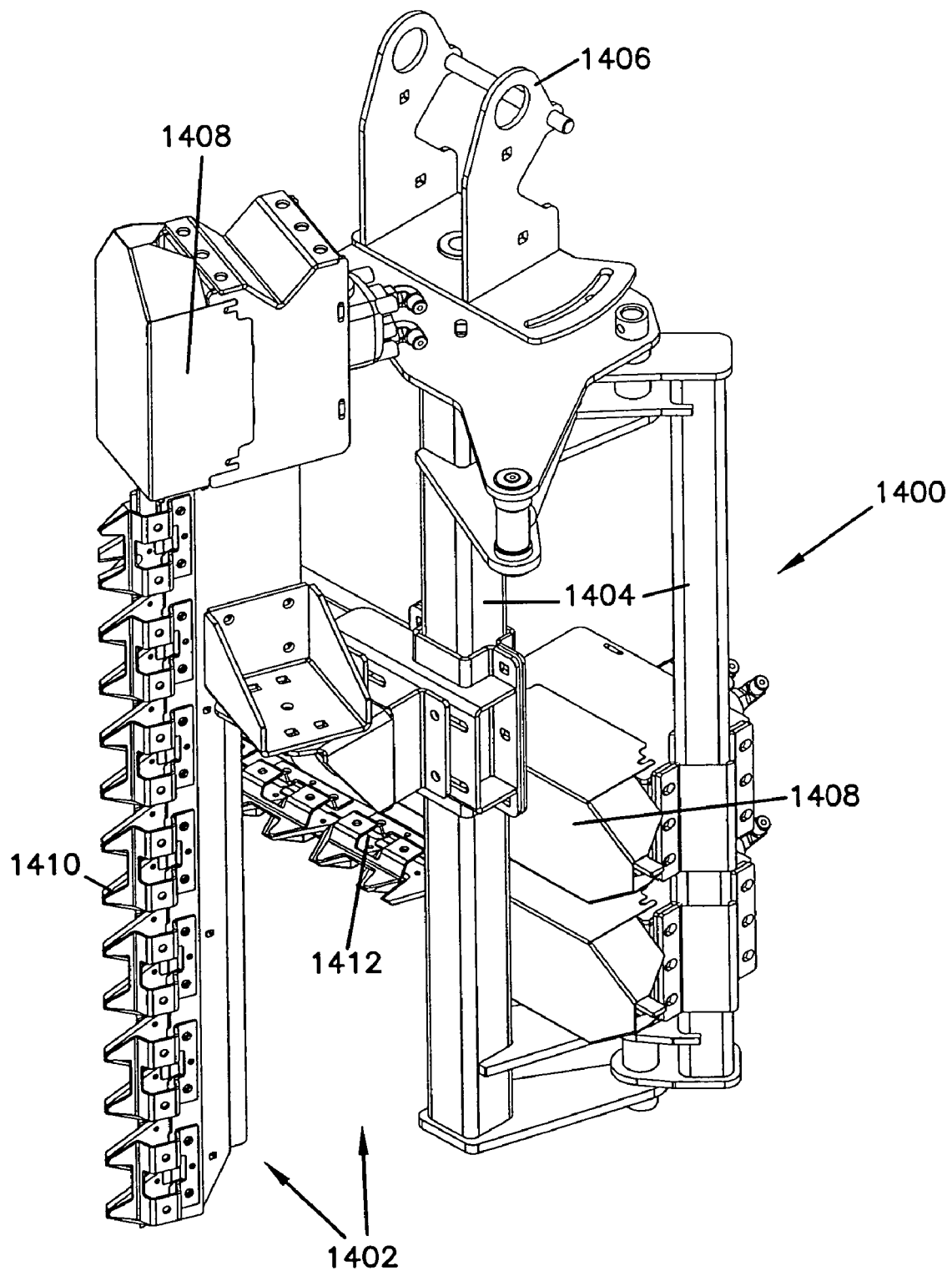
FIG. 45 is an opposite perspective view of the pruner attachment shown in FIG. 44.
Figure 46:
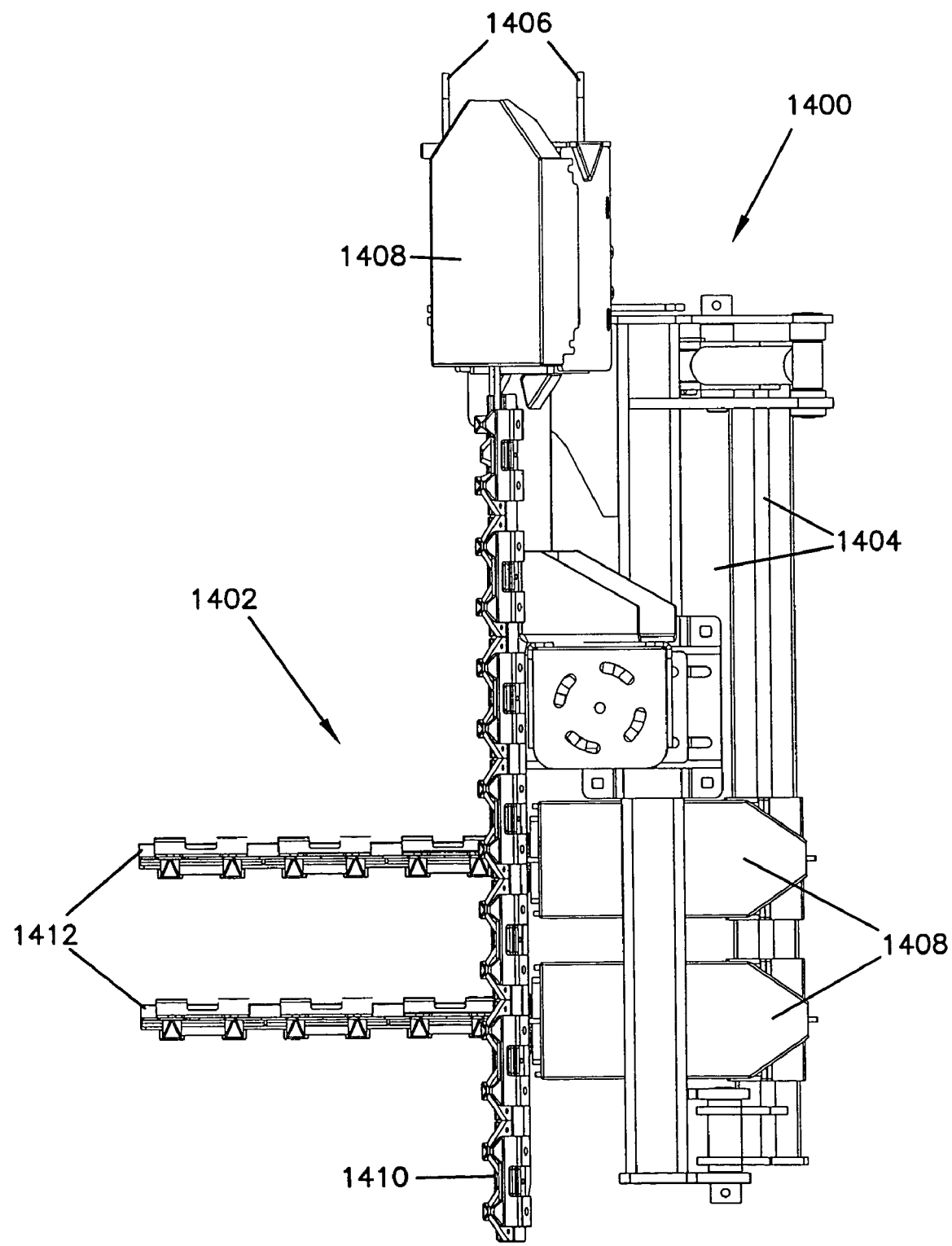
FIG. 46 is a side view of the pruner attachment shown in FIG. 44.

Referring now to FIGS. 44-46, there is shown a pruner accessory, generally designated 1400. The pruner 1400 includes a cutter assembly 1402 mounted to a frame 1404 supported on a mounting bracket 1406. Drivers 1408 provide motion to the cutter assembly 1402. In the embodiment shown in FIGS. 44-46, the pruner 1400 includes two horizontal cutter bars 1412 and a single vertical cutter bar 1410. However, the pruner cutter assembly 1402 may be varied, such as to have two horizontal cutter bars 1412 including a bar extending upward and downward. It can be appreciated that the cutter bars 1410 and 1412 may also be removed and added for various cutter assembly configurations, depending upon the needs and uses of the pruner 1400. Use of the pruner has shown unexpected results and benefits as testing indicates that pruning operations may be conducted later in the season to limit the infection and spreading of diseases.

Referring now to FIGS. 47-49, there is shown an orbital-type fruit thinner accessory, generally designated 1500. The fruit thinner 1500 includes a striker assembly 1502 supported on a frame 1504 attached to a mounting plate 1506. A driver 1508 drives a shaft 1510 through a gear box 1516. The vertical shaft 1510 connects to a stack of spaced apart whorl arrangements 1512 having radially extending horizontal rods 1514. The driver 1508 drives the whorl arrangements 1512 in an orbital motion so that the rods 1514 engage and remove fruit in its typical application. In addition to orbital motion and lateral displacement, the striker assembly 1502 also is displaced vertically with the orbital shoot thinner 1500.

Referring to FIGS. 50-52, a rotary shoot thinner accessory generally designated 1600 is shown. The rotary shoot thinner 1600 includes a striker assembly 1602 supported on a frame 1604 attached to a mounting bracket 1606. A driver 1608 rotates the striker assembly 1602. The striker assembly 1602 generally includes a horizontal rotating disc 1610. Striker elements 1612 mount to the disc 1610 at spaced apart intervals. The striker elements 1612 generally extend downward near the outer edge of the disc 1610. The number and spacing of the striker elements 1612 may be varied by changing the mounting position at mounting holes 1614. It can be appreciated that by varying the speed of the striker assembly 1602 and the number of striker elements 1614, various engagement combinations may be achieved for achieving a range of thinning.

Referring to FIGS. 53-55, a linear type shoot thinner accessory, generally designated 1700 is shown. The linear shoot thinner 1700 includes a striker assembly 1702 mounted to a frame 1704 attached to a mounting bracket 1706. A driver 1708 imparts linear motion to the striker assembly 1702. The striker assembly 1702 generally includes a striker bar 1710 receiving downward extending striker elements 1712. The striker elements 1712 attach through mounting holes 1714 to the striker bar 1710. The mounting holes 1714 allow the number and spacing of the striker elements 1712 to be varied to arrive at various striker configurations. By changing the number and/or spacing and/or speed of the striker elements 1712, various levels of thinning operations are easily achieved.

Figure 56:
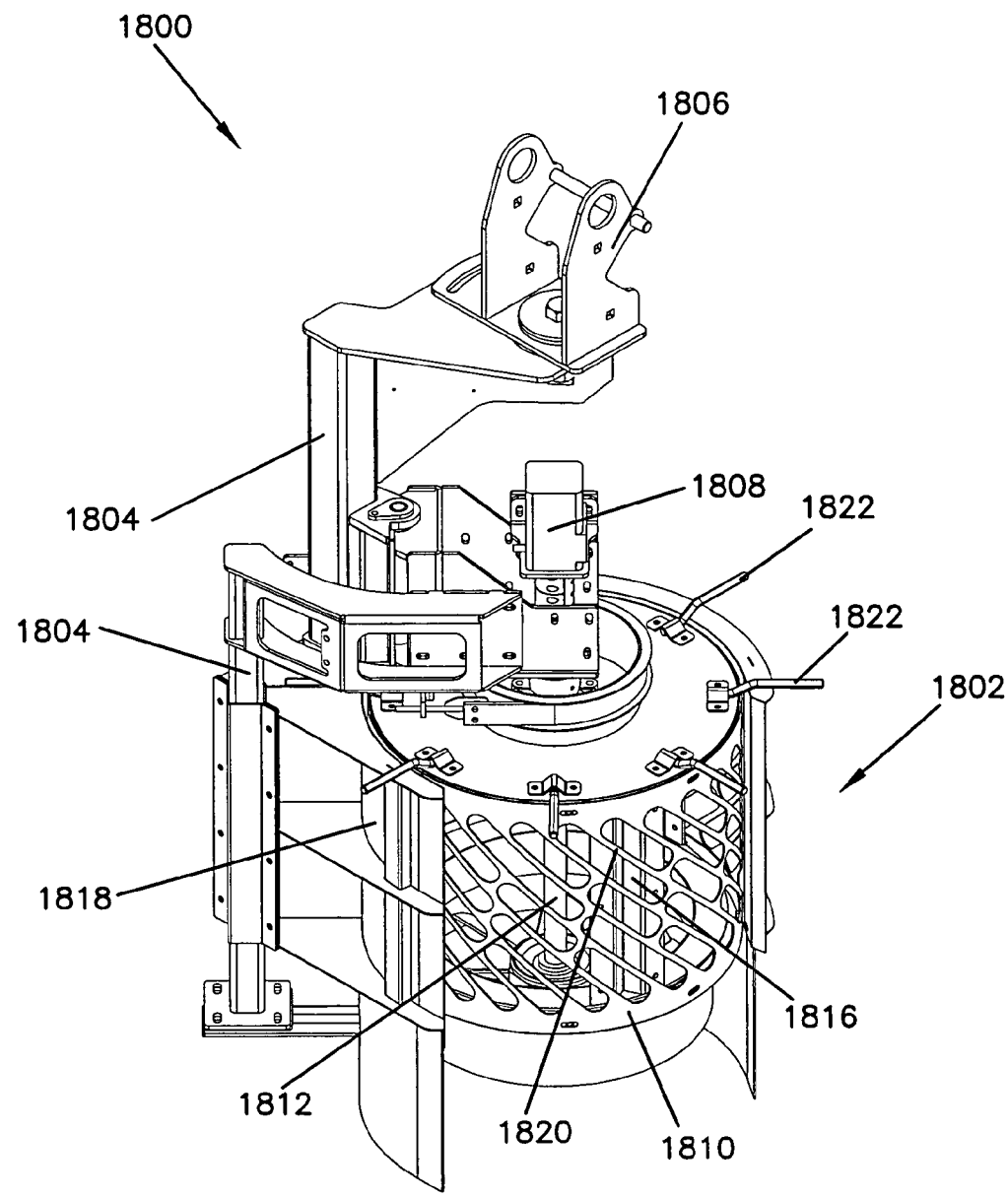
FIG. 56 is a perspective view of a deleafer attachment for the mechanized vineyard management apparatus shown in FIG. 1.
Figure 57:
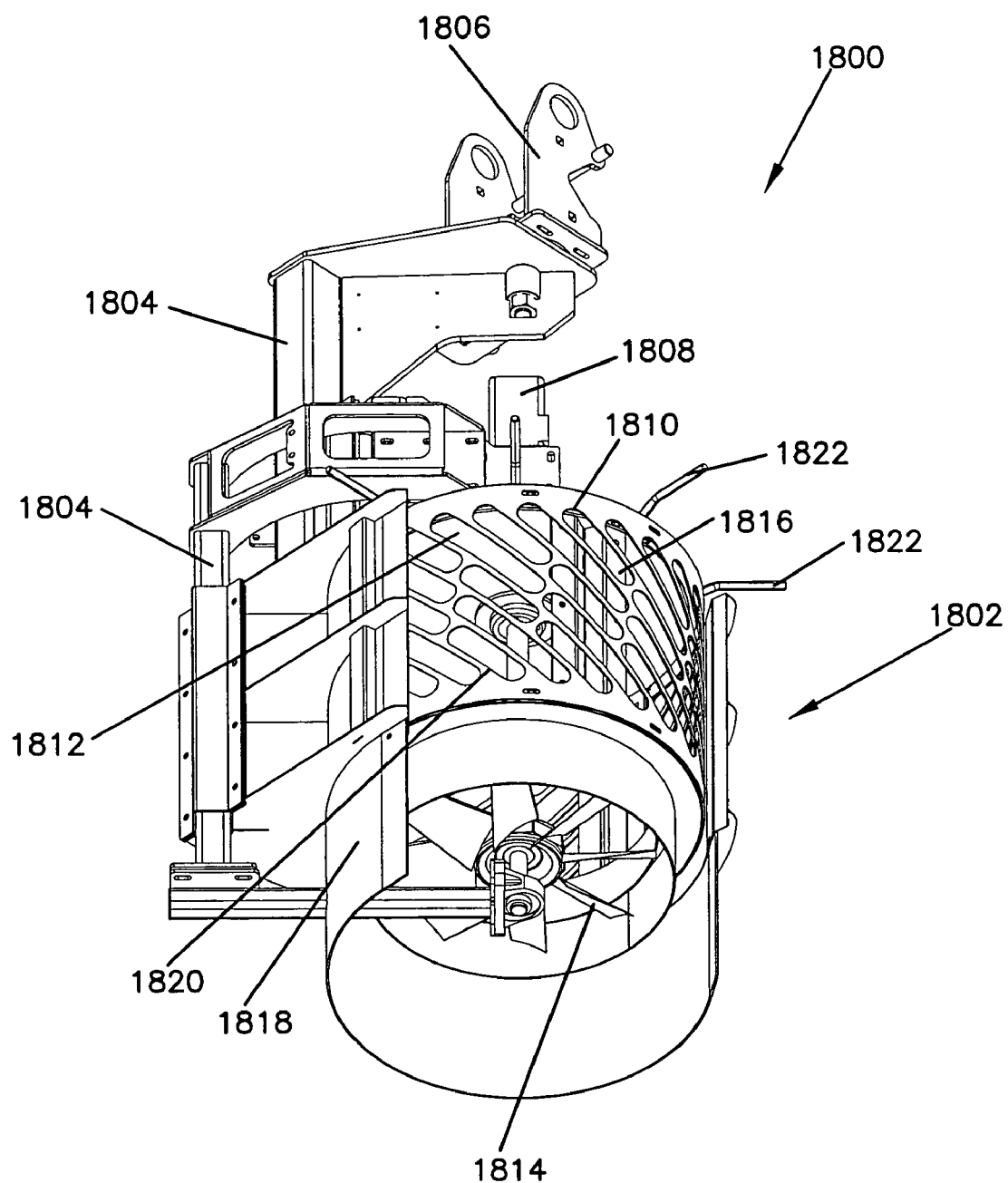
FIG. 57 is an opposite perspective view of the deleafer attachment shown in FIG. 56.
Figure 58:
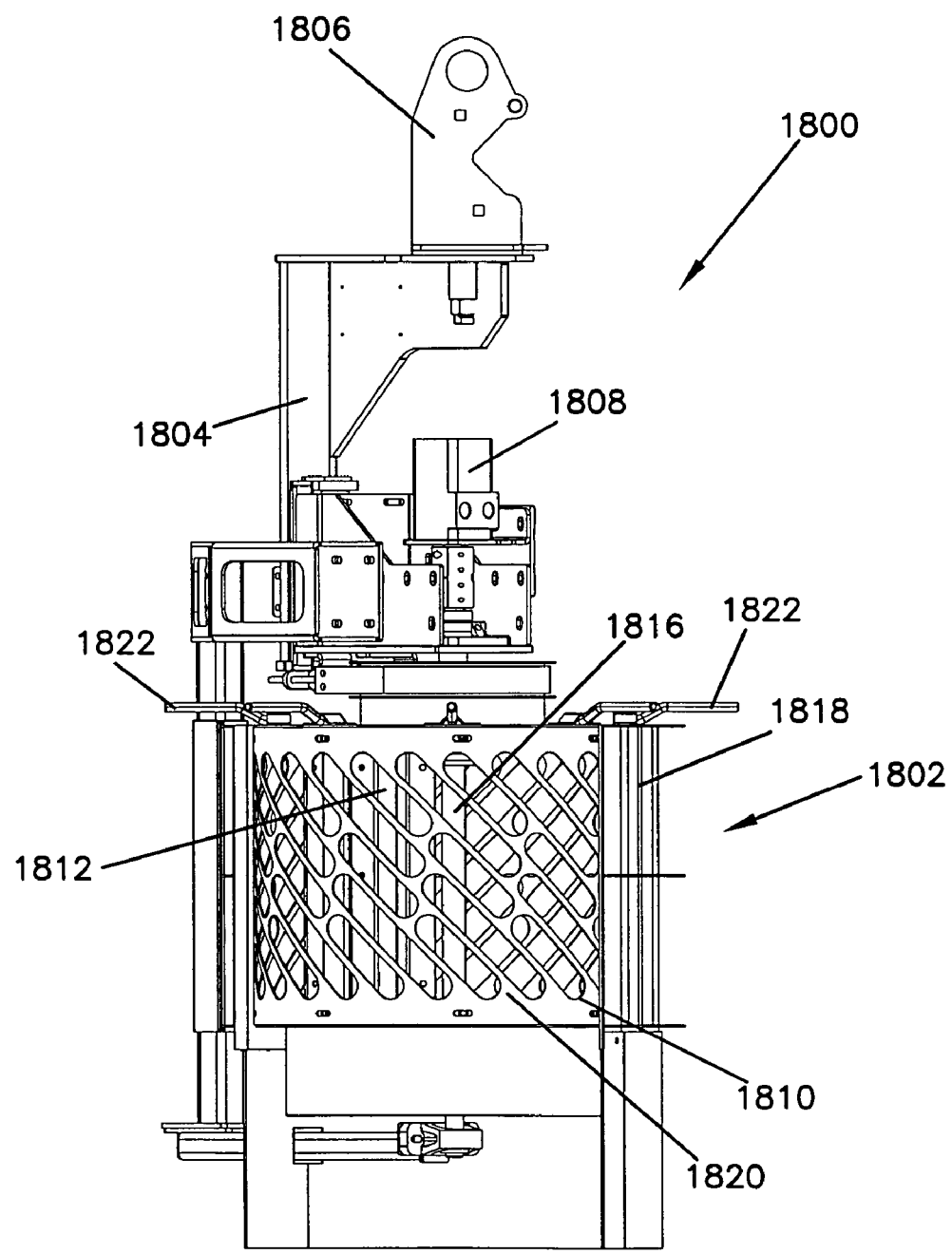
FIG. 58 is a side elevational view of the deleafer attachment shown in FIG. 56.

Referring now to FIGS. 56-58, there is shown a deleafer accessory, generally designated 1800. The deleafer 1800 includes a cutter assembly 1802 supported on a frame 1804 attached to a mounting bracket 1806. A driver 1808 rotates an inner cutting drum 1812 and a bottom fan 1814 of the cutter assembly 1802. The cutting drum 1812 includes a number of cutting blades 1816 extending vertically. The cutter assembly 1802 further includes an outer freely rotating drum 1810 having a louvered grill 1820 disposed around the outer surface of the drum 1810. The freely rotating drum 1810 also includes radially outward extending elements 1822. The elements 1822 engage the vines and rotate the drum 1810 as the system 100 advances. The deleafer 1800 has a shroud 1818 covering a periphery of a portion of the cutter assembly 1802 to form a vacuum chamber and to provide added safety.

In operation, the fan 1814 blows downward and with the shroud 1818, creates a vacuum chamber that draws foliage into the cutter assembly 1802 through the grill 1820 as the deleafer 1800 passes. Foliage drawn into the outer drum 1800 is engaged and cut by the blades 1816. The cut material is then discharged out the bottom of the cutter assembly 1802 by the fan 1814.

Figure 59:
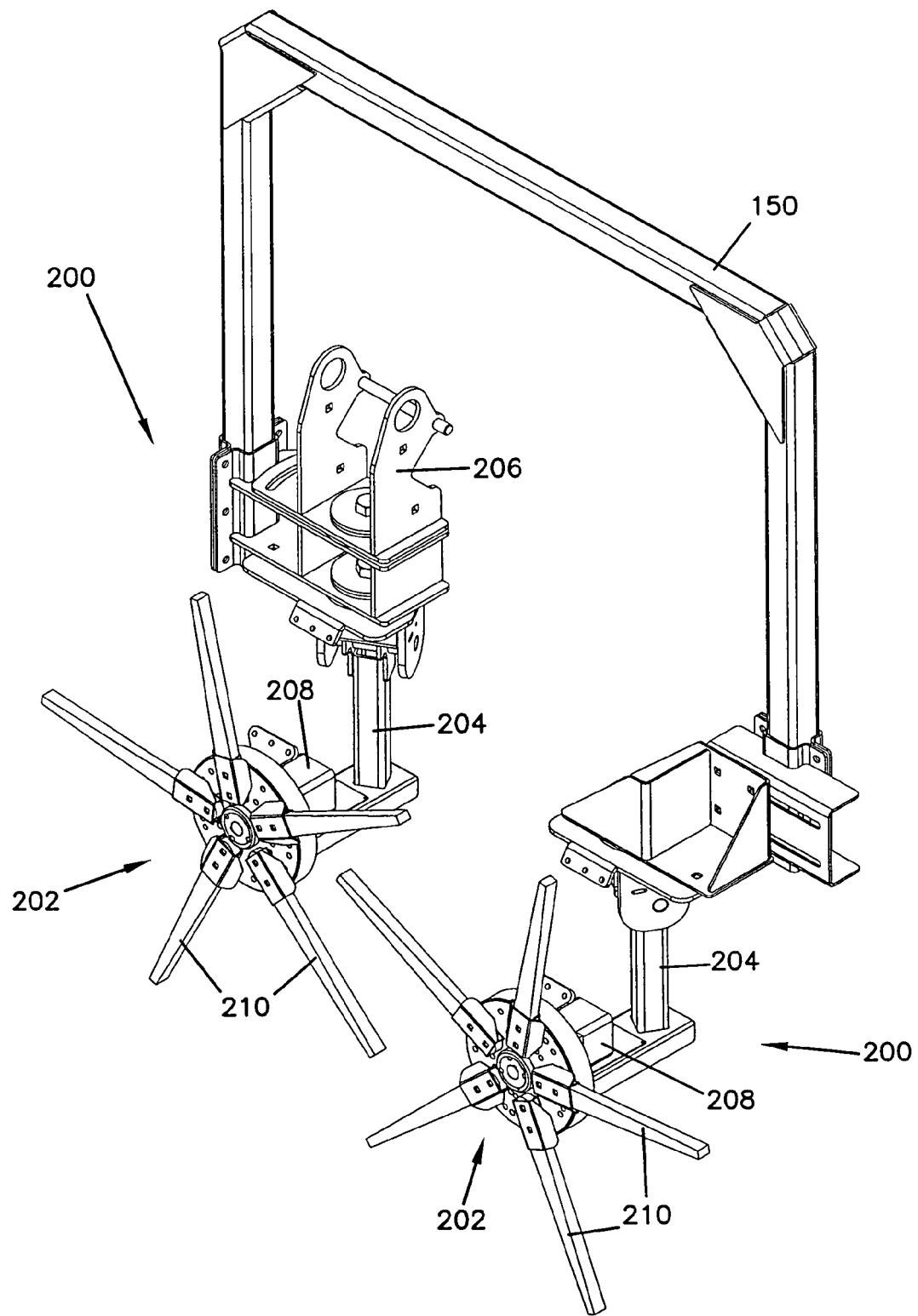
FIG. 59 is a perspective view of a dual shoot thinner attachment for the mechanized vineyard management apparatus shown in FIG. 1.
Figure 60:
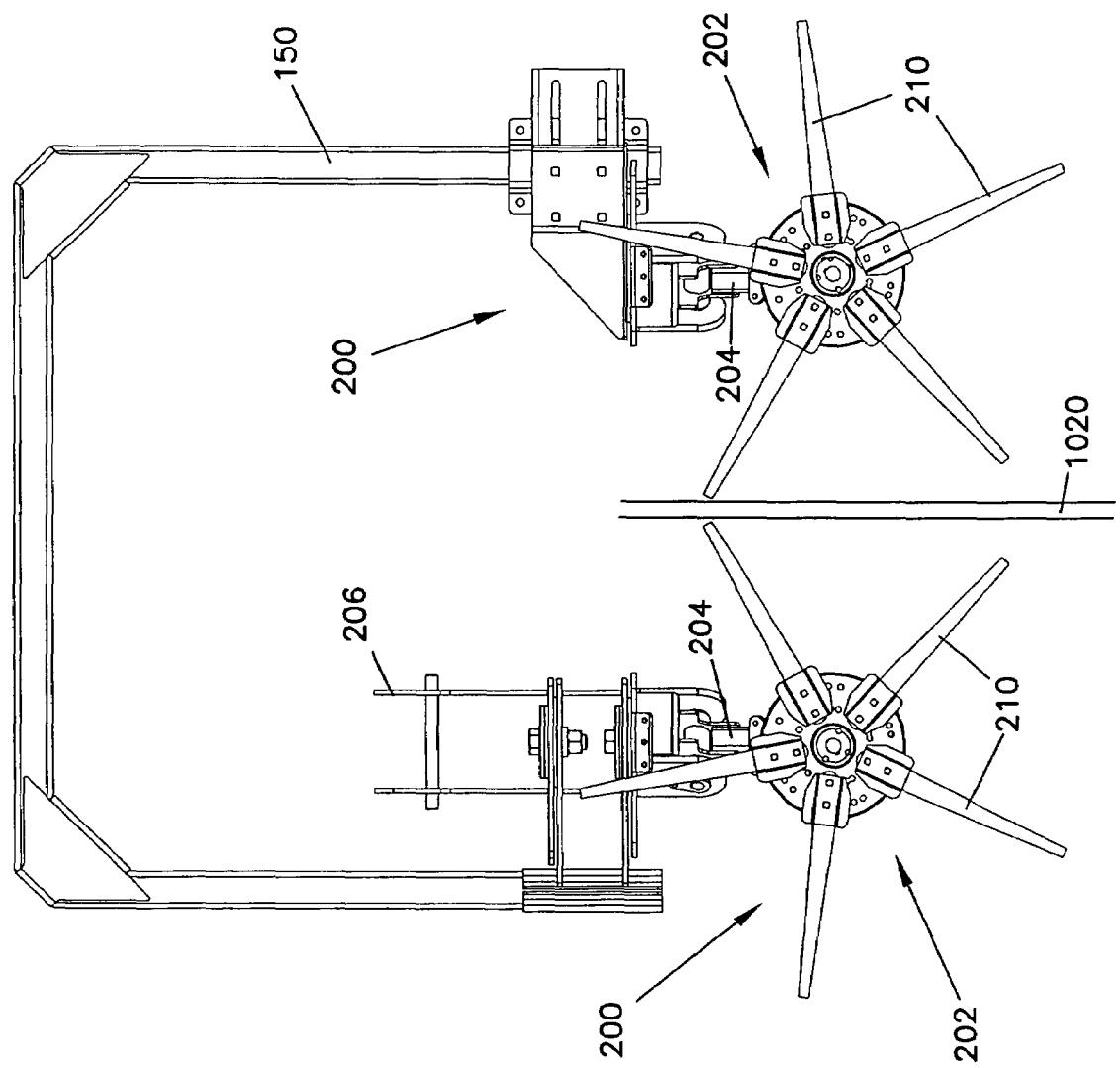
FIG. 60 is a front elevational view of the dual shoot thinner attachment shown in FIG. 59.

Referring now to FIGS. 59-60, there is shown a dual attachment frame 150 supporting two shoot thinner accessories 200. The shoot thinners 200 are similar to those shown in FIGS. 1-4 and 13-14. However, the shoot thinners 200 are supported on a frame 150 for engaging opposite sides of a vertical shoot position trellis 1020, as shown in FIG. 60. The frame 150 is generally an inverted U-shape and includes an upper portion as well as opposed vertical portions extending downward. The assembly 150 mounts on a bracket 206 to one of the booms and is generally weighted so that the striker assemblies 202 hang at opposite sides of the row for engaging opposite sides of the plants at the same time. Although the rotary shoot thinners 200 are shown, it is readily understood that each of the interchangeable accessories may be supported on the dual frame 150.

It can be appreciated that the present invention provides for performing a wide range of mechanized vineyard management operations with a variety of specialized devices. It can be appreciated that in the embodiment shown, the devices might be shown as left handed or right handed but would be configured for the opposite orientation as well. Moreover, each of the devices may also be utilized for mixing or matching on a dual attachment frame 150, as shown in FIGS. 57 and 58. The devices are generally driven with hydraulic motors and draw from the overall mechanized vineyard system 100. Hydraulic lines have generally been omitted from the drawings for clarity but their attachment and use would be readily understood by one of ordinary skill in the art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A vineyard management system, comprising:
   a vineyard mechanized vehicle having one or more different interchangeable accessories for removing portions of plants;
   a programmable controller providing control parameters for operating the different interchangeable accessories, the programmable controller including memory for recording one or more of the inputs and operation characteristics and is downloadable to a portable digital device, wherein the control parameters comprise operational and vehicle configuration parameters based on:
   an input for accessory type;
   an input for number of accessory striking members; and
   an input for portion of plants to remove.

2. A vineyard management system according to claim 1, wherein the mechanized vehicle comprises sensors for measuring vehicle speed and accessory velocity.

3. A vineyard management system according to claim 1, wherein the controller utilizes one or more inputs for coefficients related to grape varietal.

4. A vineyard management system, comprising:
   a vineyard mechanized vehicle having one or more different interchangeable accessories for removing portions of plants;
   a programmable controller providing control parameters for operating the different interchangeable accessories, wherein the control parameters comprise operational and vehicle configuration parameters based on:
   an input for accessory type;
   an input for number of accessory striking members; and
   an input for portion of plants to remove;
   wherein the controller records and retrieves vineyard historical data and sets rates using the historical data.

5. A vineyard management system, comprising:
   a vineyard mechanized vehicle having one or more different interchangeable accessories for removing portions of plants;
   a programmable controller providing control parameters for operating the different interchangeable accessories, wherein the control parameters comprise operational and vehicle configuration parameters based on:
   an input for accessory type;
   an input for number of accessory striking members; and
   an input for portion of plants to remove;
   wherein the controller further receives sampling data and sets rates using the sampling data.

6. A management system according to claim 5, wherein the controller further receives hand sampling data and sets rates using the hand sampling data.

7. A vineyard management system according to claim 1, wherein the controller further comprises a global positioning system and wherein the controller bases operational parameters on an input from the global positioning system.

8. A vineyard management system, comprising:
   a vineyard mechanized vehicle having one or more different interchangeable accessories for removing portions of plants;
   a weighing system providing an input with data on thinning operations;
   a programmable controller providing control parameters for operating the different interchangeable accessories, wherein the control parameters comprise operational and vehicle configuration parameters based on:
   an input for accessory type;
   an input for number of accessory striking members; and
   an input for portion of plants to remove.

9. A vineyard management system according to claim 8, wherein the weighing system comprises a simultaneous weighing system providing real time data on thinning operations.

10. A system according to claim 1, wherein the controller maintains a thinning rate and varies the accessories as the speed of the vineyard mechanized vehicle varies.

11. A system according to claim 1, wherein the control parameters are selected from the group consisting of: vehicle speed; accessory type, number of accessory strikers, striker speed, grape varietal, and percentage of fruit or foliage desired to remain on plants.

* * * * *